US011862859B2

(12) United States Patent
Sampo et al.

(10) Patent No.: US 11,862,859 B2
(45) Date of Patent: Jan. 2, 2024

(54) ANTENNA DEVICE

(71) Applicant: YOKOWO CO., LTD., Tokyo (JP)

(72) Inventors: Takeshi Sampo, Tomioka (JP); Takayuki Sone, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 0 days.

(21) Appl. No.: 18/092,950

(22) Filed: Jan. 4, 2023

(65) Prior Publication Data

US 2023/0146537 A1 May 11, 2023

Related U.S. Application Data

(63) Continuation of application No. 17/163,691, filed on Feb. 1, 2021, now Pat. No. 11,581,659, which is a (Continued)

(30) Foreign Application Priority Data

Jul. 31, 2018 (JP) ................................ 2018-143828

(51) Int. Cl.
*H01Q 21/24* (2006.01)
*H01Q 9/16* (2006.01)

(52) U.S. Cl.
CPC ............... *H01Q 21/24* (2013.01); *H01Q 9/16* (2013.01)

(58) Field of Classification Search
CPC .. H01Q 9/16; H01Q 9/26; H01Q 9/28; H01Q 9/285; H01Q 21/24; H01Q 21/26;
(Continued)

(56) References Cited

U.S. PATENT DOCUMENTS 5,293,176 A * 3/1994 Elliot .................. H01Q 21/062 343/807
9,099,777 B1 8/2015 Manry, Jr.
(Continued)

FOREIGN PATENT DOCUMENTS

GB 2316233 A 2/1998
JP 2005-72716 A 3/2005
(Continued)

OTHER PUBLICATIONS

International Search Report and Written Opinion dated Oct. 8, 2019, received for PCT Application PCT/JP2019/029899, Filed on Jul. 30, 2019, 7 pages.

(Continued)

*Primary Examiner* — Thai Pham
(74) *Attorney, Agent, or Firm* — XSENSUS LLP

(57) ABSTRACT

An antenna device includes: a pair of first elements that are arranged on a first plane; and a pair of second elements that are arranged on a second plane parallel to the first plane such that a polarized wave direction of the pair of second elements is orthogonal to that of the pair of first elements. Each element of the pair of first elements and the pair of second elements includes a portion that acts as a self-similarity antenna or an antenna that acts based on similar operating principle to the self-similarity antenna. In one embodiment, each element of the pair of first elements and the pair of second elements includes two arms that extend in a direction away from each other from a proximal end portion to which a feed point is connectable.

9 Claims, 46 Drawing Sheets

Related U.S. Application Data continuation of application No. PCT/JP2019/029899, filed on Jul. 30, 2019.

(58) Field of Classification Search
CPC .......... H01Q 21/28; H01Q 21/30; H01Q 5/48; H01Q 5/342
See application file for complete search history.

(56) References Cited

U.S. PATENT DOCUMENTS

| | | | | |
|---|---|---|---|---|
| 9,825,354 | B2 | 11/2017 | Hu et al. | |
| 2012/0133567 | A1* | 5/2012 | Harel | H01Q 5/47 343/798 |
| 2012/0169543 | A1 | 7/2012 | Sharma et al. | |
| 2013/0021218 | A1* | 1/2013 | Asanuma | H01Q 9/40 343/893 |
| 2013/0285867 | A1* | 10/2013 | Wang | H01Q 1/246 343/843 |
| 2015/0295322 | A1 | 10/2015 | Asanuma et al. | |
| 2016/0064830 | A1* | 3/2016 | Jervis | H01Q 9/285 343/798 |
| 2022/0376406 | A1* | 11/2022 | Lee | H01Q 23/00 |

FOREIGN PATENT DOCUMENTS

| | | | |
|---|---|---|---|
| JP | 2014-79008 | A | 5/2014 |
| JP | 2016-504799 | A | 2/2016 |
| WO | 2012/104941 | A1 | 8/2012 |

OTHER PUBLICATIONS

Extended European search report dated Mar. 28, 2022, in corresponding European patent Application No. 19844917.5, 12 pages.

* cited by examiner

ANTENNA DEVICE

CROSS-REFERENCE TO RELATED APPLICATIONS

The present application is a continuation of U.S. application Ser. No. 17/163,691, filed Feb. 1, 2021, which is a continuation of International Application No. PCT/JP2019/029899, filed on Jul. 30, 2019, which claims priority to Japanese Patent Application No. 2018-143828, filed on Jul. 31, 2018, the entire disclosure of each are incorporated herein by reference.

TECHNICAL FIELD

The present invention relates to a thin profile antenna device that is usable in a wide frequency range from 698 MHz and frequencies before and after 698 MHz to 6 GHz and frequencies before and after 6 GHz, for example.

BACKGROUND ART

In recent years, there has been increasing demand for conducting multiple-input multiple-output (MIMO) communication using a frequency band of long term evolution (LTE) or the fifth generation mobile communication system (5G) for vehicles carrying electronic equipment. The MIMO is a communication mode that uses plural antennas to transmit different data from each antenna and receive data simultaneously by the plural antennas. A MIMO antenna device disclosed in Patent Literature 1 is known as an antenna device enabling such a communication mode.

The MIMO antenna device disclosed in Patent Literature 1 includes plural antennas, that is, a balanced antenna and an unbalanced antenna that are accommodated in a shark fin antenna housing having 100 mm long, 50 mm wide, and 45 mm high. The unbalanced antenna is constituted by a rectangular planar etching formed of polychlorinated biphenyl. The balanced antenna includes two symmetrical planar L-shaped arms that face each other.

PRIOR ART DOCUMENTS

Patent Literature

Patent Literature 1: National Publication of International Patent Application No. 2016-504799

SUMMARY OF INVENTION

Problems to be Solved by the Invention

When the unbalanced antenna is made low profile as with the MIMO antenna device disclosed in Patent Literature 1, the antenna size (height) decreases, resulting in deterioration of a voltage standing wave ratio (VSWR) and shortage of gain in the horizontal direction. When plural antennas are accommodated in a small area such as the shark fin antenna housing, interference occurs between the antennas, which adversely affects the antenna characteristic. For example, in the MIMO antenna device used in LTE, greater isolation between the antennas is preferable, but in the MIMO antenna device disclosed in Patent Literature 1, it is difficult to satisfy such a condition over a wide frequency band. As illustrated in FIGS. 5 to 7 of Patent Literature 1, available frequency bands are limited to plural points in a frequency range from 0.6 to 3 GHz, and the respective frequency bands are narrow.

The present invention has a primary object to enable a stable operation over a wide frequency band and further has an object to provide an antenna device capable of reducing the effect of another adjacent antenna or element.

Solution to the Problems

An antenna device according to one embodiment of the present invention includes a pair of first elements that are arranged on a first plane, and a pair of second elements that are arranged on a second plane parallel to the first plane, so that a polarized wave direction of the pair of second elements is orthogonal to that of the pair of first elements, wherein each element of the pair of first elements and the pair of second elements includes a portion that acts as a self-similarity antenna or that acts based on similar operating principle to the self-similarity antenna.

More specifically, each element of the pair of first elements and the pair of second elements includes two arms that extend in a direction away from each other from a proximal end portion to which a feed point is connectable, and the two arms act as a self-similarity antenna or an antenna that acts based on similar operating principle to the self-similarity antenna. The "self-similarity antenna" is an antenna including, for example, a biconical antenna or a bow-tie antenna, in which a shape thereof is similar even when a scale (size ratio) is changed.

Advantageous Effects of the Invention

Since the antenna device of the present invention includes the pair of first elements and the pair of second elements in which a polarized wave direction of the pair of second elements is orthogonal to that of the pair of first elements, and each of the pair of first elements and the pair of second elements includes a portion that acts as a self-similarity antenna or an antenna that acts based on similar operating principle to the self-similarity antenna, the antenna device acts as, for example, a tapered-slot antenna (one type of traveling-wave-type antennas) in a high frequency side which is a relatively high frequency band, and acts, for example, a loop antenna (one type of resonant antennas) in a low frequency side which is a relatively low frequency band. The antenna device acts as a dipole antenna (one type of resonant antennas) in a specified frequency band in a middle frequency range which is a mid-frequency band between the relatively high frequency band and the relatively low frequency band. In frequency bands among the relatively high frequency band, the relatively low frequency band, and the middle frequency region, the antenna device operates in a state in which operating principles of the antennas are combined, that is, acts as a complex antenna. Therefore, using one antenna device, a stable operation can be achieved over a wider frequency band than this type of conventional antenna device.

Since the polarized wave direction of the first elements is orthogonal to that of the second elements, the influence such as interference can be reduced even when the first elements and the second elements are brought close to each other. Therefore, a thin-profile antenna device can be provided.

BRIEF DESCRIPTION OF DRAWINGS

FIG. 40C is a perspective view of an inside of a second case body, when viewed from a rear side.

FIG. 40D is a front view of the inside of the second case body.

DESCRIPTION OF EMBODIMENTS

A description will hereinafter be made with reference to the drawings about examples of embodiments in which the present invention is applied to an antenna device that is usable in a wide frequency band from 698 MHz and frequencies before and after 698 MHz to 6 GHz and frequencies before and after 6 GHz.

First Embodiment

An antenna device of a first embodiment is used in a state in which an antenna unit is accommodated in a thin profile case that can be installed in any posture at any position inside a room or a vehicle compartment, for example. The thin profile case includes a case body formed of a member having electric wave permeability, such as an ABS resin, and a holding part formed appropriately according to an installation position. The case body includes, for example, a bottomed rectangular parallelepiped-shaped casing having an accommodation space for accommodating the antenna unit therein, and a cover body for sealing the accommodation space. The cover body is provided to any one of four side surfaces of the casing or one main surface having the largest width of the casing, and seals the accommodation space.

Figure 1A:
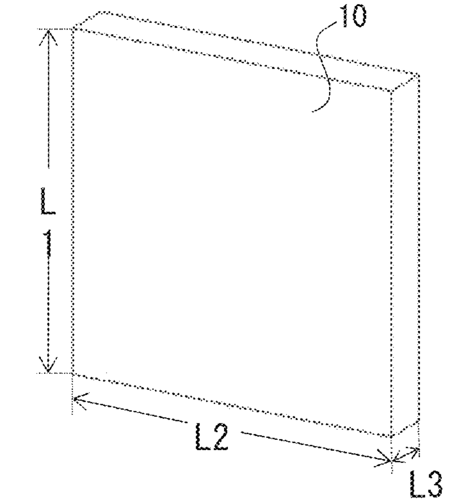
FIG. 1A is a perspective view of a case body in which an antenna unit of a first embodiment is to be accommodated.
Figure 1B:
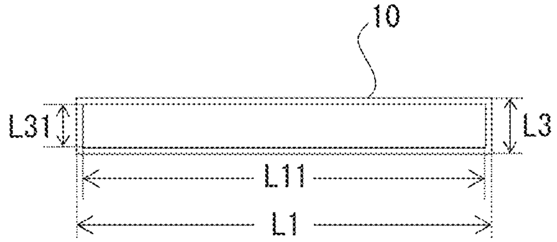
FIG. 1B is a cross-sectional view of one side portion of FIG. 1A.

FIG. 1A illustrates an example of a shape of the case body. FIG. 1B is a cross-sectional view of one side portion (a vertical side L1 in this example) of FIG. 1A. A case body 10 is an example of a case having a vertical side L1 of about 90 mm, a horizontal side L2 of about 90 mm, and a depth L3 of about 13 mm. As illustrated in FIG. 1B, the case 10 is in an internal size of about 87 mm in inner side L11 of the vertical side L1, and about 10 mm in inner depth L31. The case body is sealed with the cover body after the antenna unit is accommodated in the case body. On a mounting portion of the case body, one of plural prepared holding parts (not illustrated) is mounted according to a shape on a plane of a dashboard, for example.

Figure 2A:
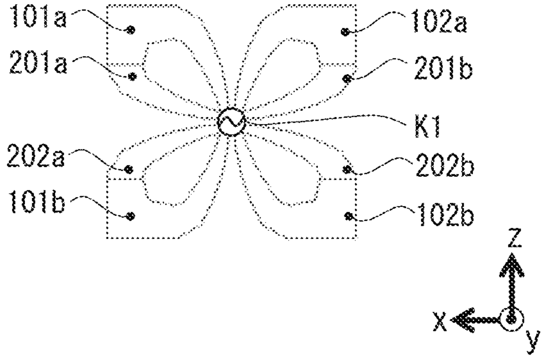
FIG. 2A is a front view of the antenna unit of the first embodiment.
Figure 2B:
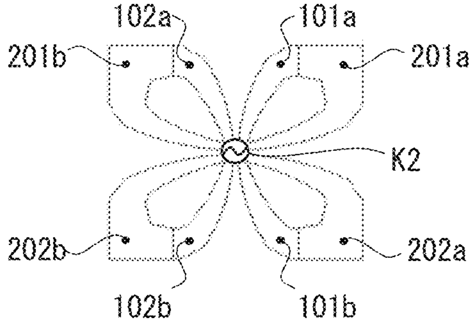
FIG. 2B is a rear view of the antenna unit of the first embodiment.
Figure 2C:
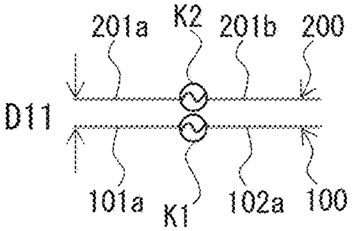
FIG. 2C is a top view of the antenna unit of the first embodiment.
Figure 2D:
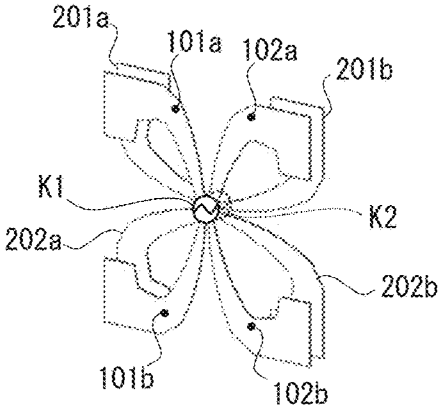
FIG. 2D is a perspective view of the antenna unit of the first embodiment.

The antenna unit to be accommodated in the case body 10 will be described. FIGS. 2A to 2D each are a diagram illustrating a configuration example of the antenna unit. FIG. 2A is a front view, FIG. 2B is a rear view of FIG. 2A, FIG. 2C is a top view, and FIG. 2D is a perspective view. For convenience, an orthogonal coordinate system including x, y, and z axes is defined. The antenna unit includes a pair of first elements that are arranged on a first plane 100, and a pair of second elements that are arranged on a second plane 200 parallel to the first plane 100 so that a polarized wave direction of the pair of second elements is orthogonal to that of the pair of first elements. Each configuration of the pair of first elements and the pair of second elements will be described with reference to FIGS. 3A and 3B.

A predetermined portion of each element (in the illustrated example, portions on the respective pair of first elements that are closest to each other and portions on the respective pair of second elements that are closest to each other) is a portion to which a feed point is connectable. Such a portion is referred to as a "proximal end portion." When it is particularly necessary to distinguish between proximal end portions of the pair of first elements and proximal end portions of the pair of second elements, the former may be referred to as "first proximal end portions," and the later may be referred to as "second proximal end portions." One of the pair of first elements (for convenience, referred to as "one first element") includes two arms 101*a* and 102*a* that extend in a direction away from the corresponding first proximal end portion, and open end portions are formed at respective distal ends of the arms 101*a* and 102*a*.

The other of the pair of first elements (for convenience, referred to as "the other first element") also includes two arms 101*b* and 102*b* that extend in a direction away from the corresponding first proximal end portion, and open end portions are formed at respective distal ends of the arms 101*b* and 102*b*. Each of the two arms (for example, 101*a* and 102*a*) included in the one first element has a width that is continuously or gradually increased as being away from the first proximal end portion. That is, each width is larger in a region far from the first proximal end portion than in a region close to the first proximal end portion. Additionally, a facing distance between the two arms is continuously or gradually increased as being away from the first proximal end portion. That is, the facing distance between the two arms is larger in the region far from the first proximal end portion than in the region close to the first proximal end portion. This is to cause the arms 101*a* and 102*a* to act as a self-similarity antenna such as a biconical antenna or a bow-tie antenna or an antenna that acts based on similar operating principle to the self-similarity antenna.

The similar applies to the two arms (for example, 101*b* and 102*b*) of the other first element. Additionally, the two arms (for example, 101*a* and 102*a*) included in the one first element extend in directions away from each other from the two arms (for example, 101*b* and 102*b*) included in the other first element.

The pair of second elements have shape and structure similar to those of the pair of first elements. That is, one of the pair of second elements (for convenience, referred to as "one second element") includes two arms 201*a* and 202*a* that extend in a direction away from the corresponding second proximal end portion, and open end portions are formed at respective distal ends of the arms 201*a* and 202*a*. Each of the two arms (for example, 201*a* and 202*a*) included in the one second element has a width that is continuously or gradually increased as being away from the second proximal end portion. That is, each width is larger in a region far from the second proximal end portion than in a region close to the second proximal end portion. Additionally, a facing distance between the two arms is continuously or gradually increased as being away from the second proximal end portion. That is, the facing distance between the two arms is larger in the region far from the second proximal end portion than in the region close to the second proximal end portion. This is to cause the arms 201*a* and 202*a* to act as a self-similarity antenna such as a biconical antenna or a bow-tie antenna or an antenna that acts based on similar operating principle to the self-similarity antenna. The similar applies to two arms (for example, 201*b* and 202*b*) of the other second element. Additionally, the two arms (for example, 201*a* and 202*a*) included in the one second element extend in directions away from each other from the two arms (for example, 201*b* and 202*b*) included in the other second element.

Next, arrangements of the pair of first elements and the pair of second elements will be described. A midpoint of a distance between the first proximal end portion of the one first element and the first proximal end portion of the other first element is referred to as a first center portion. Additionally, an approximate midpoint of a distance between the second proximal end portion of the one second element and the proximal end portion of the other second element is referred to as a second center portion. The first center portion is a feed point K1 for the first elements, and the second center portion is a feed point K2 for the second elements. The first center portion and the second center portion overlap each other when viewed from the plane (for example, the front side or the rear side).

The pair of second elements are arranged to face the pair of first elements in a state in which the pair of second elements are turned by approximately 90 degrees from a position at which a second center portion is aligned with the first center position while maintaining a space D11. Therefore, split rings (each having a ring shape in which a portion thereof is cut so that the split portions face each other) are formed between the first elements and the second elements facing one another. The polarized wave direction of the first elements is orthogonal to that of the second elements. That is, for example, when the polarized wave direction of the first elements is perpendicular (perpendicularly polarized wave), the polarized wave direction of the second elements is horizontal (horizontally polarized wave). Conversely, when the polarized wave direction of the first elements is horizontal (horizontally polarized wave), the polarized wave direction of the second elements is perpendicular (perpendicularly polarized wave).

The term “approximately 90 degrees” means that it is not necessarily strictly 90 degrees.

A size obtained by connecting outer edges (outer edge size) of the first elements is similar to an outer edge size of the second elements. Therefore, the outer edge size is the same before and after turning of the pair of second elements. Each element is, for example, a conductive plate having a thickness of 0.5 mm, and the outer edge size is a size enough to be accommodated in the accommodation space of the case body 10 illustrated in FIG. 1. In one example, the outer edge size of each element is about 87 mm×about 87 mm×about 10 mm. The space D11 between the first plane 100 and the second plane 200 corresponds to an inner depth L31 of the above-described case body 10, that is, is about 9 mm.

Figure 3A:
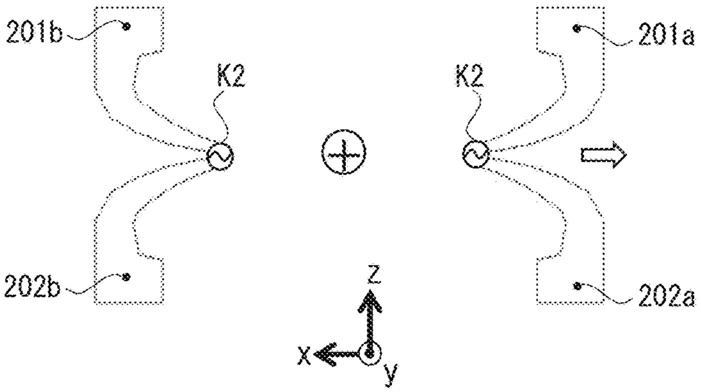
FIG. 3A is an illustrative diagram of one and the other of second elements.
Figure 3B:
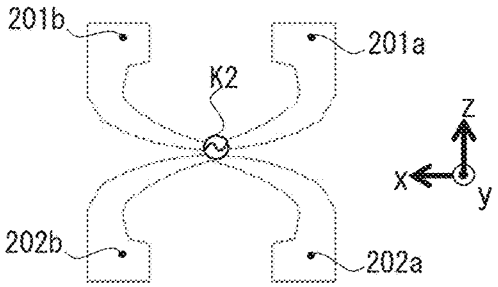
FIG. 3B is an illustrative diagram of a pair of second elements.

Next, each element structure of the pair of first elements and the pair of second elements will be described in detail. FIGS. 3A and 3B each are a diagram illustrating a structure example of the second elements. The pair of second elements are configured as illustrated in FIG. 3B, by joining or integrally forming the two arms 201*a* and 202*a* included in the one second element and the two arms 201*b* and 202*b* included in the other second element symmetrically about the second proximal end portions (feed point K2) as illustrated in FIG. 3A.

A portion from each of the arms 201*a*, 202*a*, 201*b*, and 202*b* to the corresponding distal end is an open end. The portion of the distal end is referred to as an “open end portion.” Each open end portion is formed so that the first element and the second element each mainly have a certain area or more to secure a low frequency band (to allow use in a lower frequency band). In this example, the open end portion is formed in an L shape. However, the shape of the open end portion is not limited to an L shape, and may be a trapezoid, a rhombus, an oval, a circle, a triangle, or the like.

Each of the two arms 201*a* and 202*a* included in the one second element and the two arms 201*b* and 202*b* included in the other second element has a width that is continuously or gradually increased in a region from the corresponding second proximal end portion to the corresponding open end portion, as being away from the corresponding second proximal end portion. That is, each of the two arms 201*a* and 202*a* included in the one second element and the two arms 201*b* and 202*b* included in the other second element is configured so that the width is larger in a region far from the corresponding second proximal end portion and close to the corresponding open end portion than in a region close to the corresponding second proximal end portion and far from the corresponding open end portion. Additionally, the facing distance between the two arms 201*a* and 202*a* included in the one second element and the facing distance between the two arms 201*b* and 202*b* included in the other second element are continuously or gradually increased as being away from the respective second proximal end portions. That is, each of the facing distance between the two arms 201*a* and 202*a* included in the one second element and the facing distance between the two arms 201*b* and 202*b* included in the other second element is larger in the region far from the corresponding second proximal end portion than in the region close to the corresponding second proximal end portion. Such a configuration enables the second elements to act as a self-similarity antenna such as a biconical antenna or a bow-tie antenna or an antenna that acts based on similar operating principle to the self-similarity antenna. In this way, the two arms 201*a* and 202*a* included in the one second element and the two arms 201*b* and 202*b* included in the other second element form substantially V shapes, respectively, together with the respective second proximal end portions.

The pair of first elements also have the element structure similar to that in FIGS. 3A and 3B.

Figure 4A:
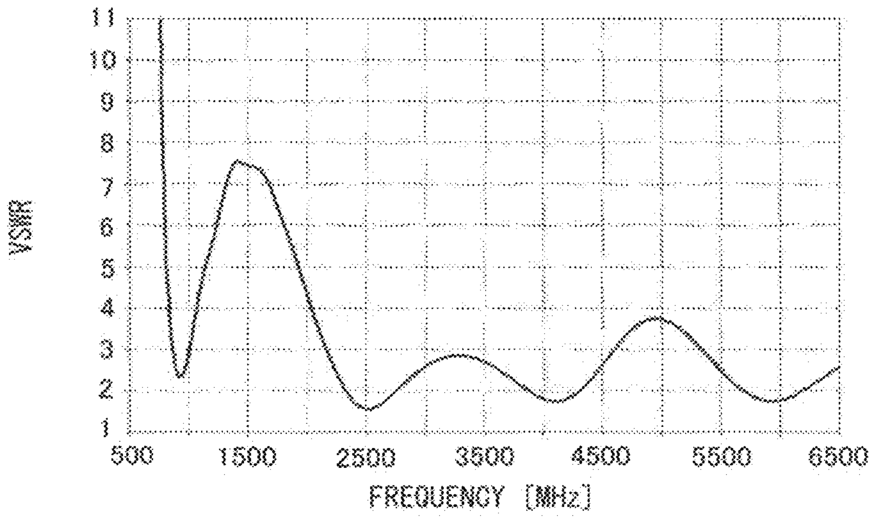
FIG. 4A is a graph showing a VSWR characteristic of one element.
Figure 4B:
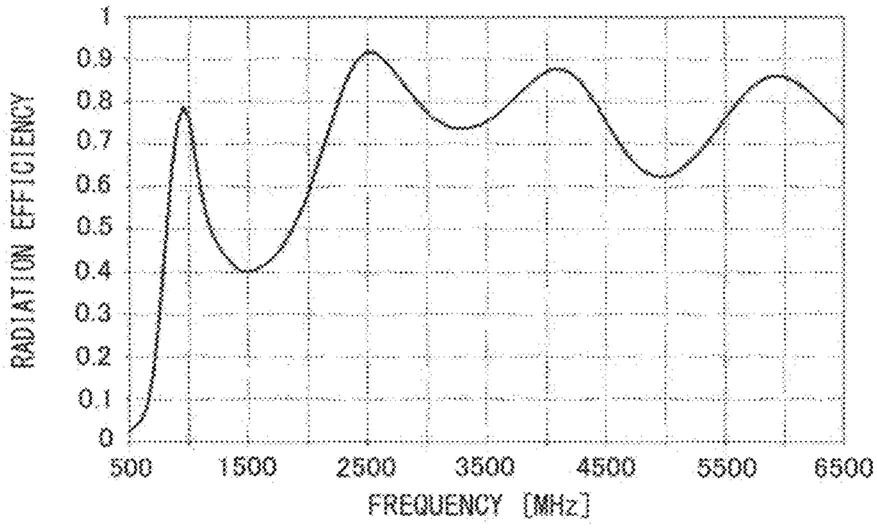
FIG. 4B is a graph showing a radiation efficiency characteristic of one element.
Figure 4C:
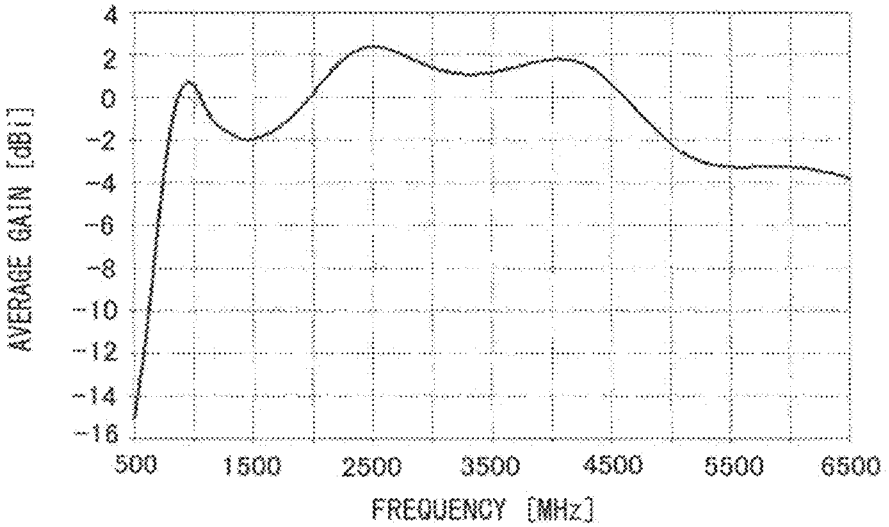
FIG. 4C is a graph showing an average gain characteristic in a horizontal plane of the antenna of FIG. 3A.

FIGS. 4A to 4C each show antenna characteristics in the case where the one second element (for example, the two arms 201*a* and 202*a*) of FIG. 3A is used alone as an antenna. FIG. 4A is a graph showing a VSWR characteristic, FIG. 4B is a graph showing a radiation efficiency characteristic, and FIG. 4C is a graph showing an average gain characteristic in a horizontal plane (x-y plane) of the antenna of FIG. 3A. In each of the graphs, the horizontal axis represents a frequency (MHz). The average gain is an average gain in the horizontal plane (the similar shall apply hereinafter). As shown in FIGS. 4A and 4B, when only the second element is used alone as an antenna, an operation as a resonant antenna is dominant in the vicinity of about 900 MHz, and an operation as a non-resonant antenna is dominant at about 2500 MHz or more. As can be seen in FIG. 4C, the average gain is about −2 dBi or more in a frequency band of about 900 MHz to 4500 MHz, which is in a practically usable level comparable to the MIMO antenna device disclosed in Patent Literature 1.

Figure 5A:
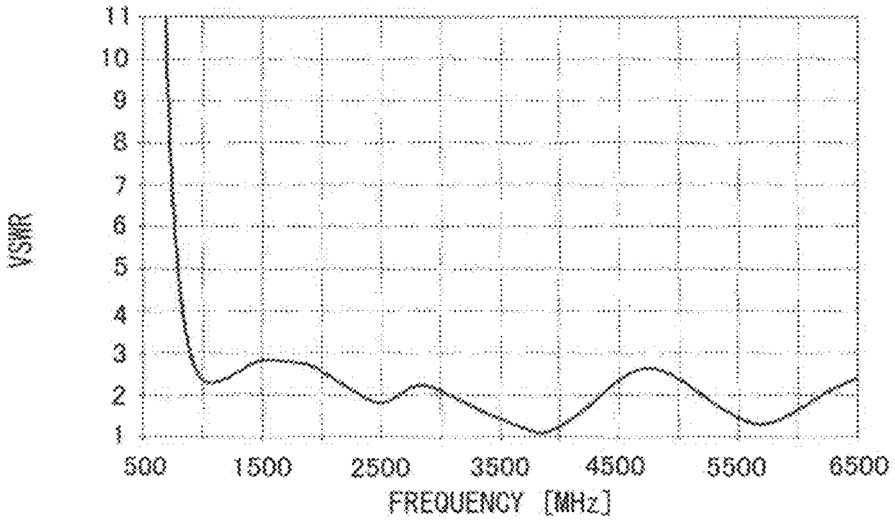
FIG. 5A is a graph showing a VSWR characteristic of two elements.
Figure 5B:
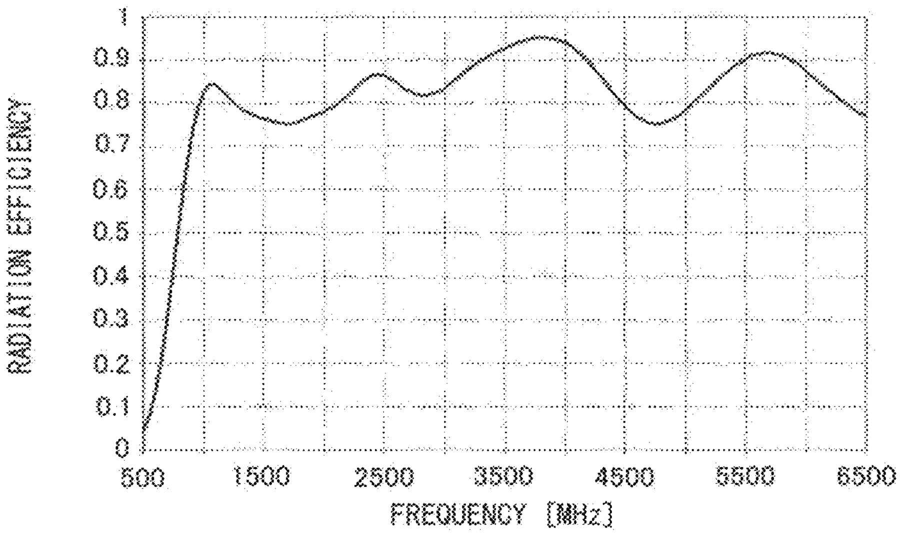
FIG. 5B is a graph showing a radiation efficiency characteristic of two elements.
Figure 5C:
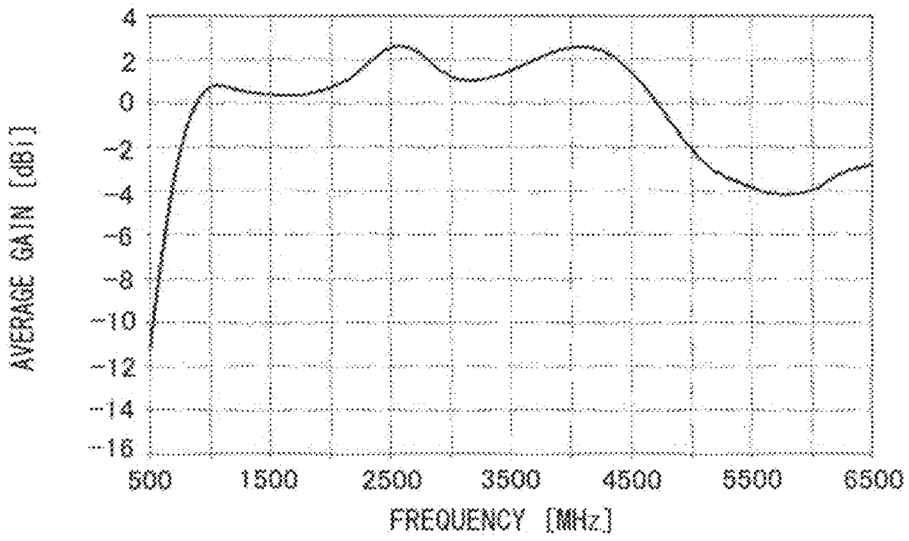
FIG. 5C is a graph showing an average gain characteristic in a horizontal plane of the antenna of FIG. 3B.

FIGS. 5A to 5C show antenna characteristics in the case where the pair of second elements illustrated in FIG. 3B are acted as antennas. FIG. 5A is a graph showing a VSWR characteristic, FIG. 5B is a graph showing a radiation efficiency characteristic, and FIG. 5C is a graph showing an average gain characteristic in the horizontal plane (x-y plane) of the antenna of FIG. 3B. In each of the graphs, the horizontal axis represents a frequency (MHz). As can be seen in FIGS. 5A to 5C, in the case where the pair of second elements are acted as antennas, the VSWR, the radiation efficiency, and the average gain (dBi) in the vicinity of a frequency of about 1500 MHz are more significantly improved than the case where one second element illustrated in FIG. 3A is used. The similar antenna characteristics can be obtained with respect to the pair of first elements.

Next, the antenna characteristics of the antenna unit configured as illustrated in FIGS. 2A to 2D will be described. In the antenna unit, the pair of second elements face the pair of first elements in a state in which the pair of second elements are turned by approximately 90 degrees from a position at which the second proximal end portions are aligned with the first proximal end portions while maintaining the space D11. That is, the split rings are formed between the first elements and the second elements facing one another. Therefore, the frequency band expands to the low frequency side, whereby the antenna unit can act as a broadband antenna. The polarized wave of the first elements is orthogonal to that of the second elements. For example, when the polarized wave of the first elements is a perpendicularly polarized wave, the polarized wave of the second elements is a horizontally polarized wave. Conversely, when the polarized wave of the first elements is a horizontally polarized wave, the polarized wave of the second elements is a perpendicularly polarized wave. Therefore, the mutual interference can be reduced. For example, the isolation can be more significantly improved than the case where the second proximal end portions are not turned.

Figure 6A:
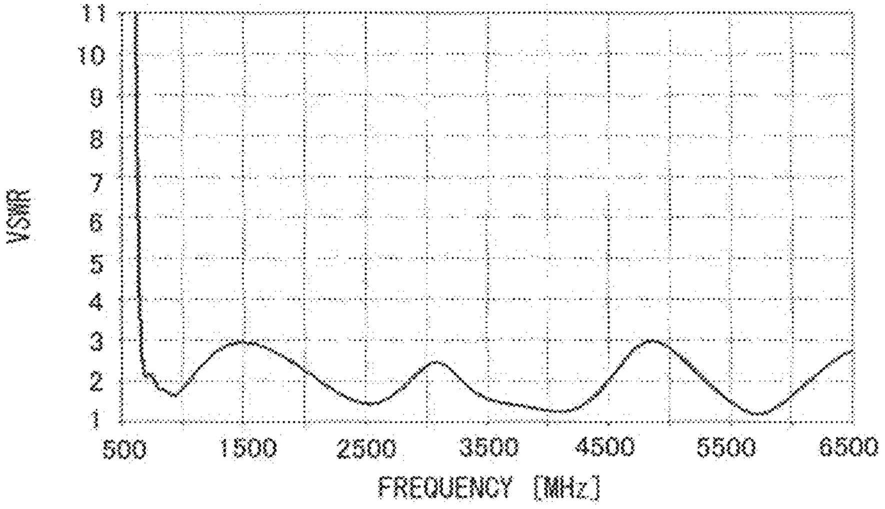
FIG. 6A is a graph showing a VSWR characteristic of a feed point K1 in the first embodiment.
Figure 6B:
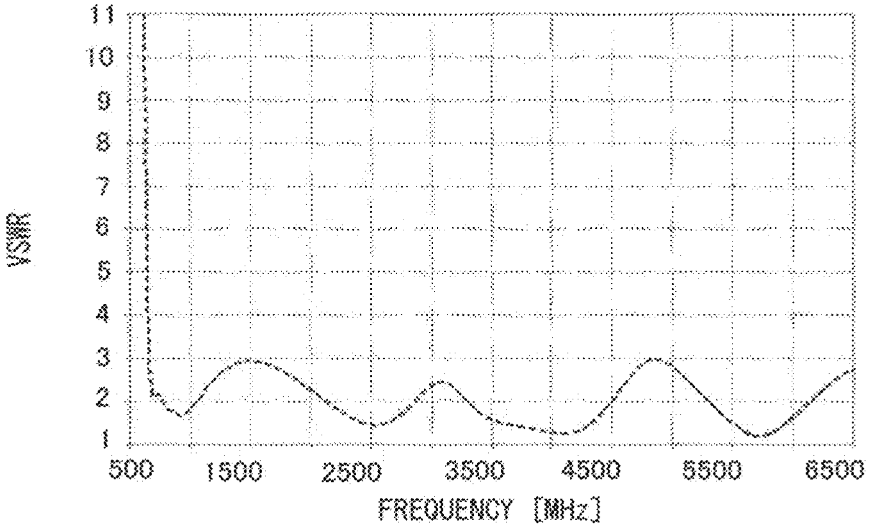
FIG. 6B is a graph showing a VSWR characteristic of a feed point K2 in the first embodiment.

Hereinafter, the characteristic example of the antenna unit of the first embodiment will be specifically described. FIG. 6A is a graph showing a VSWR characteristic of the feed point K1, and FIG. 6B is a graph showing a VSWR characteristic of the feed point K2. In each of the graphs, the horizontal axis represents a frequency (MHz). According to the antenna unit of the first embodiment, an available frequency band of a reception wave or a transmission wave expands to the low frequency side.

Figure 7A:
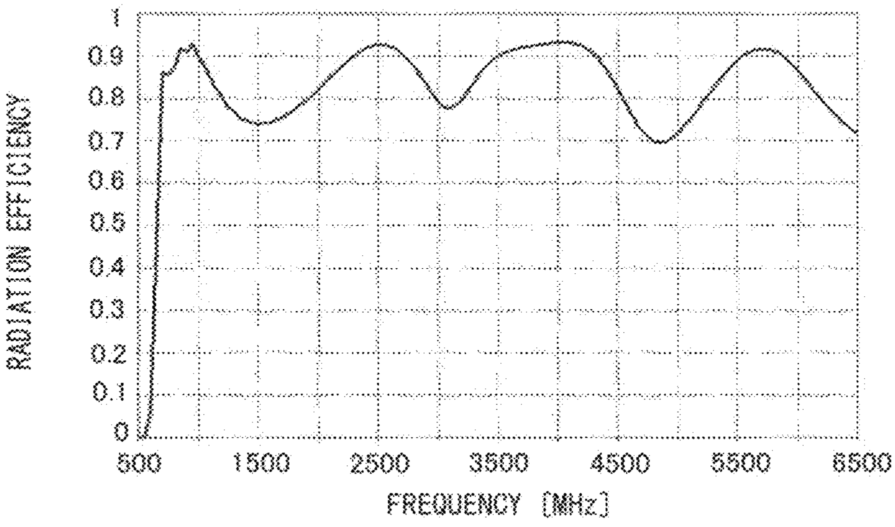
FIG. 7A is a graph showing a radiation efficiency characteristic of the feed point K1 in the first embodiment.
Figure 7B:
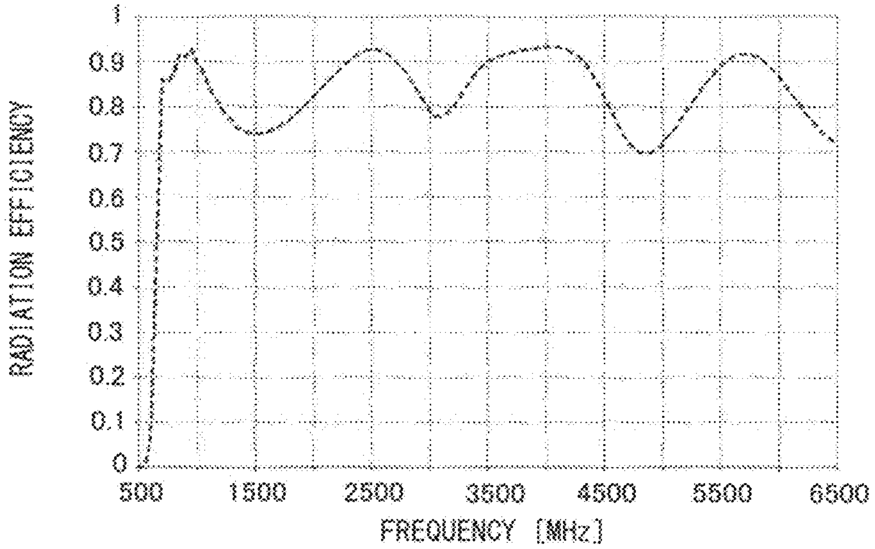
FIG. 7B is a graph showing a radiation efficiency characteristic of the feed point K2 in the first embodiment.

FIG. 7A is a graph showing a radiation efficiency characteristic of the feed point K1, and FIG. 7B is a graph showing a radiation efficiency characteristic of the feed point K2. In each of the graphs, the horizontal axis represents a frequency (MHz). In the antenna unit of the first embodiment, the radiation efficiency in the vicinity of 698 MHz is about 0.85 (in the example of FIG. 4B, about 0.17, and in the example of FIG. 5B, about 0.3). It is found that the available frequency expands in the lower frequency direction.

Figure 8A:
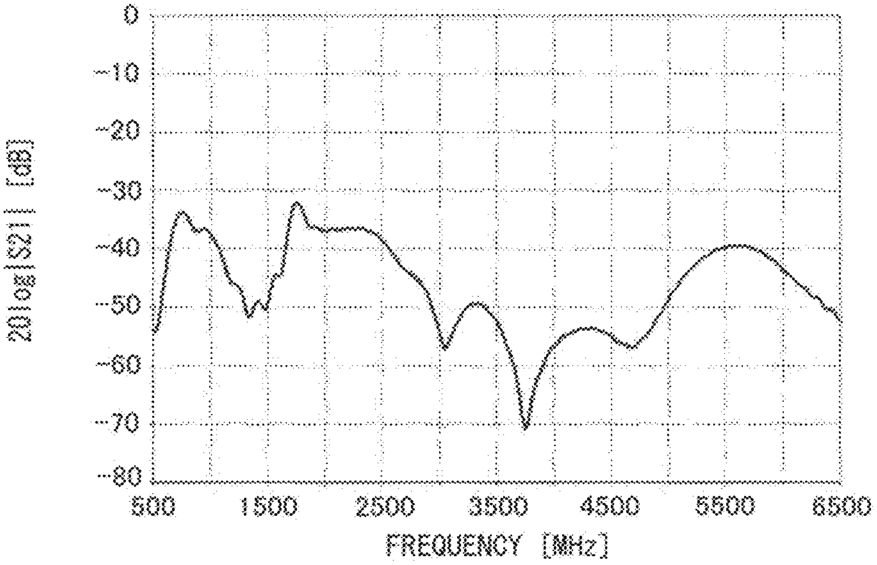
FIG. 8A is a graph showing a passing power characteristic from the feed point K1 to the feed point K2 in the first embodiment.
Figure 8B:
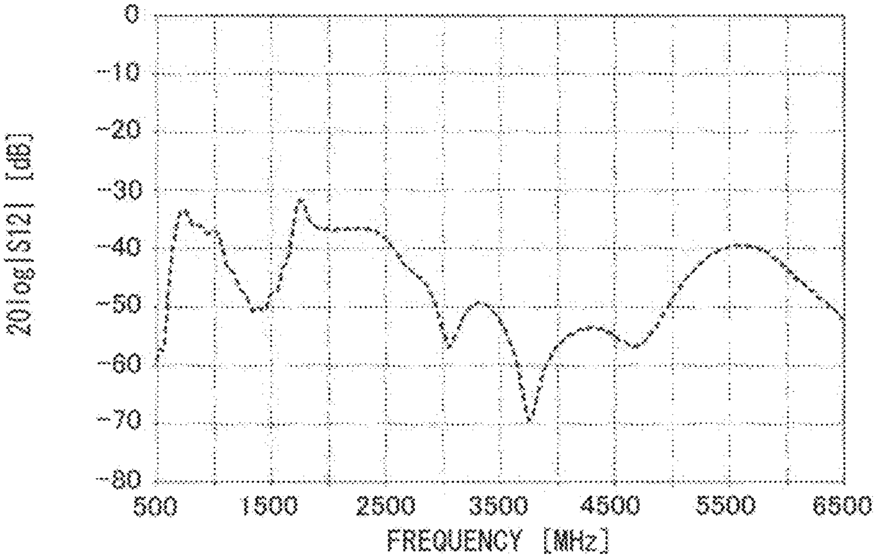
FIG. 8B is a graph showing a passing power characteristic from the feed point K2 to the feed point K1 in the first embodiment.

FIG. 8A is a graph showing a passing power characteristic from the feed point K1 to the feed point K2, and FIG. 8B is a graph showing a passing power characteristic from the feed point K2 to the feed point K1. The vertical axis of FIG. 8A represents 20 Log|S21| (dB), the vertical axis of FIG. 8B represents 20 Log|S12| (dB), and each horizontal axis of FIGS. 8A and 8B represents a frequency (MHz). "S21" is an S parameter representing a transmission coefficient from the feed point K1 for the first elements to the feed point K2 for the second elements, and "20 Log|S21|" represents the passing power characteristic in decibels. Additionally, "S12" is an S parameter representing a transmission coefficient from the feed point K2 for the second elements to the feed point K1 for the first elements, and "20 Log|S12|" represents the passing power characteristic in decibels.

In the antenna unit of the first embodiment, the isolation between the feed point K1 and the feed point K2 is about −30 dB to about −70 dB or less over a wide frequency band from 698 MHz and frequencies before and after 698 MHz to about 6 GHz and frequencies equal to or more than about 6 GHz. That is, the interference between the antennas is extremely small while the feed point K1 and the feed point K2 are close to each other.

The antenna unit of the first embodiment is installed on the z-plane that extends vertically upward with respect to the x-y plane parallel to the ground, but the present inventors have verified how much the antenna characteristics change when the antenna unit is inclined by a predetermined angle on the z-plane.

Figure 9A:
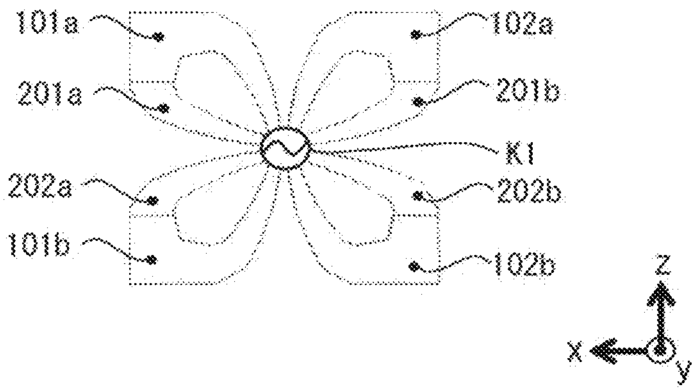
FIG. 9A is a front view of the antenna unit of the first embodiment.
Figure 9B:
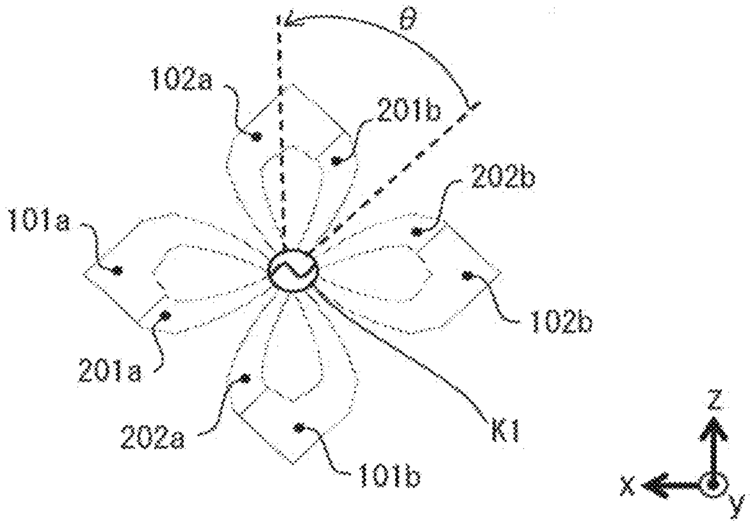
FIG. 9B is a front view illustrating a state in which the antenna unit of the first embodiment is inclined by a predetermined angle.
Figure 10A:
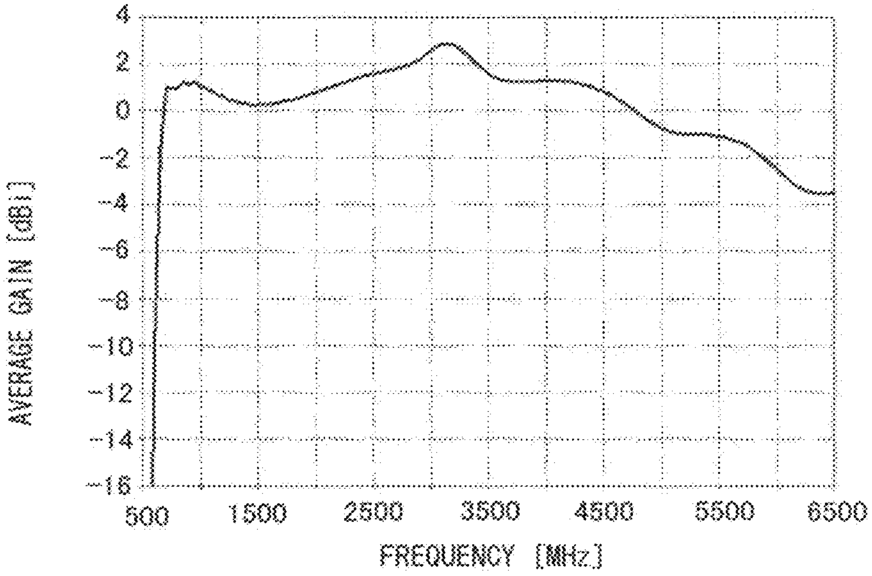
FIG. 10A is a graph showing an average gain characteristic in the horizontal plane of the feed point K1 in an arrangement of FIG. 9A.
Figure 10B:
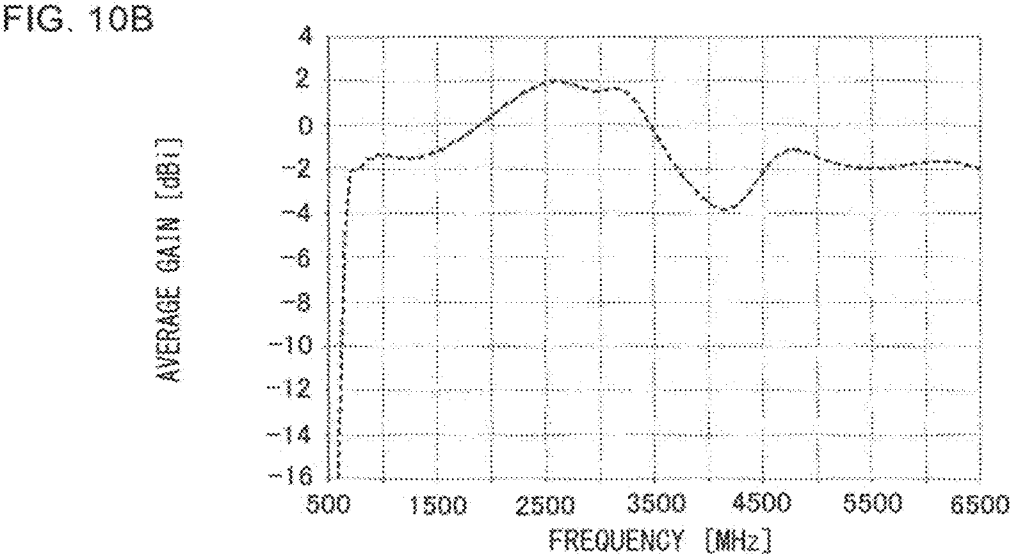
FIG. 10B is a graph showing an average gain characteristic in the horizontal plane of the feed point K2 in the arrangement of FIG. 9A.

FIG. 9A is a front view of the antenna unit of the embodiment, and is the same as FIG. 2A. FIG. 9B is a diagram illustrating a state in which the antenna unit is inclined by a predetermined angle θ, for example, by approximately 45 degrees in the counterclockwise direction. FIG. 10A is a graph showing an average gain characteristic in the horizontal plane (x-y plane) of the feed point K1 in the arrangement of FIG. 9A. FIG. 10B is a graph showing an average gain characteristic in the horizontal plane (x-y plane) of the feed point K2 in the arrangement of FIG. 9A. In each of the graphs, the vertical axis represents an average gain (dBi), and the horizontal axis represents a frequency (MHz). In the pair of first elements, for example, the average gain in the vicinity of 698 MHz is about 1 dBi, and for example, the average gain in the vicinity of 6 GHz is about −3 dBi. The gain variation within the above-described frequency range is smaller than that shown in FIGS. 4C and 5C. In the pair of second elements, for example, the average gain in the vicinity of 698 MHz is about −2 dBi, and for example, the average gain in the vicinity of 6 GHz is −2 dBi. The average gain variation within the above-described frequency range is also smaller than that shown in FIGS. 4C and 5C.

Figure 11A:
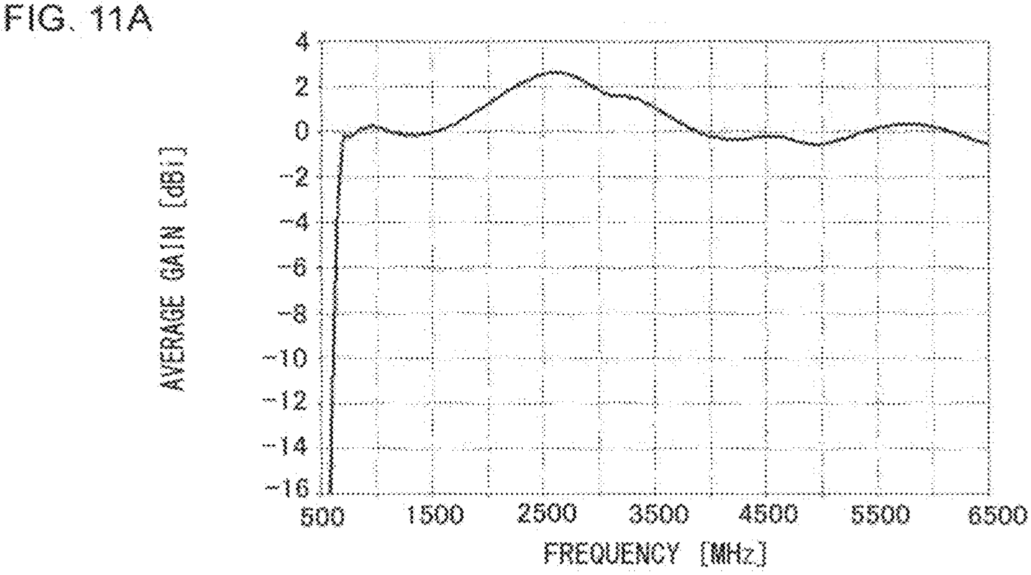
FIG. 11A is a graph showing an average gain characteristic in the horizontal plane of the feed point K1 in an arrangement of FIG. 9B.
Figure 11B:
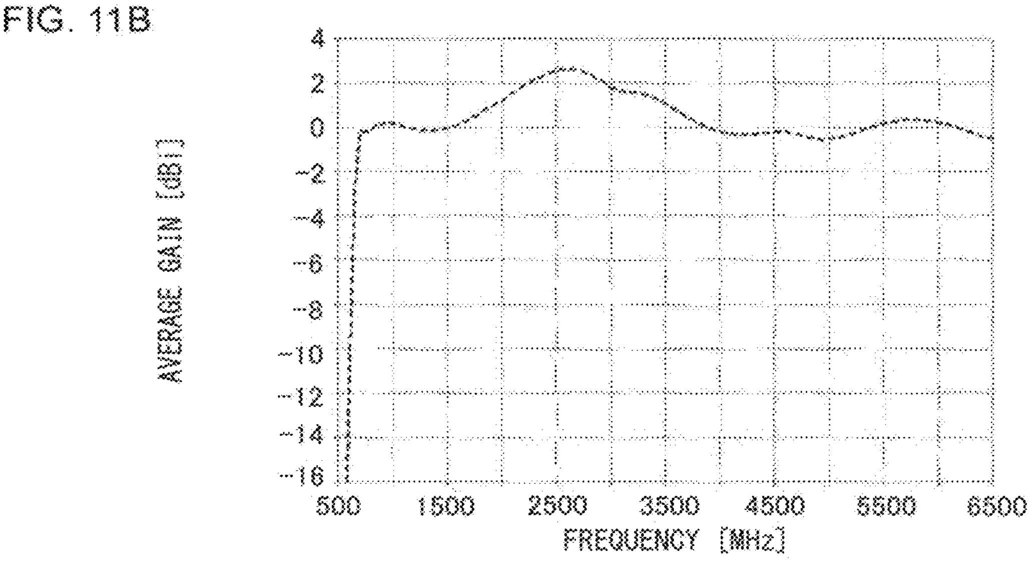
FIG. 11B is a graph showing an average gain characteristic in the horizontal plane of the feed point K2 in the arrangement of FIG. 9B.

FIG. 11A is a graph showing an average gain characteristic in the horizontal plane (x-y plane) of the feed point K1 when the antenna unit is inclined, that is, in a state of FIG. 9B. FIG. 11B is a graph showing an average gain characteristic in the horizontal plane (x-y plane) of the feed point K2 in a state of FIG. 9B. As compared with FIGS. 10A and 10B, in both of the first elements and the second elements, the gain in the frequency band of 5 GHz or more is higher than that before turning of the antenna unit. Additionally, the difference between the maximum value and the minimum value of the gain is about 6 dB before turning of the antenna unit, whereas it is reduced to about 4 dB in the turned state. That is, it is found that when the antenna unit is inclined by approximately 45 degrees and fixed, the average gain variation can be reduced while increasing the average gain.

The term "approximately 45 degrees" means that it is not necessarily strictly 45 degrees.

Figure 12A:
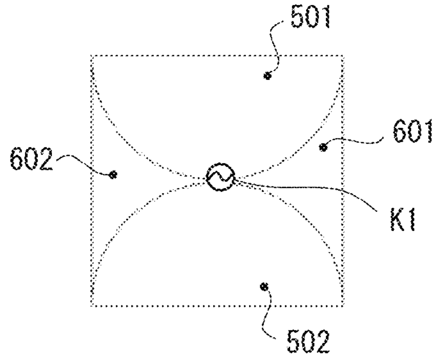
FIG. 12A is a front view of an antenna unit of the comparative example.
Figure 12B:
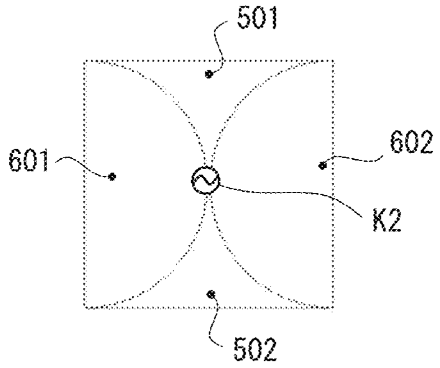
FIG. 12B is a rear view of the antenna unit of the comparative example.
Figure 12C:
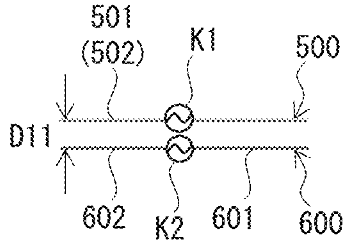
FIG. 12C is a top view of the antenna unit of the comparative example.
Figure 12D:
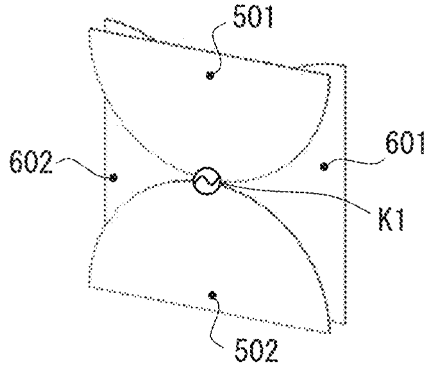
FIG. 12D is a perspective view of the antenna unit of the comparative example.

Here, to describe the characteristic operation of the antenna unit of the first embodiment, an antenna unit in a comparative example which has a structure similar to that of the antenna unit of the first embodiment will be described. FIG. 12A is a front view of the antenna unit of the comparative example, FIG. 12B is a rear view of the antenna unit of the comparative example, FIG. 12C is a top view of the antenna unit of the comparative example, and FIG. 12D is a perspective view of the antenna unit of the comparative example. The antenna unit of the comparative example includes a pair of first bow-tie antennas and a pair of second bow-tie antennas, each which has the same frequency, material, and longitudinal and lateral sizes as the antenna unit of the first embodiment. The size is a size enough to be accommodated in the case body 10 illustrated in FIG. 1.

The pair of first bow-tie antennas 501 and 502 having a semicircular plate shape are arranged on a first plane 500 so that respective diameter portions thereof face outwardly. The pair of second bow-tie antennas 601 and 602 having a semicircular plate shape are arranged on a second plane 600 so that respective diameter portions thereof face outwardly. The bow-tie antennas are arranged to face the other bow-tie antennas in a state in which the other bow-tie antennas are turned by approximately 90 degrees from a position at which arc portions in which the other bow-tie antennas are closest to each other (for example, arc portions to which the feed point K2 is connected) are aligned with arc portions in which the bow-tie antennas are closest to each other (for example, arc portions to which the feed point K1 is connected) while maintaining the space D11.

Figure 13A:
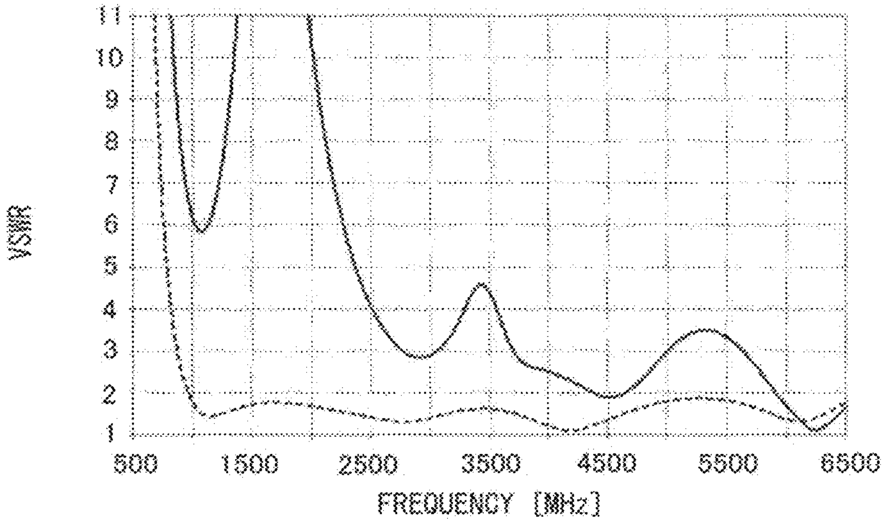
FIG. 13A is a graph showing a VSWR characteristic of the antenna unit of the comparative example.
Figure 13B:
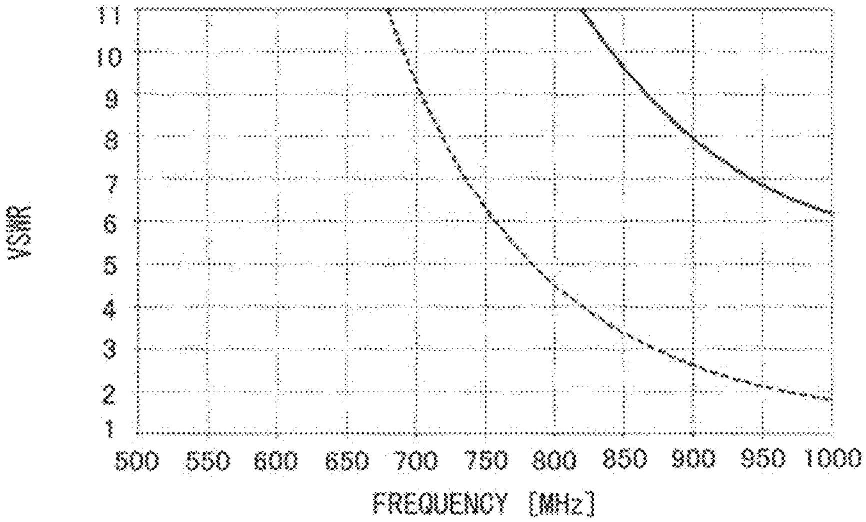
FIG. 13B is an enlarged graph showing a low frequency portion of FIG. 13A.
Figure 14A:
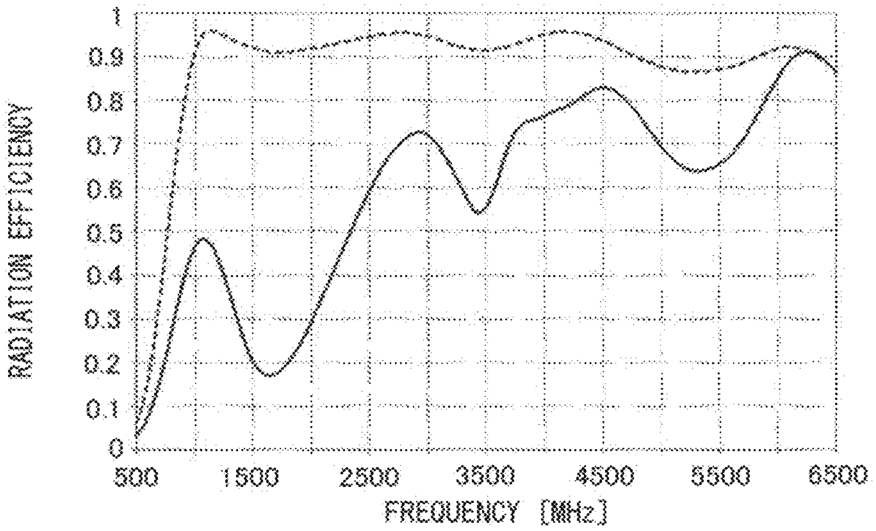
FIG. 14A is a graph showing a radiation efficiency characteristic of the antenna unit of the comparative example.
Figure 14B:
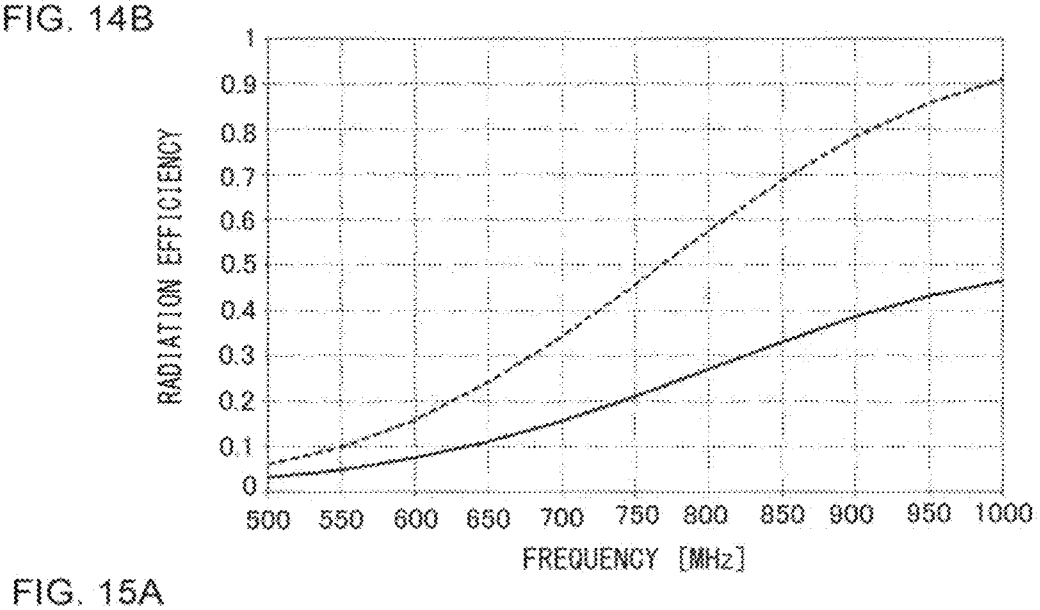
FIG. 14B is an enlarged graph showing a low frequency portion of FIG. 14A.

FIG. 13A is a graph showing a VSWR characteristic of the antenna unit of the comparative example, and FIG. 13B is an enlarged graph showing a low frequency portion of FIG. 13A. FIG. 14A is a graph showing a radiation efficiency characteristic of the antenna unit of the comparative example, and FIG. 14B is an enlarged graph showing a low frequency portion of FIG. 14A. In each of the graphs, the horizontal axis represents a frequency (MHz). The measurement conditions for each characteristic are similar to those of the antenna unit of the first embodiment. A broken line in each graph represents the characteristics in the case where only the pair of first bow-tie antennas 501 and 502 are used, and a solid line in each graph represents the characteristics in the case where the pair of first bow-tie antennas 501 and 502 and the pair of second bow-tie antennas 601 and 602 face each other.

These measurement results show that even only the pair of bow-tie antennas (for example, the first bow-tie antennas 501 and 502) can be used as broadband antennas, and that reduction in the VSWR and the radiation efficiency may be unable to be prevented only by arranging one pair of bow-tie antennas and the other pair of bow-tie antennas to face each other in a state in which the other bow-tie antennas are turned by approximately 90 degrees from a position at which the arc portions in which the other pair of bow-tie antennas are closest to each other are aligned with the arc portions in which the one bow-tie antennas are closest to each other while maintaining the space D11. In particular, in the low frequency band, the VSWR is minimized near 1000 MHz, and specifically, is about 6. The radiation efficiency becomes 0.5 or less.

Second Embodiment

Next, a second embodiment of the present invention will be described. An antenna unit of the second embodiment is similar to the antenna unit of the first embodiment in that a pair of first elements and a pair of second elements are provided, in which respective polarized wave directions are orthogonal to each other, and each element includes a portion that acts as a self-similarity antenna, but is different from the antenna unit of the first embodiment in the shape and structure of each element. However, the antenna unit of the second embodiment has a size similar to the antenna unit of the first embodiment. That is, the case body 10 illustrated in FIG. 1 can also accommodate the antenna unit of the second embodiment. For the convenience of the description, members which correspond to the members of the antenna unit of the first embodiment are described by using the same member names and denoting the same reference numerals thereto.

Figure 15A:
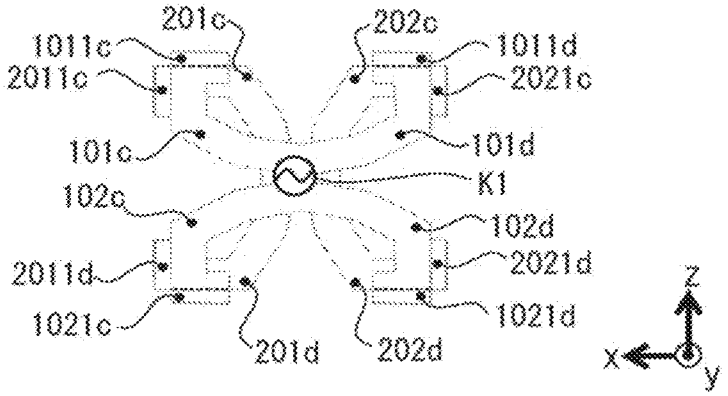
FIG. 15A is a front view of an antenna unit of a second embodiment.
Figure 15B:
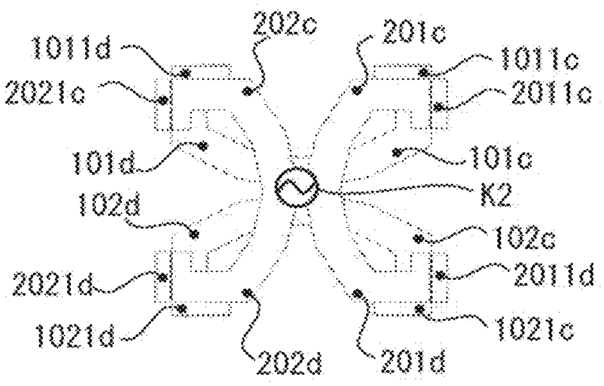
FIG. 15B is a rear view of the antenna unit of the second embodiment.
Figure 15C:
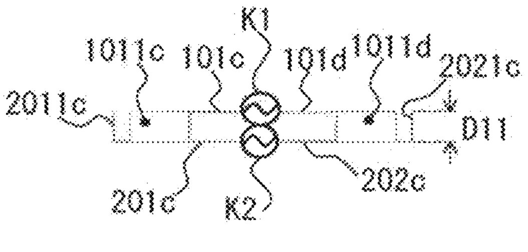
FIG. 15C is a top view of the antenna unit of the second embodiment.
Figure 15D:
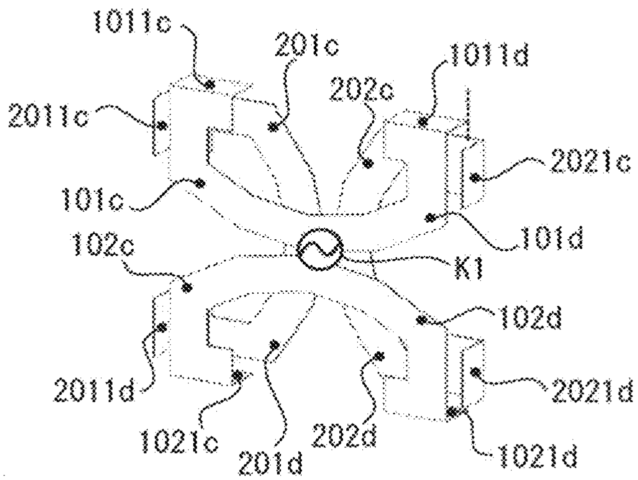
FIG. 15D is a perspective view of the antenna unit of the second embodiment.

FIG. 15A is a front view of the antenna unit according to the second embodiment, FIG. 15B is a rear view of the antenna unit according to the second embodiment, FIG. 15C is a top view of the antenna unit according to the second embodiment, and FIG. 15D is a perspective view of the antenna unit according to the second embodiment. The antenna unit of the second embodiment includes a pair of first elements and a pair of second elements. The pair of second elements face the pair of first elements in a state in which the pair of second elements are turned by approximately 90 degrees from a position at which a second center portion (a portion or port to which a feed point K2 is connected) is aligned with a first center portion (a portion or port to which a feed point K1 is connected) while maintaining a space D11. The outer edge size of the antenna unit is the same before and after turning of the second elements.

The pair of first elements will be described. One first element includes two arms 101*c* and 101*d* that extend in a direction away from each other from a first proximal end portion thereof. The other first element also includes two arms 102*c* and 102*d* that extend in a direction away from each other from a first proximal end portion thereof. The arm 101*c* of the one first element extends in a direction away from the arm 102*c* of the other first element that is closest to the arm 101*c*. The arm 101*d* also extends in a direction away from the arm 102*d* in the similar manner. Each of the one first element and the other first element is arranged symmetrically about a first center portion, and is formed in a substantially C shape when viewed from the front side.

Each of the arms 101*c*, 101*d*, 102*c*, and 102*d* is a conductive plate having a uniform width, and a distal end thereof is an open end portion that is formed in a predetermined shape, for example, an L shape. The open end portion of the arm 101*c* and the open end portion of the arm 101*d* face each other, and the open end portion of the arm 102*c* and the open end portion of the arm 102*d* face each other. Additionally, bent regions 1011*c*, 1011*d*, 1021*c*, and 1021*d* are formed in parts of the respective open end portions. Each of the bent regions 1011*c*, 1011*d*, 1021*c*, and 1021*d* is formed by being bent by approximately 90 degrees in a thickness direction of the antenna unit, that is, a direction toward the second elements which will be described later. This is to reduce the overall size while maintaining the performance.

The pair of second elements will be described. One second element includes two arms 201*c* and 201*d* that extend in a direction away from each other from a second proximal end portion thereof. The other second element also includes two arms 202*c* and 202*d* that extend in a direction away from each other from a second proximal end portion thereof. The arm 201*c* of the one second element extends in a direction away from the arm 202*c* of the other second element that is closest to the arm 201*c*. The arm 201*d* also extends in a direction away from the arm 202*d* in the similar manner. Each of the one second element and the other second element is arranged symmetrically about a second center portion, and is formed in a substantially C shape when viewed from the front side.

Each of the arms 201*c*, 201*d*, 202*c*, and 202*d* is a conductive plate having a uniform width, and a distal end thereof is an open end portion that is formed in a predetermined shape, for example, an L shape. The open end portion of the arm 201*c* and the open end portion of the arm 201*d* face each other, and the open end portion of the arm 202*c* and the open end portion of the arm 202*d* face each other. Additionally, bent regions 2011*c*, 2011*d*, 2021*c*, and 2021*d* are formed in parts of the respective open end portions. Each of the bent regions 2011*c*, 2011*d*, 2021*c*, and 2021*d* is formed by being bent by approximately 90 degrees in a thickness direction of the antenna unit, that is, a direction toward the first elements. This is to reduce the overall size while maintaining the performance.

Similarly to the antenna unit of the first embodiment, also in the antenna unit of the second embodiment, split rings are formed, whereby an available frequency band can expand to the low frequency side.

Figure 16A:
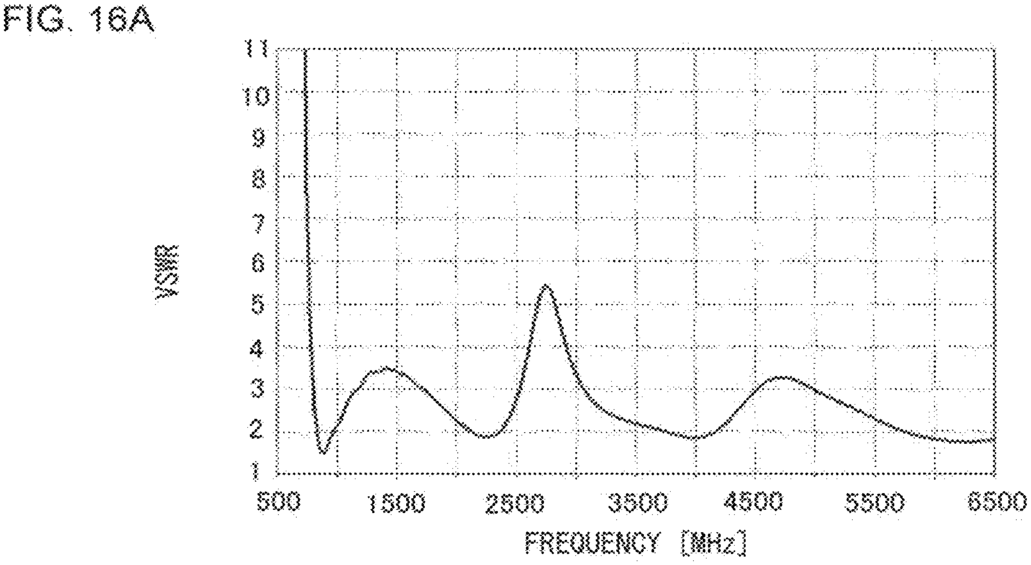
FIG. 16A is a graph showing a VSWR characteristic of a feed point K1 in the second embodiment.
Figure 16B:
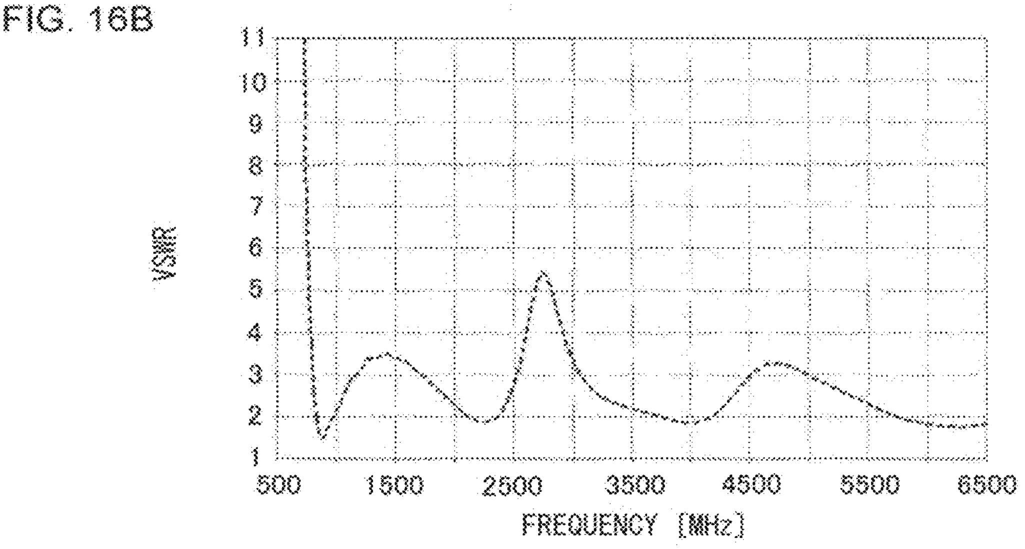
FIG. 16B is a graph showing a VSWR characteristic of a feed point K2 in the second embodiment.
Figure 17A:
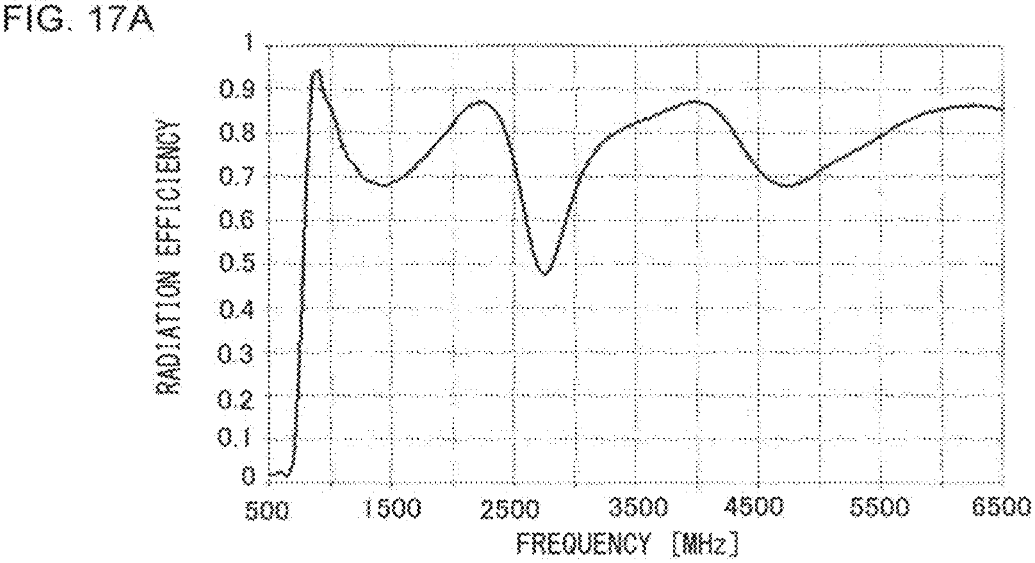
FIG. 17A is a graph showing a radiation efficiency characteristic of the feed point K1 in the second embodiment.
Figure 17B:
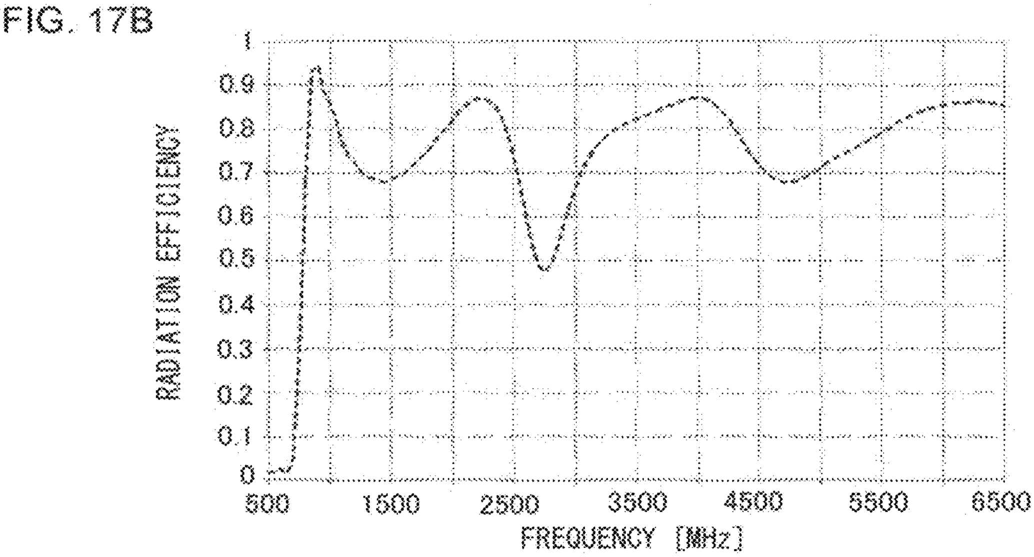
FIG. 17B is a graph showing a radiation efficiency characteristic of the feed point K2 in the second embodiment.
Figure 18A:
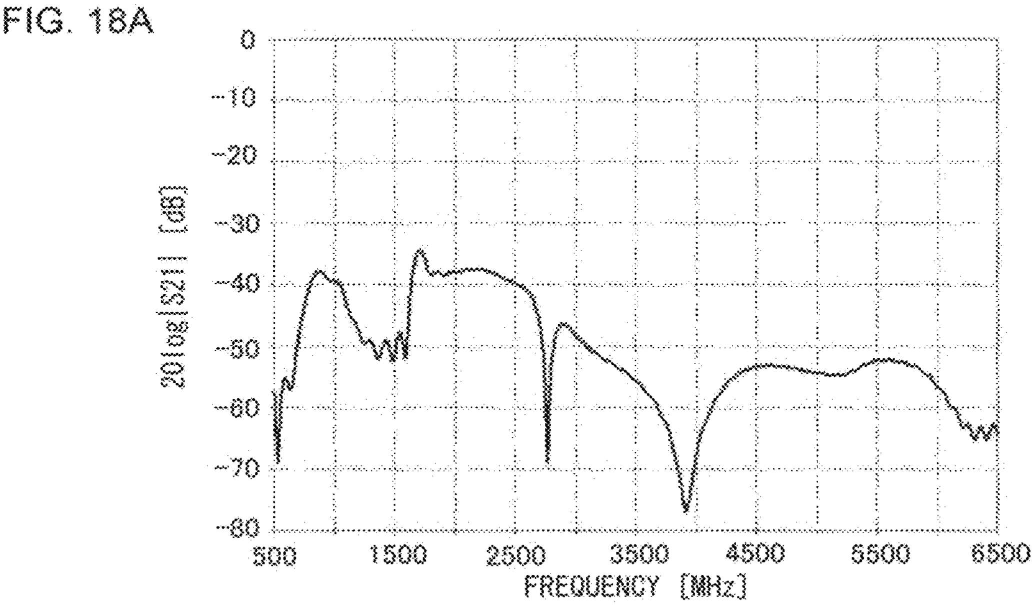
FIG. 18A is a graph showing a passing power characteristic from the feed point K1 to the feed point K2 in the second embodiment.
Figure 18B:
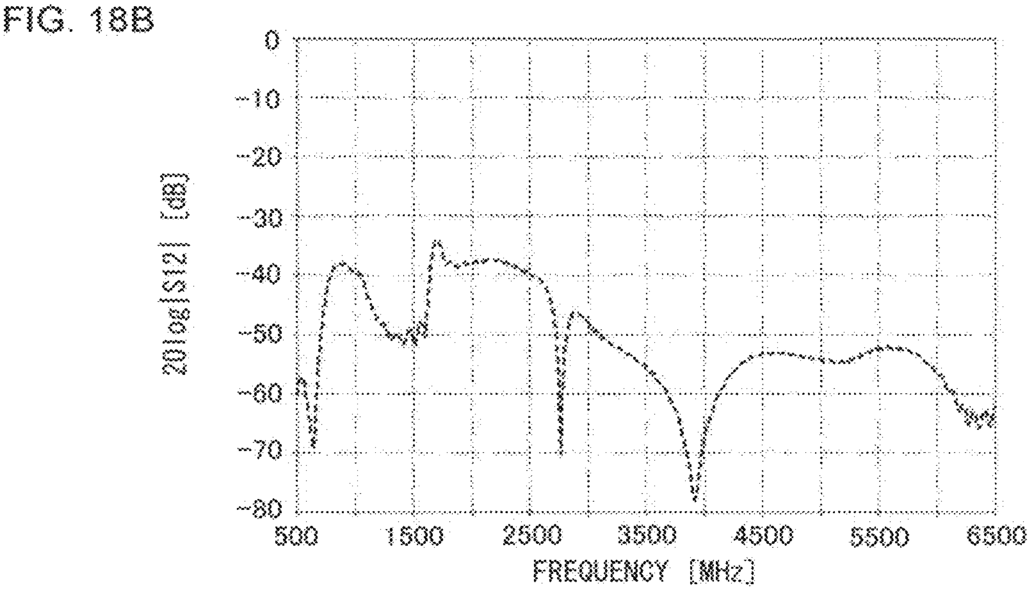
FIG. 18B is a graph showing a passing power characteristic from the feed point K2 to the feed point K1 in the second embodiment.
Figure 19A:
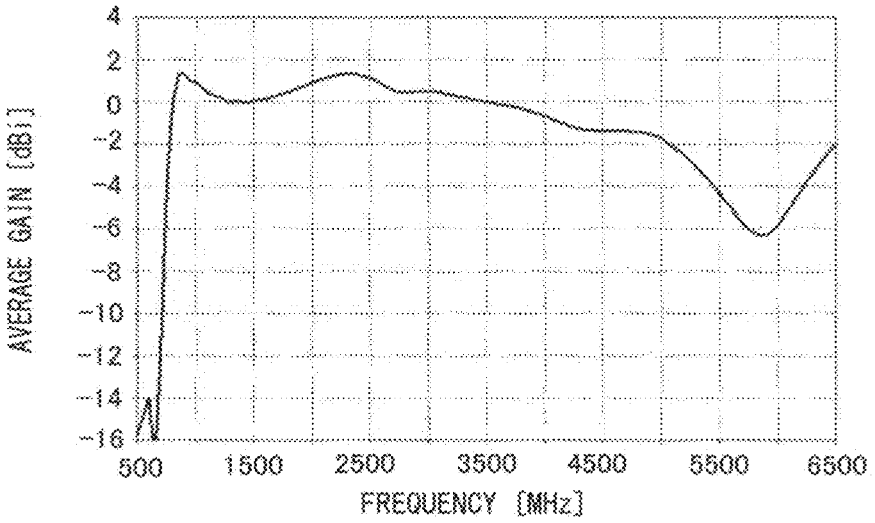
FIG. 19A is a graph showing an average gain characteristic in a horizontal plane of the feed point K1 in the arrangement of FIG. 15A.
Figure 19B:
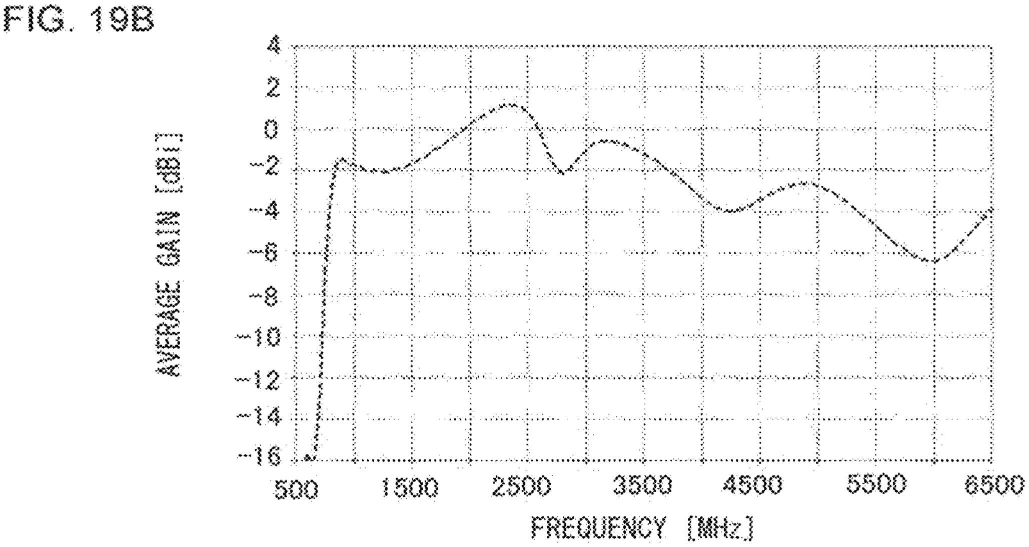
FIG. 19B is a graph showing an average gain characteristic in the horizontal plane of the feed point K2 in the arrangement of FIG. 15A.

FIGS. 16A to 19B each show antenna characteristics of the antenna unit of the second embodiment. FIG. 16A is a graph showing a VSWR characteristic of a feed point K1, and FIG. 16B is a graph showing a VSWR characteristic of a feed point K2. FIG. 17A is a graph showing a radiation efficiency characteristic of the feed point K1, and FIG. 17B is a graph showing a radiation efficiency characteristic of the feed point K2. In each of the graphs, the horizontal axis represents a frequency (MHz). Additionally, FIG. 18A is a graph showing a passing power characteristic from the feed point K1 for the first elements to the feed point K2 for the second elements, and FIG. 18B is a graph showing a passing power characteristic from the feed point K2 for the second elements to the feed point K1 for the first elements. The vertical axis of FIG. 18A represents 20 Log|S21| (dB) described above, the vertical axis of FIG. 18B represents 20 Log|S12| (dB), and each horizontal axis of FIGS. 18A and 18B represents a frequency (MHz). FIG. 19A is a graph showing an average gain characteristic in a horizontal plane (x-y plane) of the feed point K1 in the arrangement of FIG. 15A. FIG. 19B is a graph showing an average gain characteristic in the horizontal plane (x-y plane) of the feed point K2 in the arrangement of FIG. 15A. In each of the graphs, the horizontal axis represents a frequency (MHz).

The bent regions 1011*c*, 1011*d*, 1021*c*, 1021*d*, 2011*c*, 2011*d*, 2021*c*, and 2021*d* may be provided in the antenna unit of the first embodiment. It is confirmed that when the antenna unit of the second embodiment is inclined by approximately 45 degrees and fixed on the Z surface as illustrated in FIG. 15B, the average gain in the horizontal plane (x-y plane) is stably increased.

Third Embodiment

Next, a third embodiment of the present invention will be described. An antenna unit of the third embodiment is similar to the antenna units of the first embodiment and the second embodiment in that a pair of first elements and a pair of second elements are provided, in which respective polarized wave directions are orthogonal to each other, and each element includes a portion that acts as a self-similarity antenna or an antenna that acts based on similar operating principle to the self-similarity antenna, but is different from the antenna unit of the first embodiment in the shape and structure of each element.

As one of the features, in the antenna unit of the third embodiment, the first element and the second element are different from each other in shape, structure, and size. The outer edge size of the antenna unit is formed in a rectangular shape when viewed from the front side. Therefore, the antenna unit has long side portions and short side portions. The antenna case 10 illustrated in FIGS. 1A and 1B has a rectangular parallelepiped shape in which the long side portion is relatively long.

However, for the convenience of the description, members which correspond to the members of the antenna units of the first embodiment and the second embodiment are described by using the same member names and denoting the same reference numerals thereto.

Figure 20A:
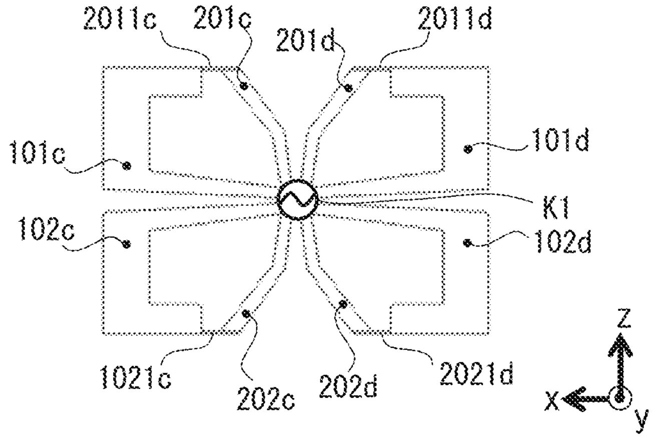
FIG. 20A is a front view of an antenna unit of a third embodiment.
Figure 20B:
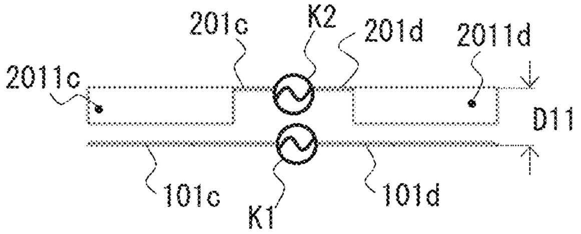
FIG. 20B is a top view of a long side portion of the antenna unit of the third embodiment.
Figure 20C:
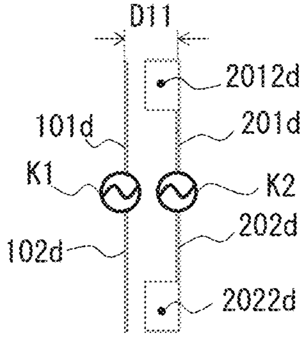
FIG. 20C is a side view of a short side portion of the antenna unit of the third embodiment.
Figure 20D:
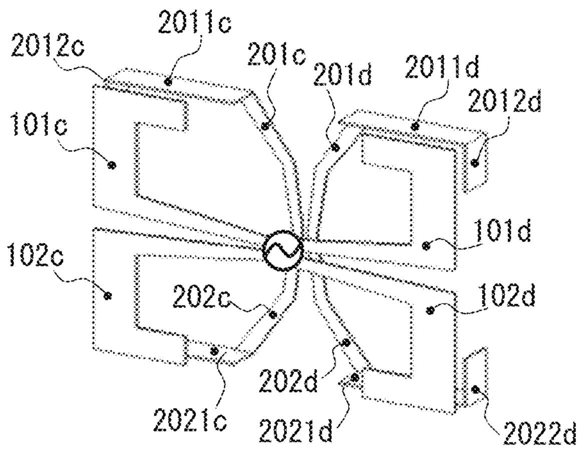
FIG. 20D is a perspective view of the antenna unit of the third embodiment.

FIG. 20A is a front view of the antenna unit according to the third embodiment, FIG. 20B is a side view of the long side portion of the antenna unit according to the third embodiment, FIG. 20C is a side view of the short side portion of the antenna unit according to the third embodiment, and FIG. 20D is a perspective view of the antenna unit according to the third embodiment.

The antenna unit of the third embodiment includes a pair of first elements and a pair of second elements. The pair of second elements face the pair of first elements in a state in which the pair of second elements are turned by approximately 90 degrees from a position at which a second center portion (a portion or port to which a feed point K2 is connected) is aligned with a first center portion (a portion or port to which a feed point K1 is connected) while maintaining a predetermined space. The predetermined space is the same as the space D11 described in the first embodiment.

The pair of first elements will be described. One first element includes two arms 101*c* and 101*d* that extend in a direction away from each other from a first proximal end portion thereof. The other first element includes two arms 102*c* and 102*d* that extend in a direction away from each other from a first proximal end portion thereof. Each of the two arms 101*c* and 101*d* included in the one first element and the two arms 102*c* and 102*d* included in the other first element has a width that is continuously or gradually increased as being away from the corresponding first proximal end portion. That is, each width of the two arms 101*c* and 101*d* included in the one first element and the two arms 102*c* and 102*d* included in the other first element is larger in a region far from the corresponding first proximal end portion than in a region close to the corresponding first proximal end portion. Additionally, a facing distance between the one first element and the other first element is continuously or gradually increased as being away from the first proximal end portions. That is, the facing distance between the one first element and the other first element is larger in the region far from the first proximal end portions than in the region close to the first proximal end portions. The arm 101*c* of the one first element extends in a direction away from the arm 102*c* of the other first element that is closest to the arm 101*c*. Such a configuration enables the first elements to act as a self-similarity antenna such as a biconical antenna or a bow-tie antenna or an antenna that acts based on similar operating principle to the self-similarity antenna.

Open end portions are formed at respective distal end portions of the arms 101*c*, 101*d*, 102*c*, and 102*d*. Each open end portion is formed in a predetermined shape, for example, an L shape. The open end portion of the arm 101*c* and the open end portion of the arm 101*d* face each other, and the open end portion of the arm 102*c* and the open end portion of the arm 102*d* face each other. In this way, each of the pair of two arms 101*c* and 101*d* included in the one first element and the pair of arms 102*c* and 102*d* included in the other first element is arranged symmetrically about a first center portion, and is formed in a substantially C shape when viewed from the front side.

Next, the pair of second elements will be described. Each of a facing distance between the two arms 201*c* and 202*c* included in the one second element and a facing distance between the two arms 201*d* and 202*d* included in the other second element is continuously or gradually increased as being away from the corresponding second proximal end portion. That is, each of the facing distance between the two arms 201*c* and 202*c* included in the one second element and the facing distance between the two arms 201*d* and 202*d* included in the other second element is larger in the region far from the corresponding second proximal end portion than in the region close to the corresponding second proximal end portion. The arm 201*c* of the one second element extends in a direction away from the arm 201*d* of the other second element that is closest to the arm 201*c*. In this way, each of the facing distance between the arms 201*c* and 202*c* and the facing distance between the arms 201*d* and 202*d* is larger in a region in the vicinity of the open end portions than in a region in the vicinity of the proximal end portion. Such a configuration enables the second elements to act as a self-similarity antenna such as a biconical antenna or a bow-tie antenna or an antenna that acts based on similar operating principle to the self-similarity antenna.

In this way, each of the pair of two arms 201*c* and 202*c* included in the one second element and the pair of arms 201*d* and 202*d* included in the other second element is arranged symmetrically about a second center portion, and is formed in a substantially C shape when viewed from the front side.

Open end portions are formed at respective distal end portions of the arms 201*c*, 201*d*, 202*c*, and 202*d*. A change rate of the width from the region in the vicinity of the second proximal end portion to the region in the vicinity of the open end portion in each of the arms 201*c*, 201*d*, 202*c*, and 202*d* is smaller than the change rate of the width from the region in the vicinity of the first proximal end portion to the region in the vicinity of the open end portion in the first element. A bent region 2011*c* in the long side and a bent region 2012*c* in the short side are formed in a part of the open end portion of the arm 201*c*. The bent region 2011*c* in the long side is formed by being bent by 90 degrees in the thickness direction of the antenna unit, that is, a direction toward the first element that is closest to the bent region 2011*c*. The bent region 2012*c* in the short side is formed by being bent by 90 degrees in a direction from the bent region 2011*c* in the long side toward the other first element.

Also in each open end portion of the other arms 202*c*, 201*d*, and 202*d*, the bent regions having the same structure as the open end portion of the arm 201*c* are formed. That is, a bent region 2021*c* in the long side and a bent region 2022*c* in the short side are formed in a part of the arm 202*c*. A bent region 2011*d* in the long side and a bent region 2012*d* in the short side are formed in a part of the arm 201*d*. A bent region 2021*d* in the long side and a bent region 2022*d* in the short side are formed in a part of the arm 202*d*.

When these bent regions 2011*c*, 2012*c*, 2021*c*, 2022*c*, 2011*d*, 2012*d*, 2021*d*, and 2022*d* are formed, the overall size can be reduced while maintaining the antenna performance that is obtained in the case where these bent regions are not formed. Additionally, the split rings are formed using the pair of first elements and the pair of second elements, whereby an available frequency band can expand to the low frequency side.

Figure 21A:
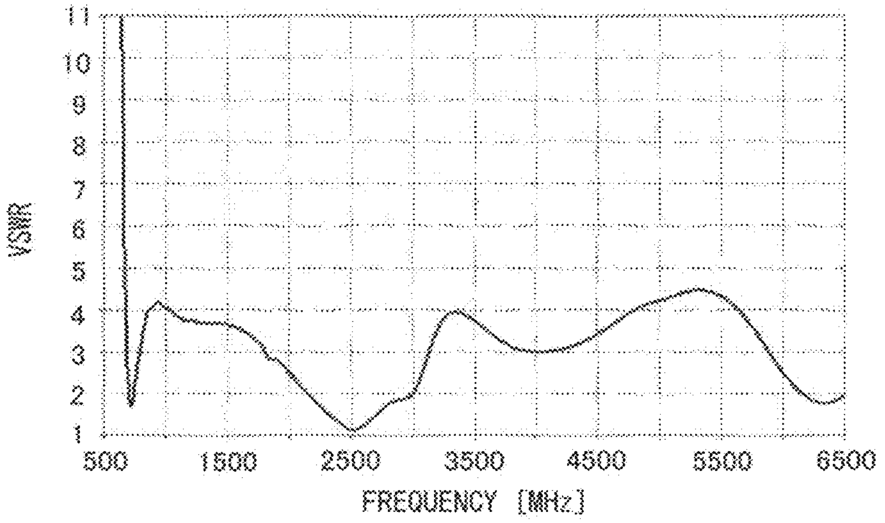
FIG. 21A is a graph showing a VSWR characteristic of a feed point K1 in the third embodiment.
Figure 21B:
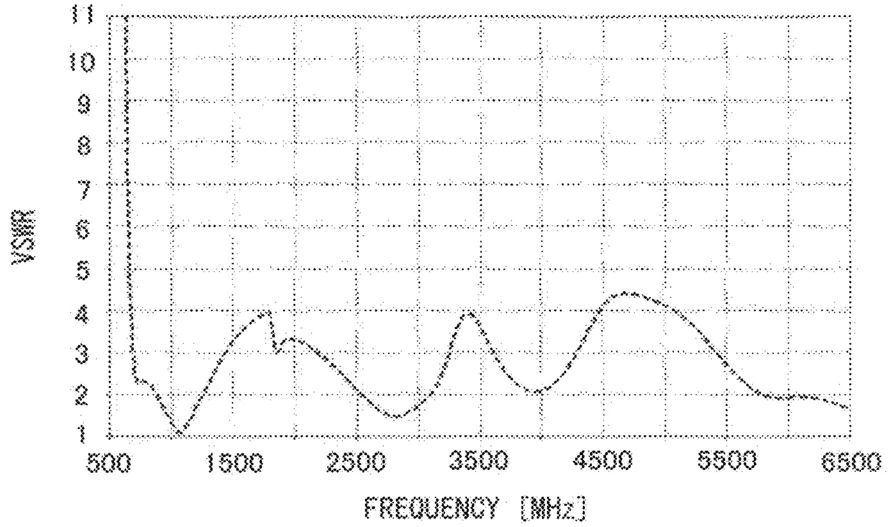
FIG. 21B is a graph showing a VSWR characteristic of a feed point K2 in the third embodiment.
Figure 22A:
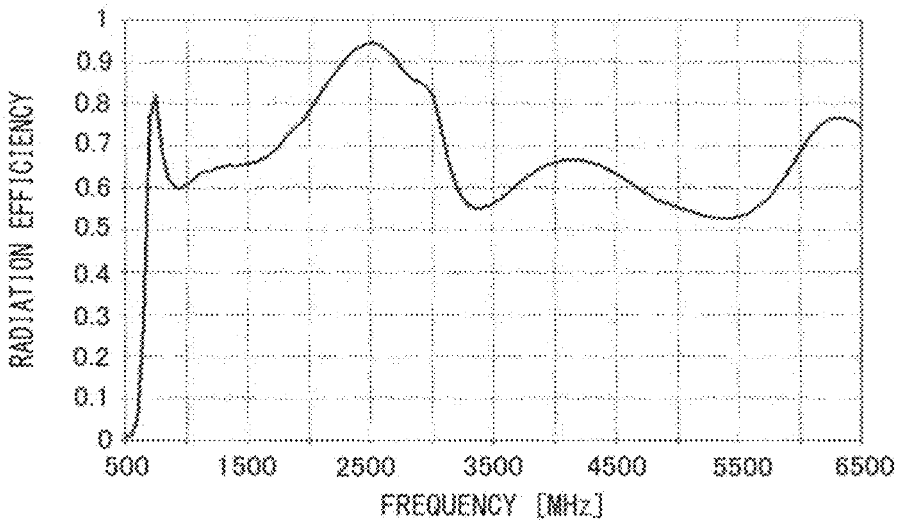
FIG. 22A is a graph showing a radiation efficiency characteristic of the feed point K1 in the third embodiment.
Figure 22B:
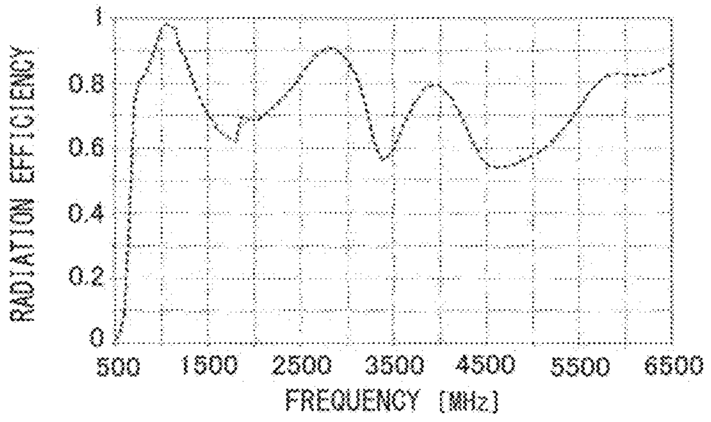
FIG. 22B is a graph showing a radiation efficiency characteristic of the feed point K2 in the third embodiment.
Figure 23A:
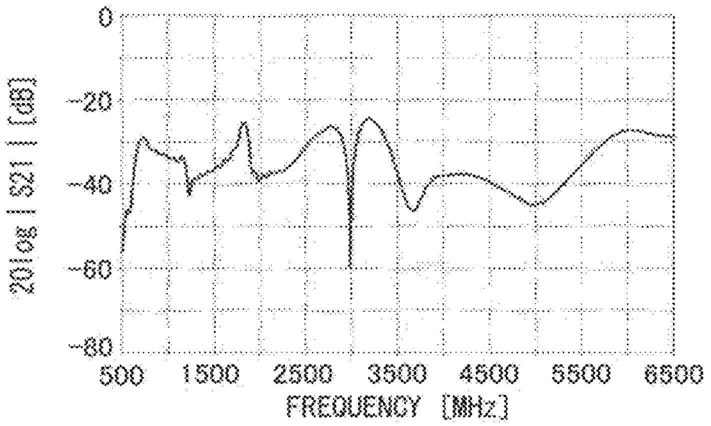
FIG. 23A is a graph showing a passing power characteristic from the feed point K1 to the feed point K2 in the third embodiment.
Figure 23B:
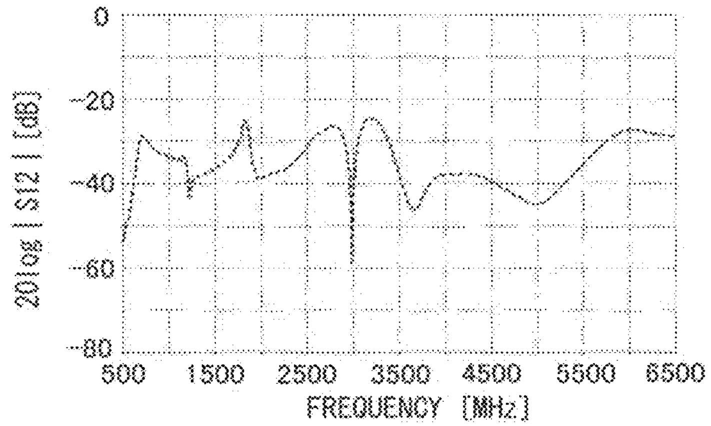
FIG. 23B is a graph showing a passing power characteristic from the feed point K2 to the feed point K1 in the third embodiment.
Figure 24A:
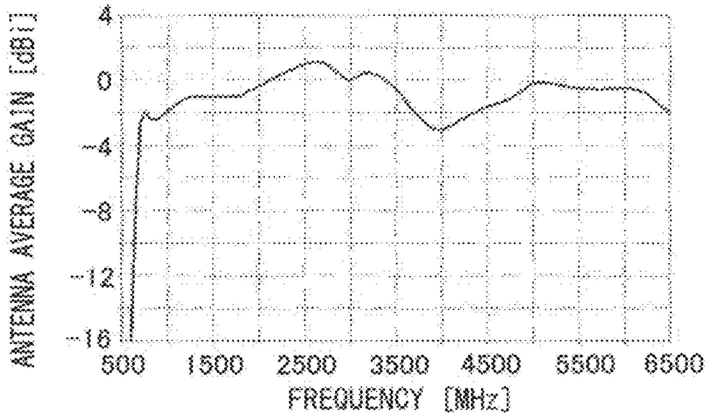
FIG. 24A is a graph showing an average gain characteristic in a horizontal plane of the feed point K1 in the arrangement of FIG. 20A.
Figure 24B:
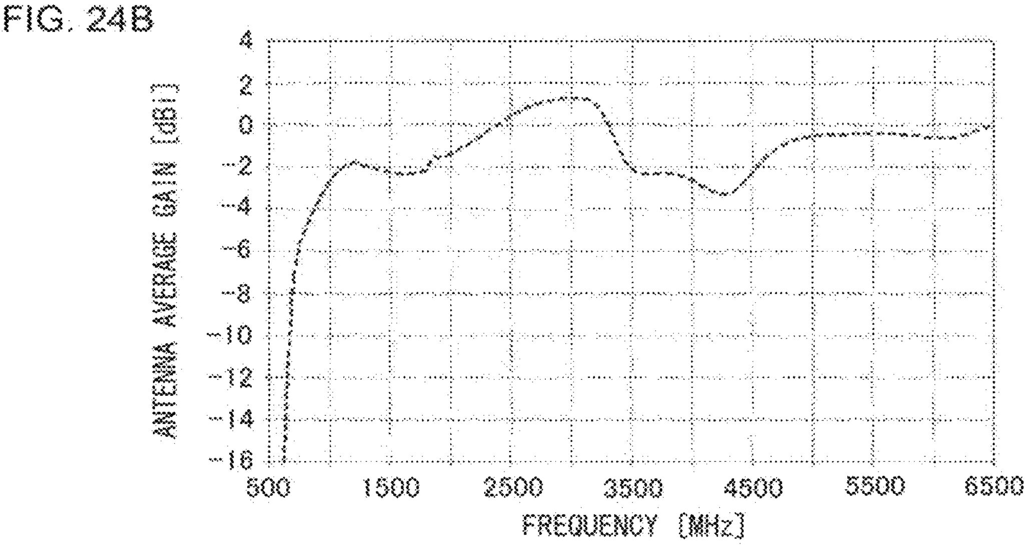
FIG. 24B is a graph showing an average gain characteristic in the horizontal plane of the feed point K2 in the arrangement of FIG. 20A.

FIGS. 21A to 24B each show antenna characteristics of the antenna unit of the third embodiment. FIG. 21A is a graph showing a VSWR characteristic of a feed point K1, and FIG. 21B is a graph showing a VSWR characteristic of a feed point K2. FIG. 22A is a graph showing a radiation efficiency characteristic of the feed point K1, and FIG. 22B is a graph showing a radiation efficiency characteristic of the feed point K2. In each of the graphs, the horizontal axis represents a frequency (MHz). Additionally, FIG. 23A is a graph showing a passing power characteristic from the feed point K1 for the first elements to the feed point K2 for the second elements, and FIG. 23B is a graph showing a passing power characteristic from the feed point K2 for the second elements to the feed point K1 for the first elements. The vertical axis of FIG. 23A represents 20 Log|S21| (dB), the vertical axis of FIG. 23B represents 20 Log|S12| (dB), and each horizontal axis of FIGS. 23A and 23B represents a frequency (MHz). FIG. 24A is a graph showing an average gain characteristic in a horizontal plane (x-y plane) of the feed point K1 in the arrangement of FIG. 20A. FIG. 24B is a graph showing an average gain characteristic in the horizontal plane (x-y plane) of the feed point K2 in the arrangement of FIG. 20A. In each of the graphs, the horizontal axis represents a frequency (MHz).

Fourth Embodiment

Next, a fourth embodiment of the present invention will be described. An antenna unit of the fourth embodiment is similar to the antenna unit of the first embodiment in that a pair of first elements and a pair of second elements are provided, in which respective polarized wave directions are orthogonal to each other, and each element includes a portion that acts as a self-similarity antenna or an antenna that acts based on similar operating principle to the self-similarity antenna, but is different from the antenna unit of the first embodiment in the shape and structure of each element. However, for the convenience of the description, members which correspond to the members of the antenna units of the first embodiment are described by using the same member names and denoting the same reference numerals thereto.

Figure 25A:
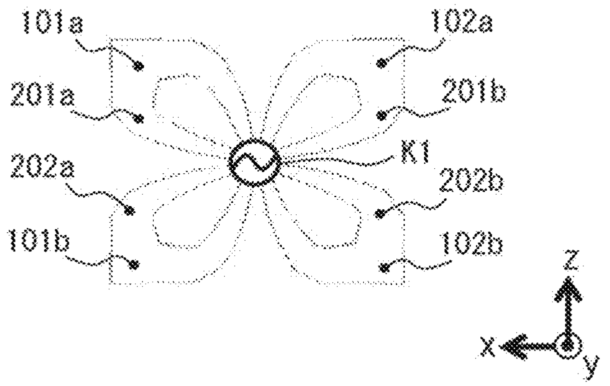
FIG. 25A is a front view of an antenna unit of a fourth embodiment.
Figure 25B:
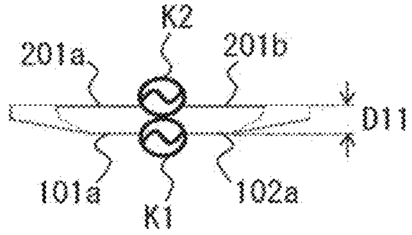
FIG. 25B is a top view of the antenna unit of the fourth embodiment.
Figure 25C:
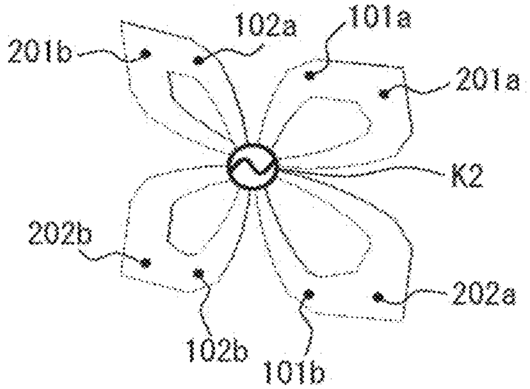
FIG. 25C is a perspective view of the antenna unit of the fourth embodiment.

FIG. 25A is a front view of the antenna unit according to the fourth embodiment, FIG. 25B is a top view of the antenna unit according to the fourth embodiment, and FIG. 25C is a perspective view of the antenna unit according to the fourth embodiment. The antenna unit of the fourth embodiment has a basic structure similar to the antenna unit of the first embodiment. A space between the pair of first elements and the pair of second elements, and an outer edge size of the pair of first elements and the pair of second elements are similar to the antenna unit of the first embodiment.

The antenna unit of the fourth embodiment is different from the antenna unit of the first embodiment in that each open end portion of arms included in the first elements is conductively connected to one of open end portions of arms included in the second elements that is closest to the above-described open end portion of the first element, and each open end portion of the arms included in the first elements and the corresponding open end portion of the second element are formed integrally with each other, thereby being formed in a loop shape including a portion that acts as a self-similarity antenna or an antenna that acts based on similar operating principle to the self-similarity antenna. Therefore, in the antenna unit according to the fourth embodiment, the above-described split rings are not formed.

Figure 26A:
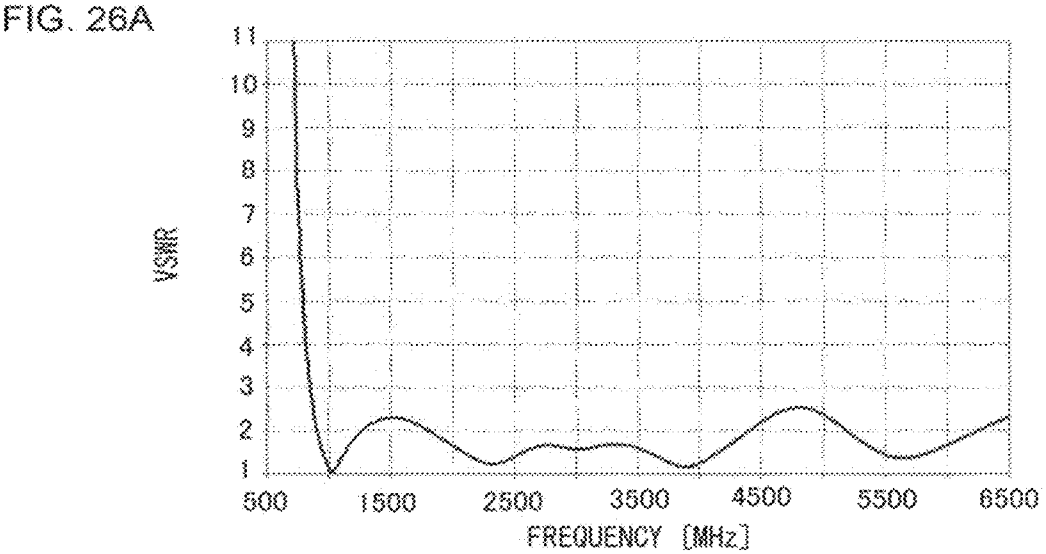
FIG. 26A is a graph showing a VSWR characteristic of a feed point K1 in the fourth embodiment.
Figure 26B:
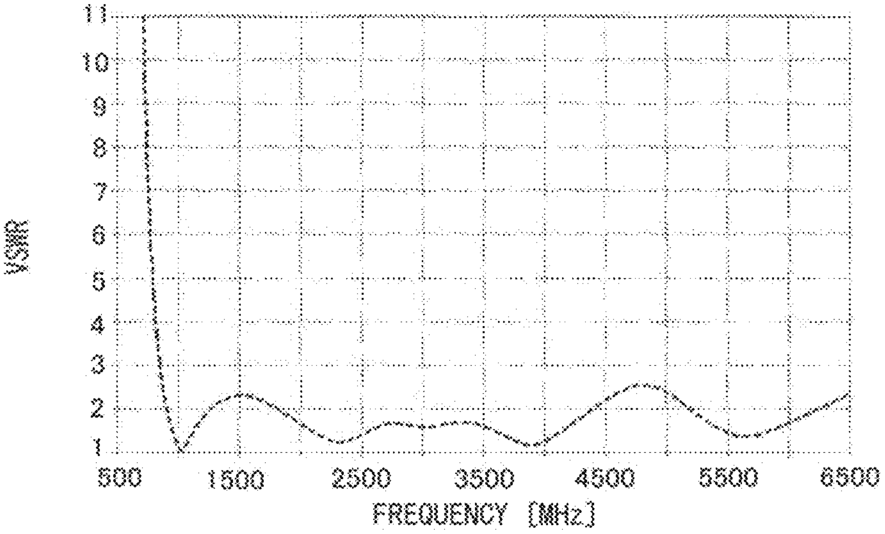
FIG. 26B is a graph showing a VSWR characteristic of a feed point K2 in the fourth embodiment.
Figure 27A:
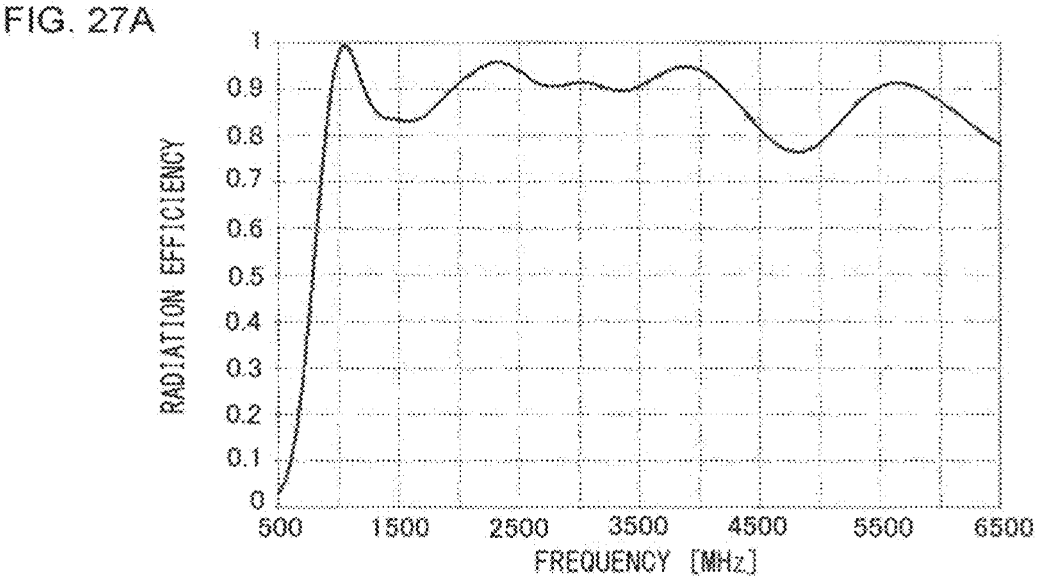
FIG. 27A is a graph showing a radiation efficiency characteristic of the feed point K1 in the fourth embodiment.
Figure 27B:
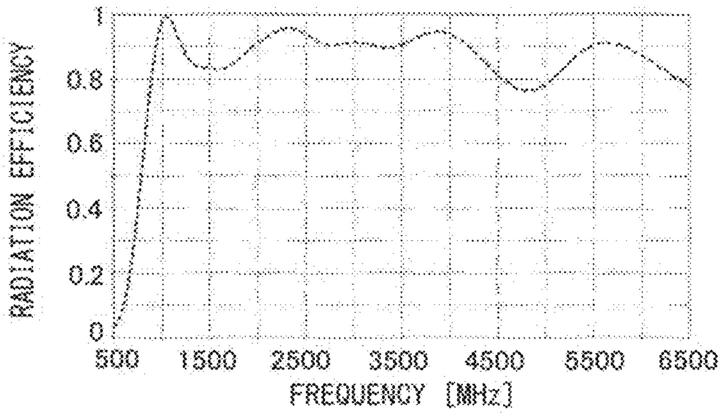
FIG. 27B is a graph showing a radiation efficiency characteristic of the feed point K2 in the fourth embodiment.
Figure 28A:
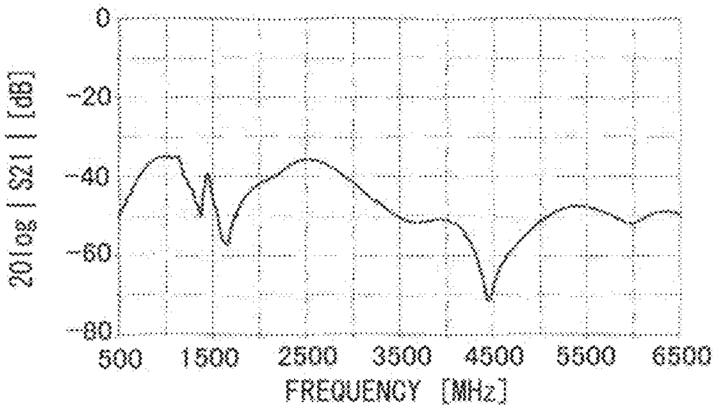
FIG. 28A is a graph showing a passing power characteristic from the feed point K1 to the feed point K2 in the fourth embodiment.
Figure 28B:
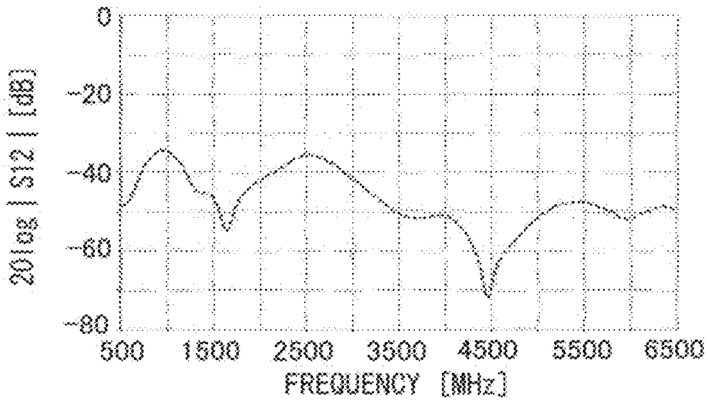
FIG. 28B is a graph showing a passing power characteristic from the feed point K2 to the feed point K1 in the fourth embodiment.
Figure 29A:
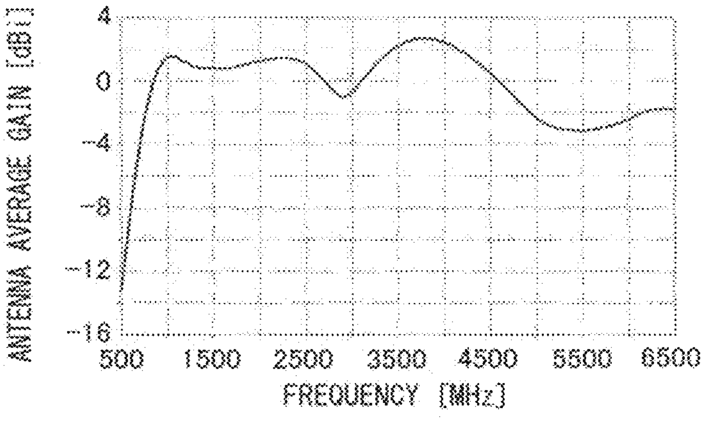
FIG. 29A is a graph showing an average gain characteristic in a horizontal plane of the feed point K1 in the arrangement of FIG. 24A.
Figure 29B:
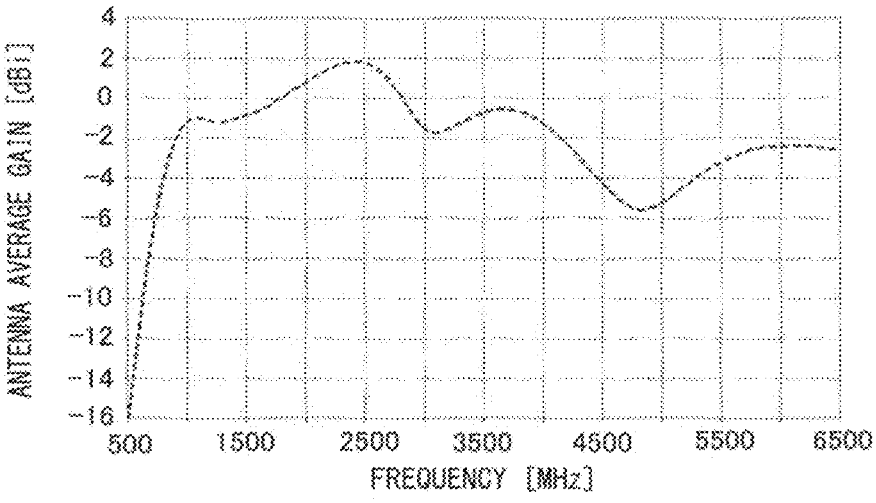
FIG. 29B is a graph showing an average gain characteristic in the horizontal plane of the feed point K2 in the arrangement of FIG. 24A.

FIGS. 26A to 29B each show antenna characteristics of the antenna unit of the fourth embodiment. FIG. 26A is a graph showing a VSWR characteristic of a feed point K1, and FIG. 26B is a graph showing a VSWR characteristic of a feed point K2. FIG. 27A is a graph showing a radiation efficiency characteristic of the feed point K1, and FIG. 27B is a graph showing a radiation efficiency characteristic of the feed point K2. In each of the graphs, the horizontal axis represents a frequency (MHz). Additionally, FIG. 28A is a graph showing a passing power characteristic from the feed point K1 for the first elements to the feed point K2 for the second elements, and FIG. 28B is a graph showing a passing power characteristic from the feed point K2 for the second elements to the feed point K1 for the first elements. The vertical axis of FIG. 28A represents 20 Log|S21| (dB), the vertical axis of FIG. 28B represents 20 Log|S12| (dB), and each horizontal axis of FIGS. 28A and 28B represents a frequency (MHz). FIG. 29A is a graph showing an average gain characteristic in a horizontal plane (x-y plane) of the feed point K1 in the arrangement of FIG. 24A. FIG. 29B is a graph showing an average gain characteristic in the horizontal plane (x-y plane) of the feed point K2 in the arrangement of FIG. 24A. In each of the graphs, the horizontal axis represents a frequency (MHz).

Fifth Embodiment

Next, a fifth embodiment of the present invention will be described. An antenna unit of the fifth embodiment is similar to the antenna unit of the first embodiment in an arrangement relation between a pair of first elements and a pair of second elements, and the shape, structure, and size of each element, but is different from the antenna unit of the first embodiment in how to combine each of the pairs of elements. Additionally, the forms of the feed points are embodied. For convenience, members which correspond to the members of the antenna unit of the first embodiment are described by using the same member names and denoting the same reference numerals thereto.

Figure 30A:
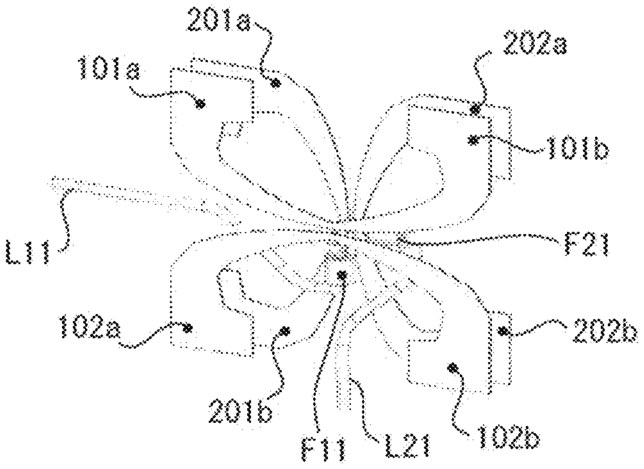
FIG. 30A is a perspective view of a front side of the antenna unit of the fifth embodiment.
Figure 30B:
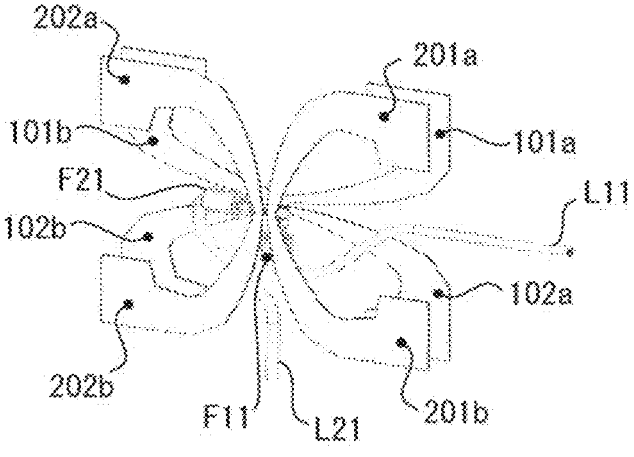
FIG. 30B is a perspective view of a rear side of the antenna unit of the fifth embodiment.

FIG. 30A is a perspective view illustrating a configuration example of the antenna unit according to the fifth embodiment, and FIG. 30B is a perspective view when viewing FIG. 30A from the rear side. In the first embodiment, the one first element and the other first element are arranged symmetrically about the first center portion so that the two elements have a V shape and an inverted V shape, respectively. However, in the antenna unit of the fifth embodiment, one of the pair of first elements includes two arms 101*a* and 101*b*, and the other first element includes two arms 102*a* and 102*b*, so that the two elements have respective substantially C shapes formed symmetrically about a first center portion. The similar applies to the pair of second elements. That is, one second element includes two arms 201*a* and 201*b*, and the other second element includes two arms 202*a* and 202*b*, so that the two elements have respective substantially C shapes formed symmetrically about a second center portion.

Also in such a combination of the elements, a polarized wave direction of a signal receivable or transmittable by the pair of first elements is orthogonal to a polarized wave direction of a signal receivable or transmittable by the pair of second elements, and each element includes a portion that acts as a self-similarity antenna or an antenna that acts based on similar operating principle to the self-similarity antenna. Therefore, the fifth embodiment can acquire actions and effects similar to those of the first embodiment.

Additionally, a first feeder F11 around which a ferrite core is wound is connected to a feed point of the first center portion, and a second feeder F21 around which a ferrite core is wound at an angle of substantially 90 degrees with respect to the first feeder F11 is connected to a feed point of the second center portion. This can prevent leakage currents in the low frequency range including 698 MHz in which a resonant operation is performed, and stabilize and improve the radiation characteristic.

"L11" and "L21" in FIGS. 30A and 30B represent coaxial cables which are examples of feeders F11 and F21, respectively.

Modification Example 1

In the first, second, fourth, and fifth embodiments, the description has been made assuming that the first element and the second element have the same shape, structure and size, but these embodiments are not limited thereto. When the elements each include a portion that acts as a self-similarity antenna or an antenna that acts based on similar operating principle to the self-similarity antenna, their polarized wave directions are orthogonal to each other, and an overlapping area between the elements is small, one of the elements may be different from the other in size.

In the first, second, fourth, and fifth embodiments, the description has been made assuming that the pair of first elements and the pair of second elements each are formed in a substantially V shape or a substantially C shape, but may be formed in a substantially D shape, a substantially U shape, a substantially semicircular shape, a substantially semiellipse shape, a substantially triangular shape, or a substantially quadrangular shape. Additionally, in these embodiments, the description has been made assuming that two feed points are provided, but a configuration may be adopted in which only one feed point is provided. Since the first element and the second element are electrically connected to each other, an operation similar to that in the case where the two feed points are provided can be achieved.

In the first embodiment, an example has been described in which the antenna characteristics are improved by installing the antenna unit on the z-plane in a state of being inclined by approximately 45 degrees. However, also in each of the second to fifth embodiments, the antenna unit may be installed in a state of being inclined in the similar manner to the first embodiment. Also in the case where not only the pair of first elements or the pair of second elements but also one arm or two arms included in each element are used as antennas, the antenna unit may be installed by being inclined in the similar manner.

Effects of Antenna Device According to First to Fifth Embodiments

In the antenna unit of each of the first to fifth embodiments, the pair of first elements and the pair of second elements are arranged so that the respective polarized wave directions are orthogonal to each other, whereby the mutual interference between the elements can be reduced, the antenna device can be reduced in thickness. Additionally, since each element of the pair of first elements and the pair of second elements includes a portion that acts as a self-similarity antenna or an antenna that acts based on similar operating principle to the self-similarity antenna, the antenna unit can receive or transmit the signals over a wide frequency band, and can operate stably over a wide frequency band.

Each element of the pair of first elements and the pair of second elements includes two arms that extend in directions away from each other from the proximal end portion to which the feed point is connectable, which enables size reduction of the elements. As in the antenna unit of the comparative example illustrated in FIGS. 12A to 12D, in the case where the pair of second bow-tie antennas 601 and 602 are arranged to face the first bow-tie antennas 501 and 502 in a state in which the pair of second bow-tie antennas 601 and 602 are turned by approximately 90 degrees with respect to a state of being aligned with the pair of first bow-tie antennas 501 and 502, conductors are generated circumferentially between the first bow-tie antennas 501 and 502 and the second bow-tie antennas 601 and 602.

On the other hand, when the pair of second elements in the antenna unit 12 of the first to fifth embodiment are arranged to face the pair of first elements in a state in which the pair of second elements are turned by approximately 90 degrees with respect to a state of being aligned with the pair of first elements, an overlapping area between both elements when being brought close to each other can be reduced. That is, conductors are not generated circumferentially between the first elements and the second elements.

Accordingly, since scatters are not introduced between both elements, the reactance variation can be reduced, whereby the impedance is stabilized. Therefore, a wide frequency band can be attained.

Since the antenna unit can be accommodated in a case having electric wave permeability (case body 10) in size of 90 mm in vertical and horizontal sides and 13 mm in thickness or less, the interference is reduced while reducing the size and thickness of the antenna unit, whereby the antenna device in which the two antennas excellent in isolation are accommodated can be provided. The antenna device can be also installed, for example, at any place in a vehicle or at any portion in a room to be used for a MIMO using a frequency band of LTE or 5G.

Since the antenna unit of the first and second embodiment has excellent stable antenna characteristics over a frequency band from a low frequency band to a high frequency band of LTE and 5G, as shown in FIGS. 6A to 8B and FIGS. 16A to 19B, the antenna unit of the first and second embodiment can be used as antenna devices for Japan and foreign countries without need to make any design changes.

Since each width is increased as being away from the feed point K1 (K2), in particular, the VSWR on the high frequency side can be reduced, the radiation efficiency and the average gain can be increased, and these variations can be reduced. Since a configuration is adopted in which the pair of first elements and the pair of second elements are provided, and the pair of second elements are arranged to face the pair of first elements in a state in which the pair of second elements are turned by approximately 90 degrees with respect to a state of being aligned with the pair of first elements so that both elements are brought close to each other, each end portion of the first elements and the corresponding end portion of the second elements facing each other are electrically connected to each other, to form a loop shape, which can widen the available frequency band in a direction of a low frequency in the vicinity of 698 MHz. The antenna device having such a configuration can expand the available frequency band to the low frequency side, and further widen the available frequency band, which would be difficult for the conventional antenna devices, for example.

Since the two arms (for example, 101*a* and 101*b*) have respective distal ends that are formed in a predetermined shape determined according to the shape of the installation position, the element area required in each arm can be secured while increasing the flexibility of the element shape. The term "element area required" is determined according to the resonant frequency of the split ring expanding the low frequency band.

Since a portion of a region farthest from the feed point (for example, K1) in each of the two arms (for example, 101*c* and 101*d*) is bent in a direction of the other arms (for example, 201*c*, 201*d*) that face the two arms, the frequency band can be expanded to the low frequency side without changing sizes of the vertical and horizontal sides and the thickness of the entire antenna unit (and the case body 10).

In the antenna unit of the comparative example described in the first embodiment, in the case where each of the pair of bow-tie antennas and the other pair of bow-tie antennas that are arranged at approximately 90 degrees with respect to each other is used as a broadband antenna while being spaced apart from each other by 40 mm or more, the antenna characteristics of a practical level can be obtained.

In the first to fifth embodiments, the description has been made assuming that the minimum frequency in the LTE is 698 MHz. However, in the case where the available frequency is expanded to the low frequency side up to about 450 MHz while maintaining the performance of the antenna of each embodiment, such expansion can be implemented by increasing the size (outer edge size) when viewing the antenna unit from the front side or rear side according to the ratio of the wavelength, without changing the space D11 of the antenna unit. Although being inferior to the performance of the antenna unit of each embodiment, the available frequency can be expanded to the low frequency side up to about 450 MHz by providing appropriate width of each arm and appropriate area of a portion corresponding to each open end portion without changing the size (outer edge size) of the antenna unit.

Sixth Embodiment

Next, a sixth embodiment of the present invention will be described. In the sixth embodiment, the description will be made about an antenna unit having a configuration designed in consideration of the simplification of a creation process of the elements in addition to the actions and effects of the antenna unit of each of the first to fifth embodiments. The antenna unit of the sixth embodiment is generally similar to the antenna unit of the first to fifth embodiment in providing a pair of first elements and a pair of second elements, an arrangement relation between these elements, and a feeding system. For convenience, members which correspond to the members of the antenna unit of each embodiment described above are described by using the same member names and denoting the same reference numerals thereto.

Figure 31A:
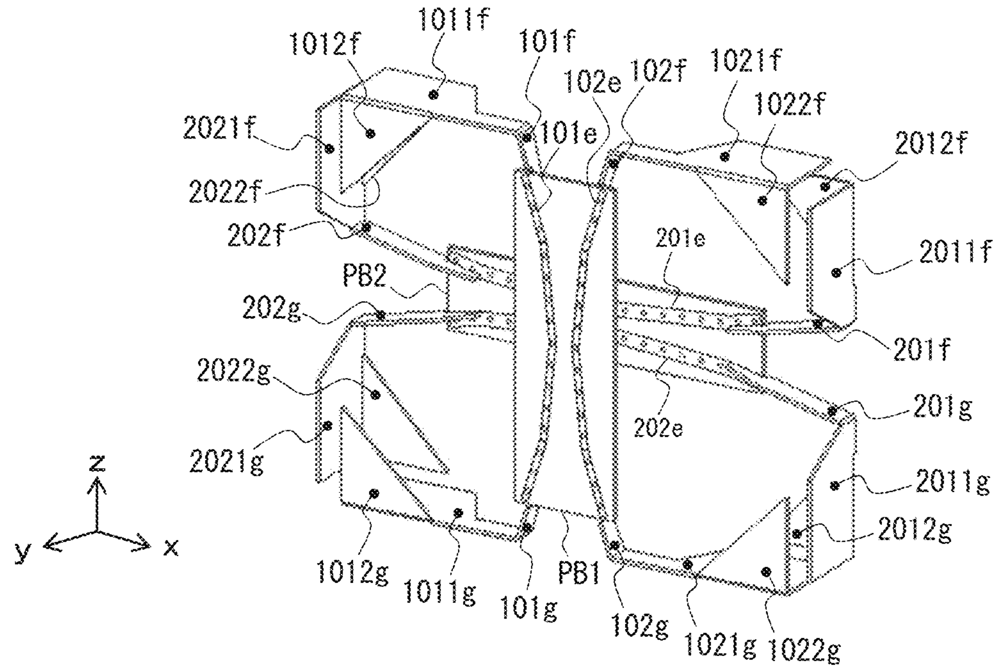
FIG. 31A is a perspective view of an antenna unit in a sixth embodiment.
Figure 31B:
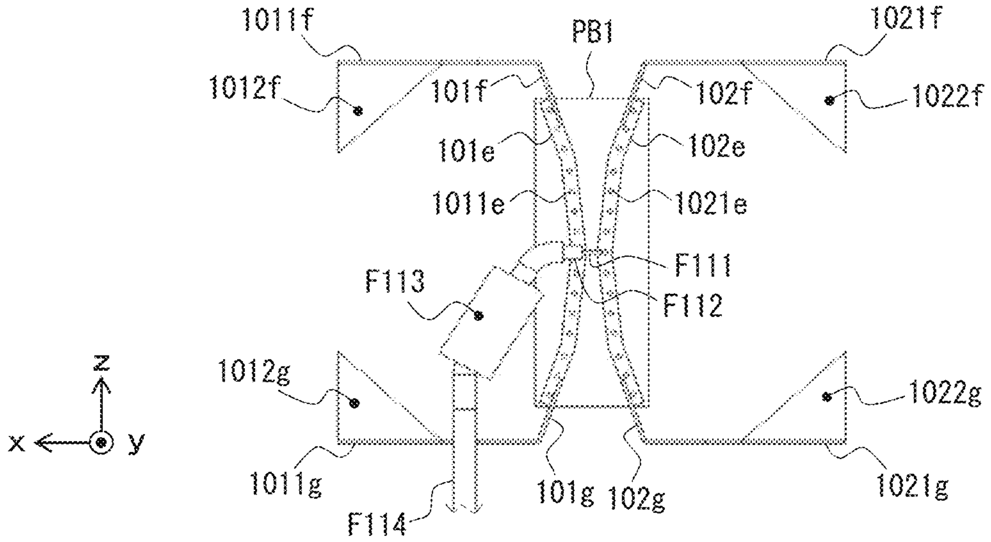
FIG. 31B is a front view illustrating a feeding state of first elements in the sixth embodiment.
Figure 31C:
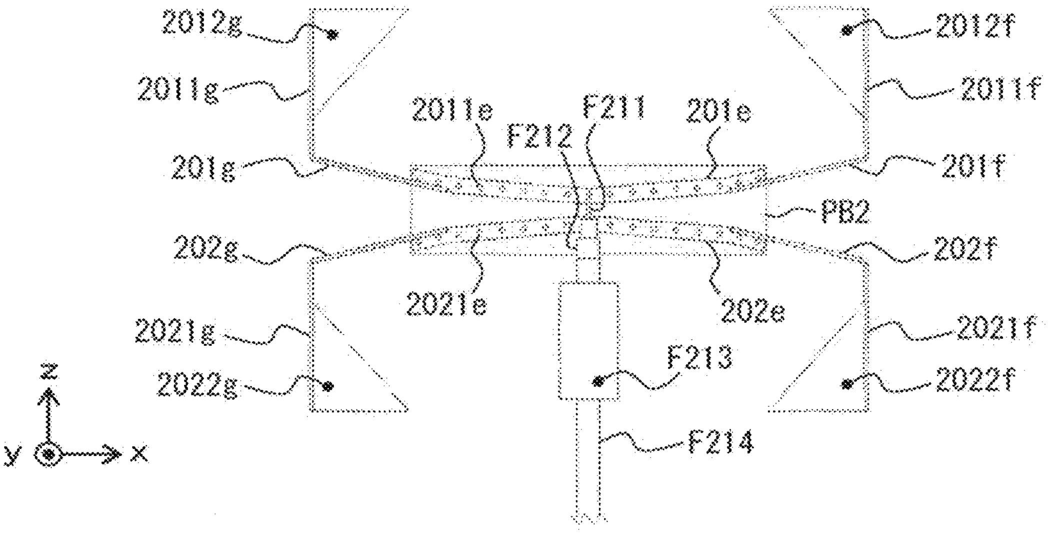
FIG. 31C is a front view illustrating a feeding state of second elements in the sixth embodiment.

FIG. 31A is a perspective view of the antenna unit in the sixth embodiment, FIG. 31B is a front view illustrating a feeding state of the pair of first elements, and FIG. 31C is a front view illustrating a feeding state of the pair of second elements. The antenna unit has a size enough to be accommodated in a box-shaped resin case (for example, the case 10 illustrated in FIGS. 1A and 1B) having a z-direction length of 60 mm, an x-direction length of 80 mm, and a y-direction length of 15 mm.

Referring to FIGS. 31A to 31C, one first element of the pair of first elements includes a proximal end region 101*e* which is a first region in which a proximal end portion of the one first element is formed in a mountain shape in a direction (x-axis direction) toward a proximal end portion of the other first element, an extending region 101*f* which is a second region to be conductively connected to one end portion of the proximal end region 101*e*, and an extending region 101*g* to be conductively connected to the other end portion of the proximal end region 101*e*.

The other first element also includes a proximal end region 102*e* in which the proximal end portion of the other first element is formed in a mountain shape in the direction toward the proximal end portion of the one first element, an extending region 102*f* to be conductively connected to one end portion of the proximal end region 102*e*, and an extending region 102*g* to be conductively connected to the other end portion of the proximal end region 102*e*. The electrical connection can be made by a solder connection or a conductive via hole. Both regions may be conductively connected to each other using a conductive screw or bolt and nut, a conductive adhesive, or a conductive wire.

The proximal end regions 101*e* and 102*e* correspond to partial regions of arms including portions to which the feed point is to be connected in the embodiments described above, that is, regions in the vicinity of the above-described first proximal end portions or second proximal end portions. The extending regions 101*f*, 101*g*, 102*f*, and 102*g* correspond to the remaining regions of the above-described partial regions in the arms in the embodiments described above.

After a stripe is printed on each of front and rear surfaces of one board PB1, the proximal end region 101*e* is mutually conductively connected to the board PB1 through a plurality of conductive via holes 1011*e* in this example. In this example, the board PB1 is a printed circuit board (PCB; the same applies hereinafter) having a substantially rectangular shape. The proximal end region 102*e* is also mutually conductively connected to the board PB1 through a plurality of conductive via holes 1021*e* after a stripe is printed on each of the front and rear surfaces of the board PB1. A portion at which the two proximal end regions 101*e* and 102*e* are closest to each other becomes the above-described first center portion (a portion or port to which a feed point K1 is connected). A signal line F111 of a coaxial cable F114 as an example of the feeder is conductively connected to the proximal end region 102*e*. A ground line F112 of the coaxial cable F114 is conductively connected to the proximal end region 101*e*. This enables the pair of first elements to act as two dipole antennas. Additionally, the proximal end region 101*e* and the extending regions 101*f* and 101*g*, and the proximal end region 102*e* and the extending regions 102*f* and 102*g* act as two tapered-slot antennas.

A ferrite core F113 is attached to the coaxial cable F114, which can block a current leaking from an outer jacket of the coaxial cable F114. To increase the gain in the low frequency band in the vicinity of 698 GHz, the size of the antenna unit is generally increased. Attaching the ferrite core F113 enables the size reduction of the antenna unit while securing the gain on the low frequency side.

In the coaxial cable F114, a connection point with the first elements is regarded as the feed point K1, and an end portion opposite to the feed point K1 is regarded as an output end.

In general, an impedance matching circuit is mounted on the printed circuit board, but the antenna of the embodiment does not require the impedance matching circuit, and the signal line F111 and the ground line F112 of the coaxial cable is directly connected to the proximal end regions 101*e* and 102*e* formed on the board PB1, respectively. Therefore, a configuration of the entire antenna unit can be simplified.

The extending regions 101*f*, 101*g*, 102*f*, and 102*g* are substantially perpendicular to the board PB1, have metal plates having a width in a direction of the second elements, and are each formed by a sheet metal. Open end portions are formed at portions in the vicinity of distal ends of the extending regions 101*f*, 101*g*, 102*f*, and 102*g*, respectively. The open end portions include first end portions 1011*f*, 1011*g*, 1021*f*, and 1021*g* having a trapezoidal shape on planes perpendicular to the board PB1, and second end portions 1012*f*, 1012*g*, 1022*f*, and 1022*g* having a substantially triangular shape on a plane parallel to the board PB1, and being formed by bending from the respective first end portions. The objects of forming the second end portions 1012*f*, 1012*g*, 1022*f*, and 1022*g* in a substantially triangular shape are to maintain a self-similar shape to keep the impedance constant, whereby the antenna performance (VSWR, radiation efficiency, gain) is improved.

To avoid connection between the second end portions 1012*f* and 1012*g* facing each other and connection between the second end portions 1022*f* and 1022*g* facing each other, the second end portions 1012*f*, 1012*g*, 1022*f*, and 1022*g* may be formed in a shape close to a trapezoidal shape by cutting a part of a tip of the triangular shape. The width of each end portion is increased toward the distal end of the corresponding extending region. When the second end portions 1012*f*, 1012*g*, 1022*f*, and 1022*g* are formed in a substantially triangular shape, the entire antenna unit can continuously maintain the similar shape to keep the impedance constant, whereby the antenna characteristics, especially, the VSWR can be improved. The two extending regions 101*f* and 101*g* included in the one first element and the two extending regions 102*f* and 102*g* included in the other first element are arranged symmetrically about the first center portion, and each is formed in a substantially C shape when viewed from the front side (y-axis direction).

Next, the pair of second elements will be described. One second element of the pair of second elements includes a proximal end region 201*e* in which a proximal end portion of the one second element is formed in a mountain shape in a direction (z-axis direction) toward a proximal end portion of the other second element, an extending region 201*f* to be conductively connected to one end portion of the proximal end region 201*e*, and another extending region 201*g* to be conductively connected to the other end portion of the proximal end region 201*e*. The other second element also includes a proximal end region 202*e* in which the proximal end portion of the other second element is formed in a mountain shape in the direction toward the proximal end portion of the one second element, an extending region 202*f* to be conductively connected to one end portion of the proximal end region 202*e*, and another extending region 202*g* to be conductively connected to the other end portion of the proximal end region 202*e*.

The proximal end region 201*e* is formed on a board PB2 that is arranged on a plane parallel to the board PB1 and is inclined by about 90 degrees about the first center portion. The board PB2 is a PCB having a substantially rectangular shape in which the long side extends in a direction perpendicular to the board PB1. The proximal end region 201*e* is mutually conductively connected to the board PB2 through a plurality of conductive via holes 2011*e* after a stripe is printed on each of front and rear surfaces of the board PB2. The proximal end region 202*e* is also mutually conductively connected to the board PB2 through a plurality of conductive via holes 2021*e* after a stripe is printed on each of the front and rear surfaces of the board PB2.

A portion at which the two proximal end regions 201*e* and 202*e* are closest to each other becomes the above-described second center portion (a portion or port to which a feed point K2 is connected). A signal line F211 of a coaxial cable F214 as an example of the feeder is conductively connected to the proximal end region 202*e*. A ground line F212 of the coaxial cable F214 is conductively connected to the proximal end region 201*e*. This enables the pair of second elements to act as two dipole antennas or two tapered-slot antennas. A ferrite core F213 is attached to the coaxial cable F214. The effects are similar to the case of the first elements. Additionally, the proximal end region 201*e* and the extending regions 201*f* and 201*g*, and the proximal end region 202*e* and the extending regions 202*f* and 202*g* act as two tapered-slot antennas.

In the coaxial cable F214, a connection point with the second elements is regarded as the feed point K2, and an end portion opposite to the feed point K2 is regarded as an output end.

The extending regions 201*f*, 201*g*, 202*f*, and 202*g* are perpendicular to the board PB2, have metal plates having a width in a direction of the first elements, and are each formed by a sheet metal. Open end portions are formed at portions in the vicinity of distal ends of the extending regions 201*f*, 201*g*, 202*f*, and 202*g*, respectively. The open end portions include first end portions 2011*f*, 2011g, 2021*f*, and 2021*g* having a trapezoidal shape on planes perpendicular to the board PB2, and second end portions 2012*f*, 2012*g*, 2022*f*, and 2022*g* having a substantially triangular shape on a plane parallel to the board PB2, and being formed by bending from the respective first end portions. A fact that a part of a tip of the triangular shape may be cut to form a shape close to a trapezoidal shape can be also applied to the second elements. The width of each end portion is increased toward the distal end of the corresponding extending region. The two extending regions 201*f* and 201*g* included in the one second element and the two extending regions 202*f* and 202*g* included in the other second element are arranged symmetrically about the second center portion, and each is formed in a substantially C shape when viewed from the front side (y-axis direction).

A split ring is formed among the first end portion 1011*f*, 1011*g*, 1021*f*, 1021*g* and the second end portion 1012*f*, 1012*g*, 1022*f*, 1022*g* of the first element and the first end portion 2021*f*, 2021*g*, 2011*f*, 2011*g* and the second end portion 2022*f*, 2022*g*, 2012*f*, 2012*g* of the second element which is closest to the first element. That is, both regions are not conductively connected to each other, but are capacitively coupled. In this way, the pair of first elements and the pair of second elements act as a loop antenna, as a whole. The split ring serves to expand the available frequency band of the antenna unit to the low frequency side.

Also in the antenna unit of the sixth embodiment, the pair of first elements are inclined by approximately 90 degrees with respect to the pair of second elements, similarly to the antenna unit of each embodiment described above. Therefore, a polarized wave direction of a signal receivable or transmittable by the pair of first elements is orthogonal to a polarized wave direction of a signal receivable or transmittable by the pair of second elements, and a part or whole of each element acts as a self-similarity antenna or an antenna that acts based on similar operating principle to the self-similarity antenna.

In the case where each element that acts as a self-similarity antenna or an antenna that acts based on similar operating principle to the self-similarity antenna is formed by a sheet metal, it is required to make the width as narrow as possible in the vicinity of the proximal end portion to which the feed point is connected. Therefore, it becomes difficult to form the element by a sheet metal. However, in the antenna unit of the sixth embodiment, the proximal end regions 101*e* and 102*e*, and the proximal end regions 201*e* and 202*e* are formed by being printed on the boards PB1 and PB2, respectively, and the proximal end region 101*e*, the proximal end region 102*e*, the proximal end region 201*e*, and the proximal end region 202*e* are conductively connected to the extending regions 101*f* and 101*g*, the extending regions 102*f* and 102*g*, the extending regions 201*f* and 201*g*, and the extending regions 202*f* and 202*g*, respectively. Therefore, each element can be easily formed by a sheet metal.

Additionally, each of the proximal end regions 101*e*, 102*e*, 201*e*, and 202*e* is configured in which two prints formed on the front and rear surface of the corresponding one of the boards PB1 and PB2 are conductively connected through the corresponding ones of the conductive via holes 1011*e*, 1021*e*, 2011*e*, and 2021*e*. Therefore, the radiation resistance and the inductance are increased as compared with the case where each of the proximal end regions is configured only by one print, and the radiation efficiency is improved. Partial regions of at least one pair of elements of the pair of first elements and the pair of second elements may be formed on the corresponding board PB1, PB2. Each of the proximal end regions 101*e*, 102*e*, 201*e*, and 202*e* may be formed on one side of the corresponding board PB, PB2. In this case, the conductive via holes 1011*e*, 1021*e*, 2011*e*, and 2021*e* are unnecessary.

Next, the antenna characteristics of the antenna of the sixth embodiment will be described.

Figure 32A:
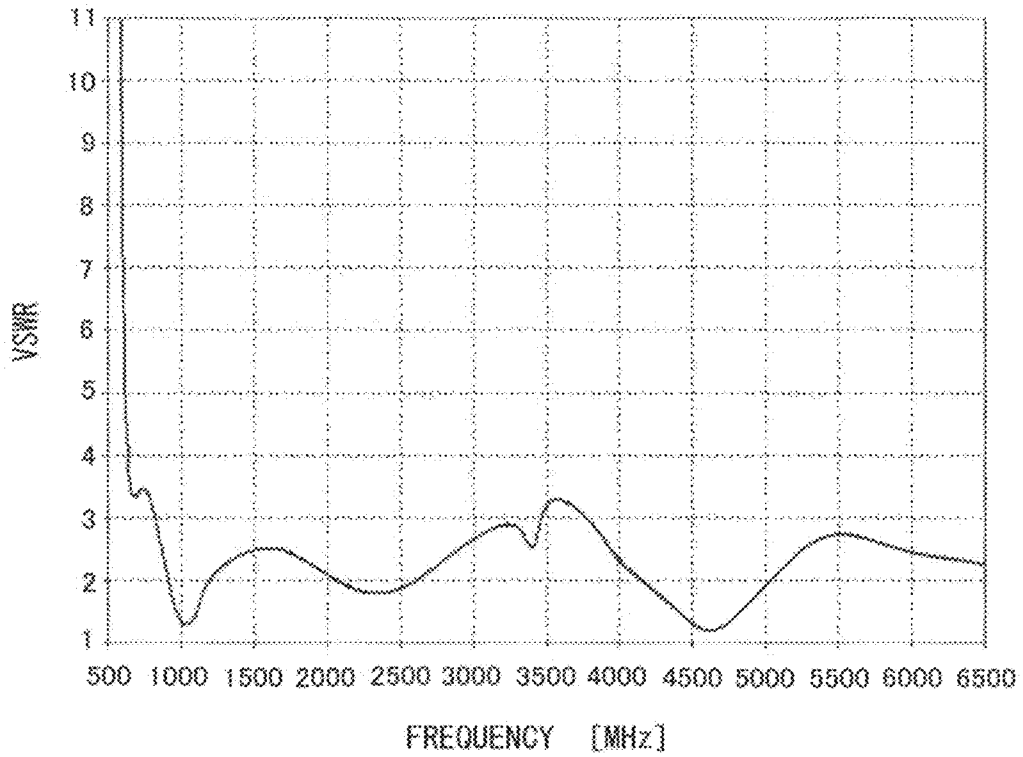
FIG. 32A is a graph showing a VSWR characteristic of an output end of a coaxial cable F114 in the sixth embodiment.
Figure 32B:
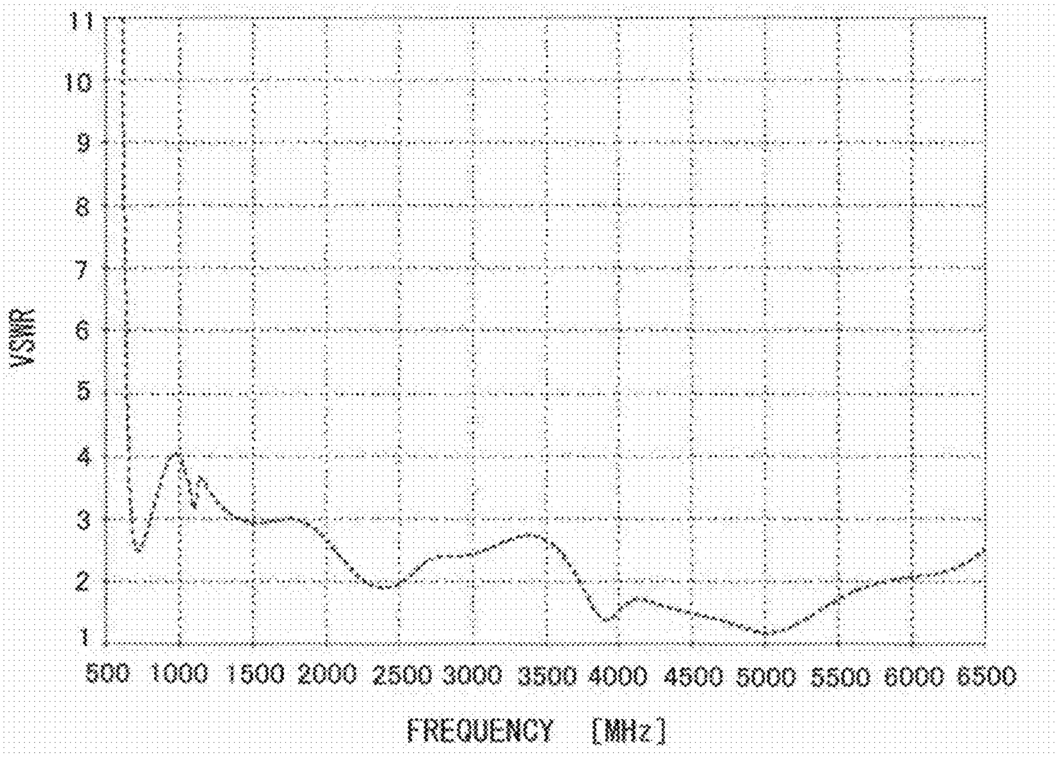
FIG. 32B is a graph showing a VSWR characteristic of an output end of a coaxial cable F214 in the sixth embodiment.
Figure 32C:
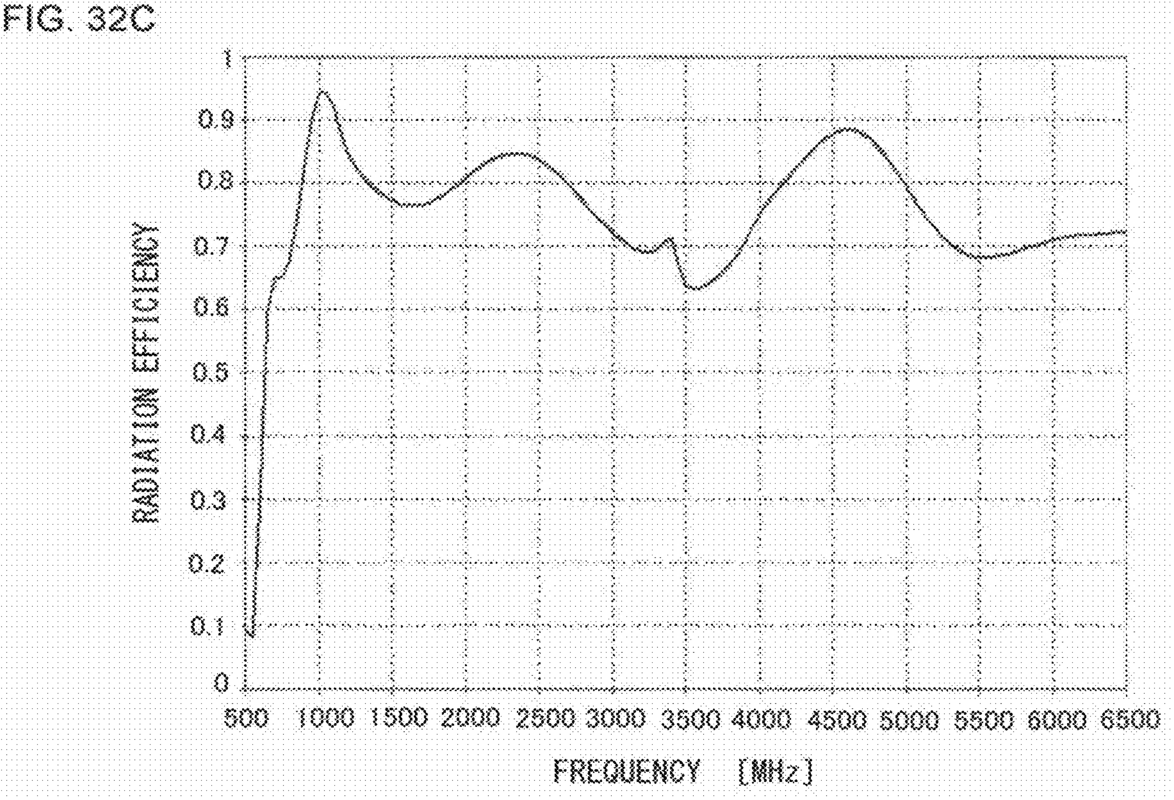
FIG. 32C is a graph showing a radiation efficiency characteristic of the output end of the coaxial cable F114 in the sixth embodiment.
Figure 32D:
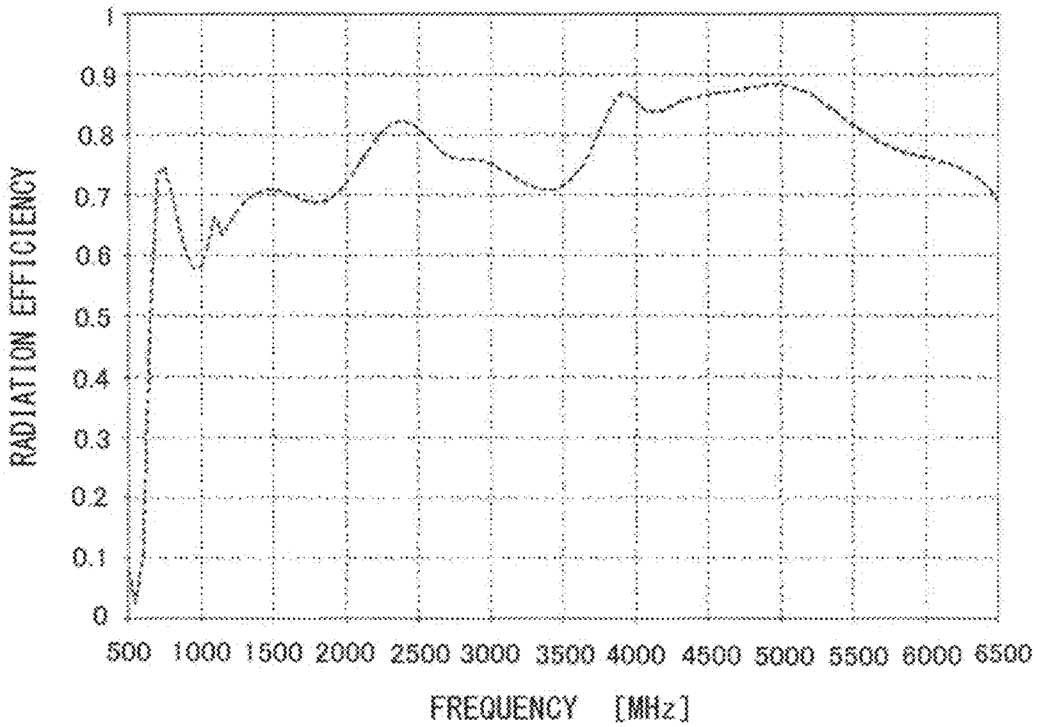
FIG. 32D is a graph showing a radiation efficiency characteristic of the output end of the coaxial cable F214 in the sixth embodiment.
Figure 32E:
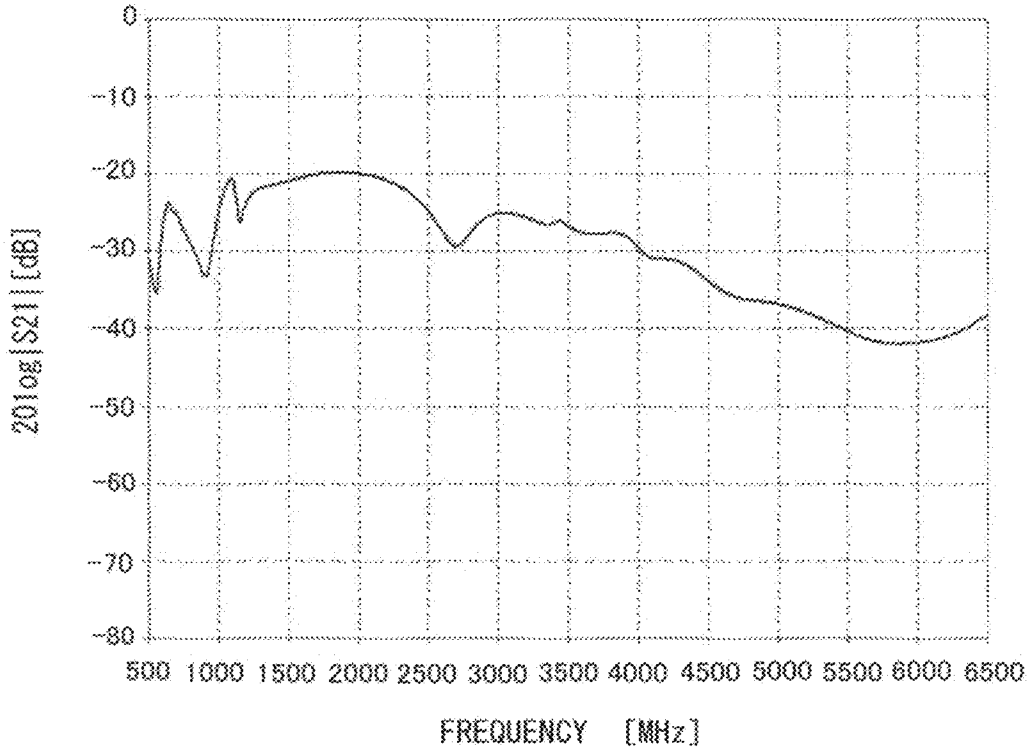
FIG. 32E is a graph showing a passing power characteristic from the output end of the coaxial cable F114 to the output end of the coaxial cable F214 in the sixth embodiment.
Figure 32F:
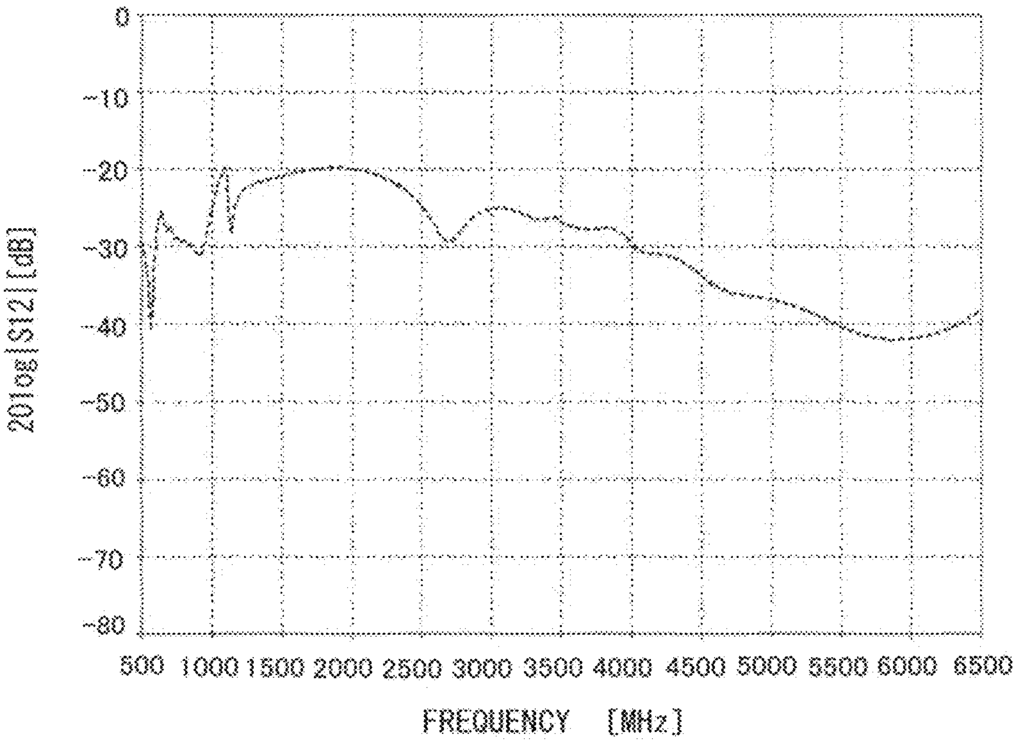
FIG. 32F is a graph showing a passing power characteristic from the output end of the coaxial cable F214 to the output end of the coaxial cable F114 in the sixth embodiment.
Figure 32G:
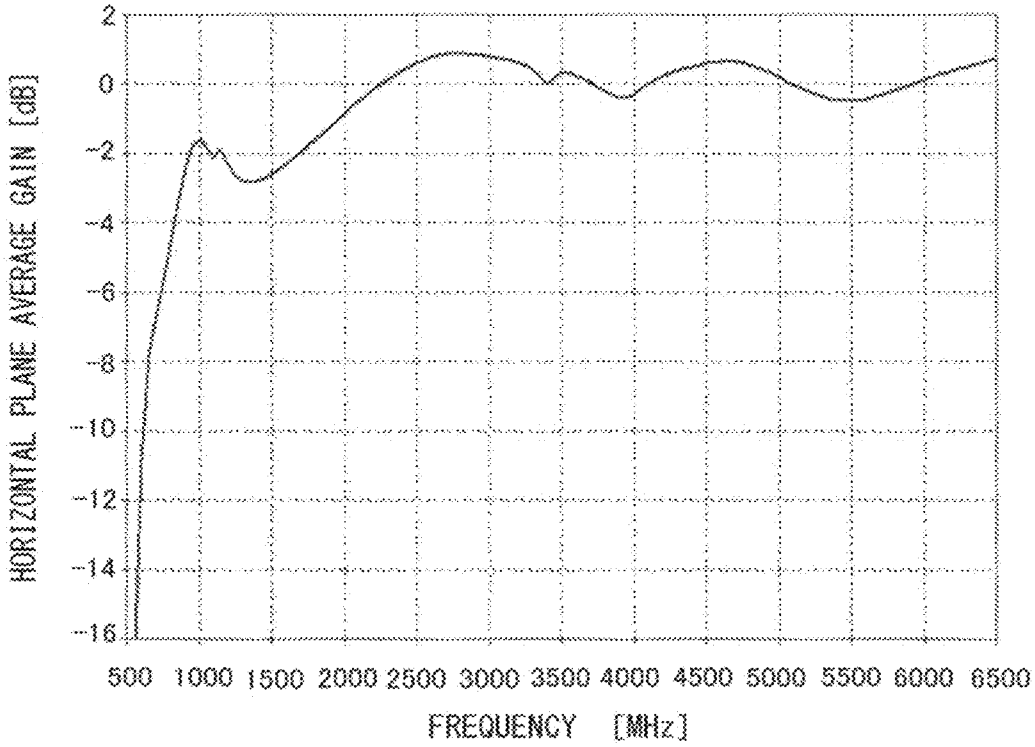
FIG. 32G is a graph showing an average gain characteristic in a horizontal plane of the output end of the coaxial cable F114 in the arrangement of FIG. 31A.
Figure 32H:
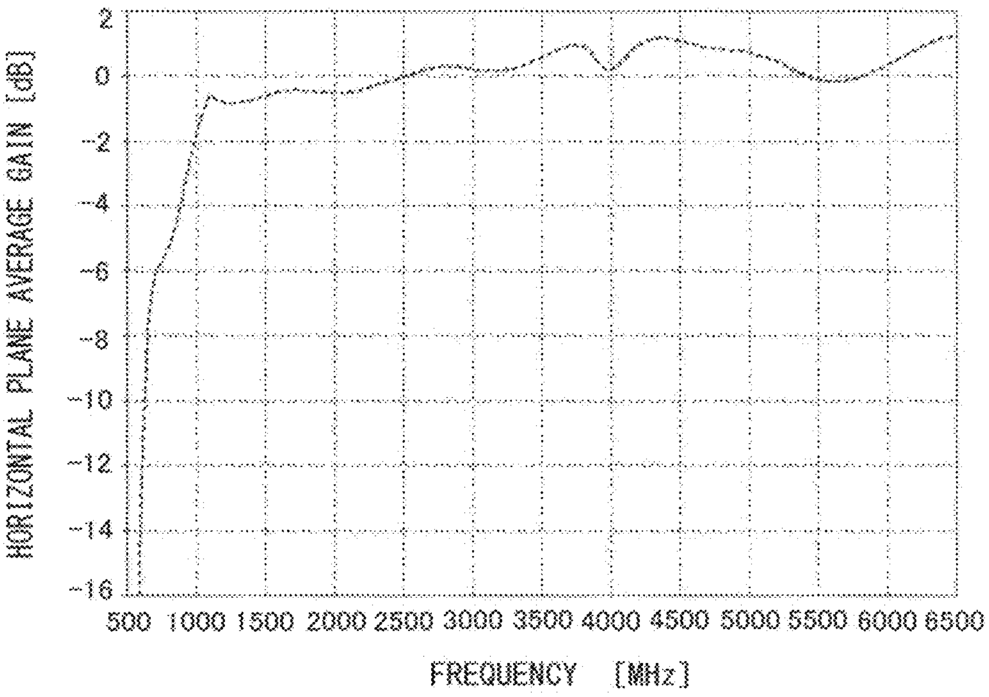
FIG. 32H is a graph showing an average gain characteristic in the horizontal plane of the output end of the coaxial cable F214 in the arrangement of FIG. 31A.

FIG. 32A is a graph showing a VSWR characteristic of the output end of the coaxial cable F114, and FIG. 32B is a graph showing a VSWR characteristic of the output end of the coaxial cable F214. FIG. 32C is a graph showing a radiation efficiency characteristic of the output end of the coaxial cable F114, and FIG. 32D is a graph showing a radiation efficiency characteristic of the output end of the coaxial cable F214. In each of the graphs, the horizontal axis represents a frequency (MHz). Additionally, FIG. 32E is a graph showing a passing power characteristic from the output end of the coaxial cable F114 to the output end of the coaxial cable F214, and FIG. 32F is a graph showing a passing power characteristic from the output end of the coaxial cable F214 to the output end of the coaxial cable F114. The vertical axis of FIG. 32E represents 20 Log|S21| (dB), the vertical axis of FIG. 32F represents 20 Log|S12| (dB), and each horizontal axis of FIGS. 32E and 32F represents a frequency (MHz). FIG. 32G is a graph showing an average gain characteristic in a horizontal plane (x-y plane) of the output end of the coaxial cable F114 in the arrangement of FIG. 31A. FIG. 32H is a graph showing an average gain characteristic in the horizontal plane (x-y plane) of the output end of the coaxial cable F214. In each of the graphs, the horizontal axis represents a frequency (MHz).

As can been understood from these antenna characteristics, although the antenna unit has an extremely small size having the z-direction length of less than 60 mm, the x-direction length of less than 80 mm, and the y-direction length of less than 15 mm, it can be used and practically used in a low frequency region including 698 MHz and the frequencies before and after 698 MHz, for example.

A configuration in which the antenna unit includes the proximal end regions formed on the boards and the extending regions formed by a sheet metal and these regions are electrically connected can be applied to examples other than the example illustrated in FIGS. 31A to 31C. The above-described configuration can be also applied to an antenna unit having another configuration in which one first element and one second element are provided, for example.

Seventh Embodiment

Figure 33A:
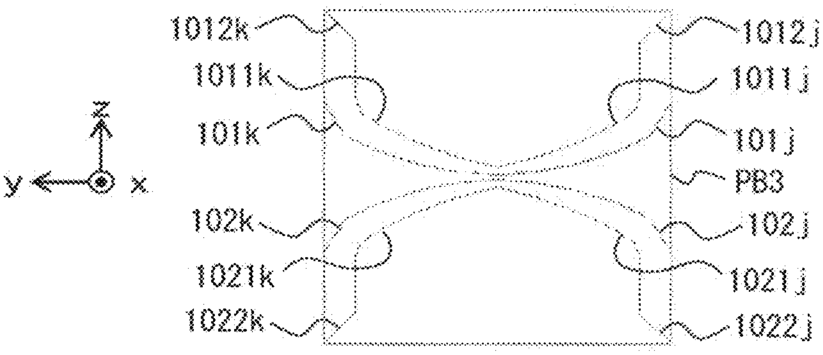
FIG. 33A is a front view of first elements in a seventh embodiment.
Figure 33B:
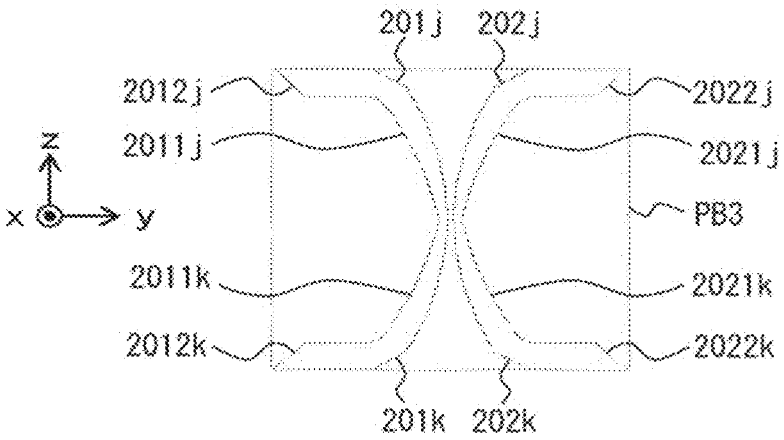
FIG. 33B is a front view of second elements in the seventh embodiment.
Figure 33C:
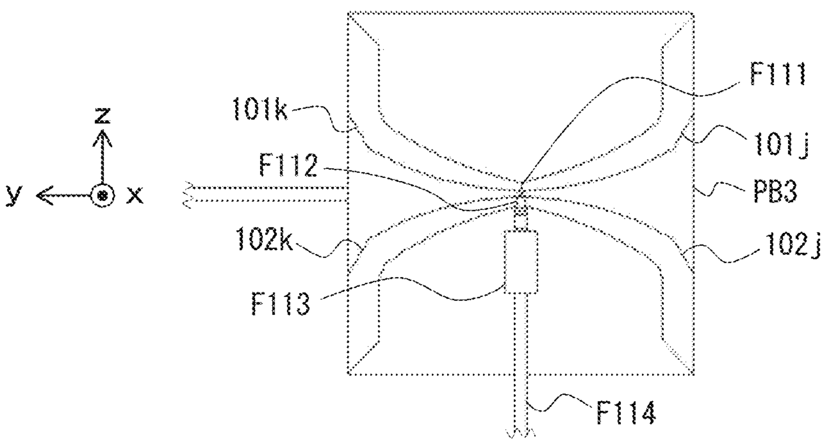
FIG. 33C is a front view illustrating a feeding state of the first elements in the seventh embodiment.
Figure 33D:
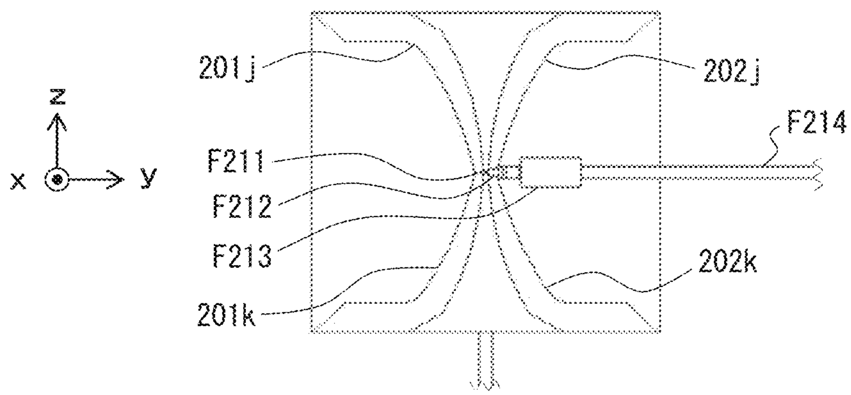
FIG. 33D is a front view illustrating a feeding state of second elements in the seventh embodiment.
Figure 33E:
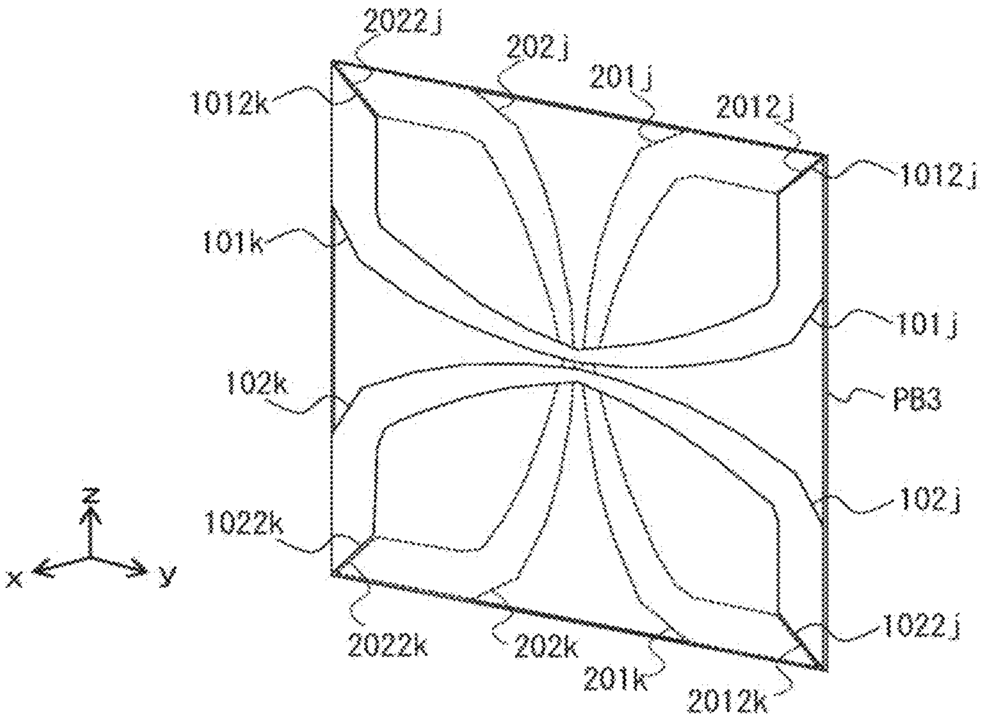
FIG. 33E is a perspective view for illustrating the overall state of the first elements and the second elements.
Figure 33F:
FIG. 33F is a side view of the antenna unit of the seventh embodiment.

In a seventh embodiment, an example will be described in which each element of an antenna unit is formed by a print on a board, as an application of the sixth embodiment. FIG. 33A is a front view of a pair of first elements in the seventh embodiment, FIG. 33B is a front view of a pair of second elements, FIG. 33C is a front view illustrating a feeding state of the pair of first elements, and FIG. 33D is a front view illustrating a feeding state of the pair of second elements. FIG. 33E is a perspective view for illustrating the overall state of the first elements and the second elements, and FIG. 33F is a side view of the antenna unit. A board is a square-shaped PCB having a thickness of 0.8 mm and a side length of 87 mm. For convenience, components which are similar to those of the antenna unit of each embodiment described above are described by denoting the same reference numerals thereto.

In the antenna unit of the seventh embodiment, the pair of first elements are formed by being printed on one side (front surface) of a board PB3 having planar front and rear surfaces, and the pair of second elements are formed by being printed on the other side (rear surface) of the board PB3, in which the polarized wave direction of the pair of second elements is orthogonal to that of the pair of first elements.

Referring to FIG. 33A, one first element of the pair of first elements includes two arms 101*j* and 101*k* that extend in a direction away from each other from a proximal end portion to which a feed point is connectable. The arm 101*j* includes a region 1011*j* in which a width is increased as being away from the proximal end portion, and an open end portion 1012*j* that is straightly cut from another corner of the board PB3 to a center portion of the board PB3. The arm 101*k* includes a region 1011*k* in which a width is increased as being away from the proximal end portion, and an open end portion 1012*k* that is straightly cut from one corner of the board PB3 to the center portion of the board PB3.

The other first element includes two arms 102*j* and 102*k* that extend in a direction away from each other from a proximal end portion to which the feed point is connectable. The arm 102*j* includes a region 1021*j* in which a width is increased as being away from a proximal end portion thereof, and an open end portion 1022*j* that is straightly cut from another corner of the board PB3 to the center portion of the board PB3. The arm 102*k* includes a region 1021*k* in which a width is increased as being away from the proximal end portion, and an open end portion 1022*k* that is straightly cut from another corner of the board PB3 to the center portion of the board PB3. Each element of the pair of first elements acts as a self-similarity antenna or an antenna that acts based on similar operating principle to the self-similarity antenna.

A signal line F111 of the coaxial cable F114 is conductively connected to the proximal end portion of the one first element, as illustrated in FIG. 33C. A ground line F112 of the coaxial cable F114 is conductively connected to the proximal end portion of the other first element. This enables the pair of first elements to act as two dipole antennas or two tapered-slot antennas. A ferrite core F113 is attached to the coaxial cable F114.

In the coaxial cable F114, a connection point with the first elements is regarded as a feed point K1, and an end portion opposite to the feed point K1 is regarded as an output end.

Referring to FIG. 33B, one second element of the pair of second elements includes two arms 201*j* and 201*k* that extend in a direction away from each other from a proximal end portion to which a feed point is connectable. The arm 201*j* includes a region 2011*j* in which a width is increased as being away from the proximal end portion, and an open end portion 2012*j* that is straightly cut from another corner of the board PB3 to a center portion of the board PB3. The arm 201*k* includes a region 2011*k* in which a width is increased as being away from the proximal end portion, and an open end portion 2012*k* that is straightly cut from one corner of the board PB3 to the center portion of the board PB3.

The other second element includes two arms 202*j* and 202*k* that extend in a direction away from each other from a proximal end portion to which the feed point is connectable. The arm 202*j* includes a region 2021*j* in which a width is increased as being away from a proximal end portion thereof, and an open end portion 2022*j* that is straightly cut from another corner of the board PB3 to the center portion of the board PB3. The arm 202*k* includes a region 2021*k* in which a width is increased as being away from the proximal end portion, and an open end portion 2022*k* that is straightly cut from another corner of the board PB3 to the center portion of the board PB3. Each element of the pair of second elements acts as a self-similarity antenna or an antenna that acts based on similar operating principle to the self-similarity antenna.

A signal line F211 of a coaxial cable F214 is conductively connected to the proximal end portion of the one second element, as illustrated in FIG. 33D. A ground line F212 of the coaxial cable F214 is conductively connected to the proximal end portion of the other second element. This enables the pair of second elements to act as two dipole antennas. A ferrite core F213 is attached to the coaxial cable F214.

In the coaxial cable F214, a connection point with the second elements is regarded as a feed point K2, and an end portion opposite to the feed point K2 is regarded as an output end.

As illustrated in FIG. 33E, a split ring is formed between an open end portion (for example, the open end portion 1012*j*) of the arm of the first element on the front surface side of the board PCB3 and an open end portion (for example, the open end portion 2012*j*) of the arm of the second element on the rear surface side of the board PCB3, the arm of the second element being closest to the arm of the first element. Therefore, the first element and the second element are not conductively connected to each other, but are capacitively coupled, and act as a loop antenna.

Figure 34A:
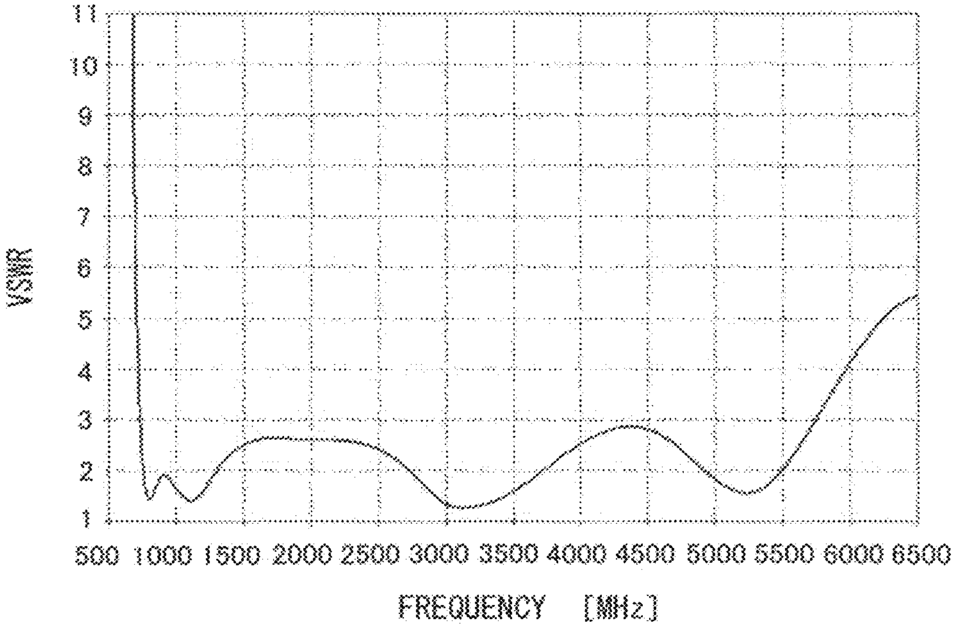
FIG. 34A is a graph showing a VSWR characteristic of an output end of a coaxial cable F114 in the seventh embodiment.
Figure 34B:
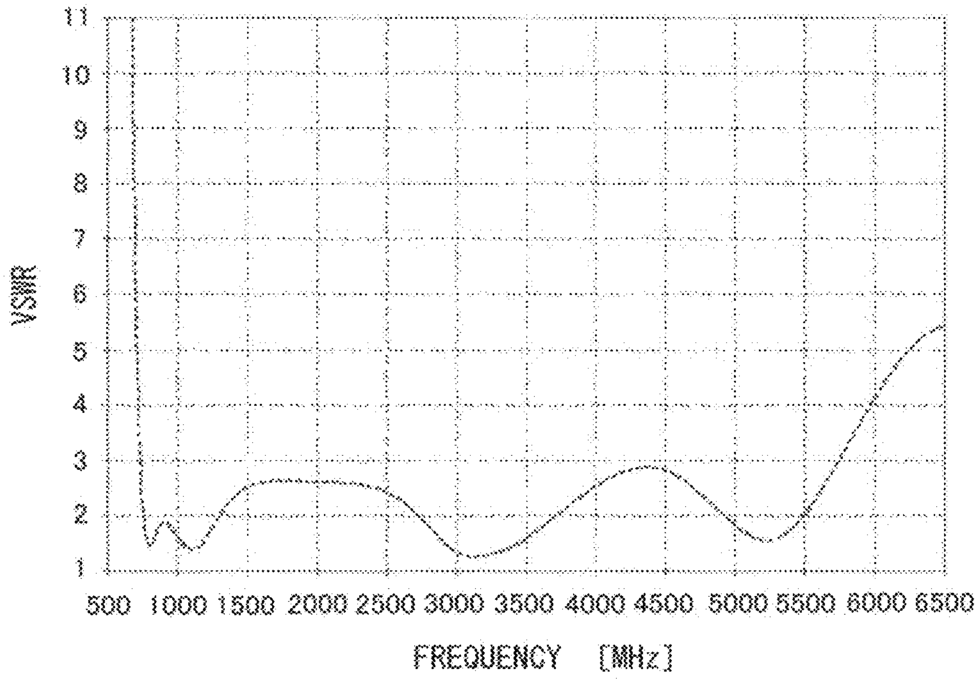
FIG. 34B is a graph showing a VSWR characteristic of an output end of a coaxial cable F214 in the seventh embodiment.
Figure 34C:
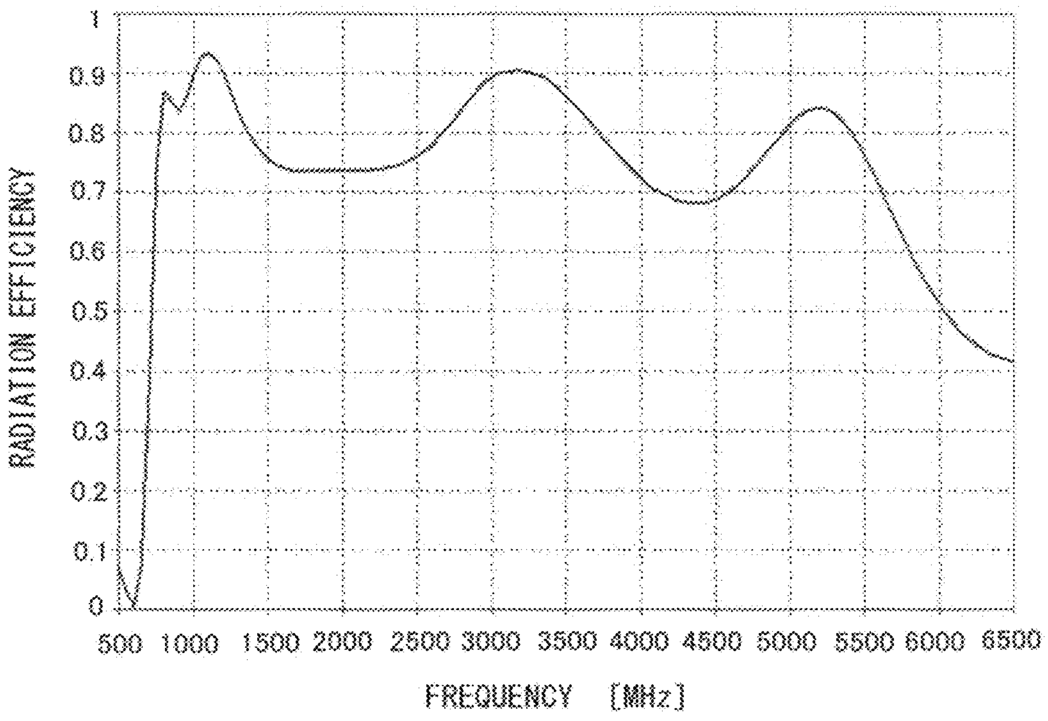
FIG. 34C is a graph showing a radiation efficiency characteristic of the output end of the coaxial cable F114 in the seventh embodiment.
Figure 34D:
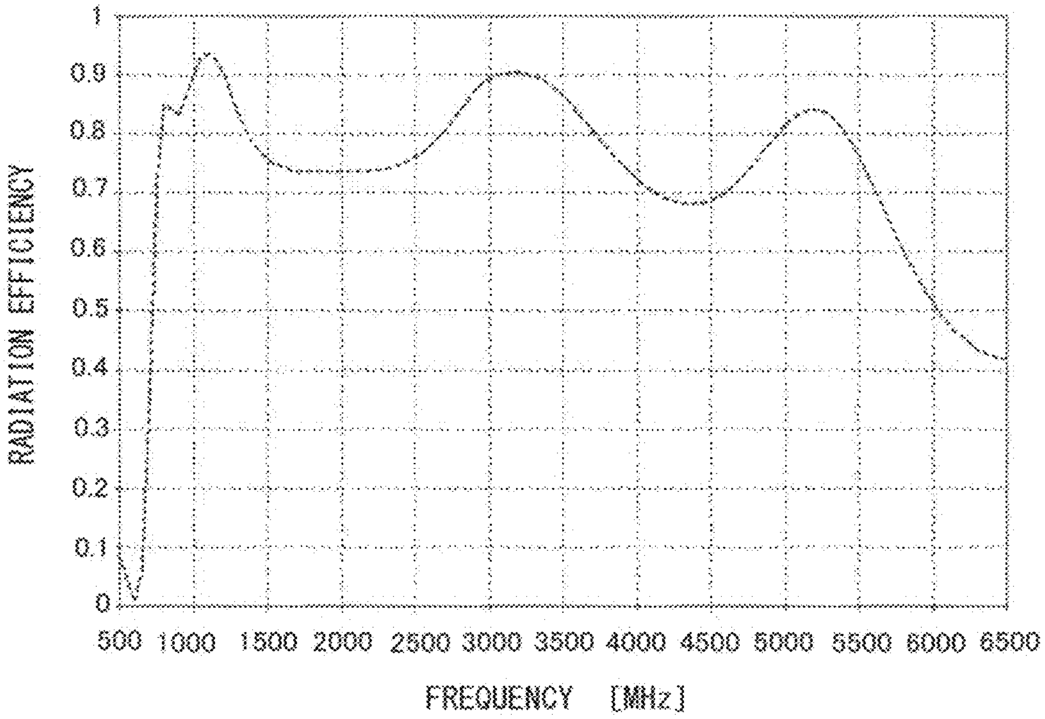
FIG. 34D is a graph showing a radiation efficiency characteristic of the output end of the coaxial cable F214 in the seventh embodiment.
Figure 34E:
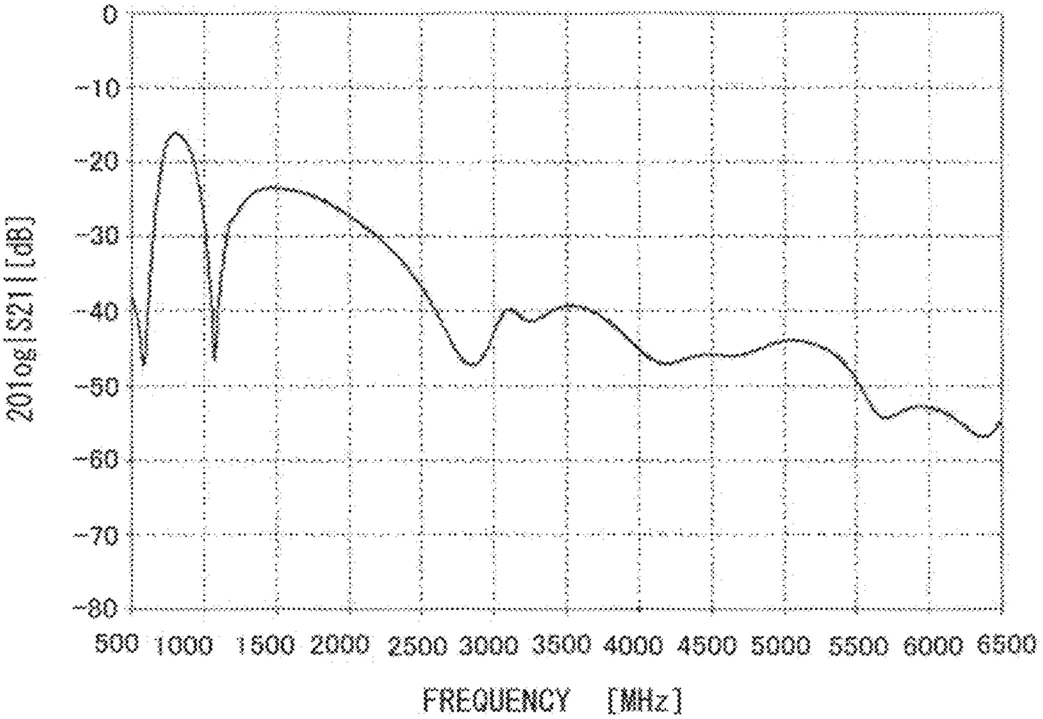
FIG. 34E is a graph showing a passing power characteristic from the output end of the coaxial cable F114 to the output end of the coaxial cable F214 in the seventh embodiment.
Figure 34F:
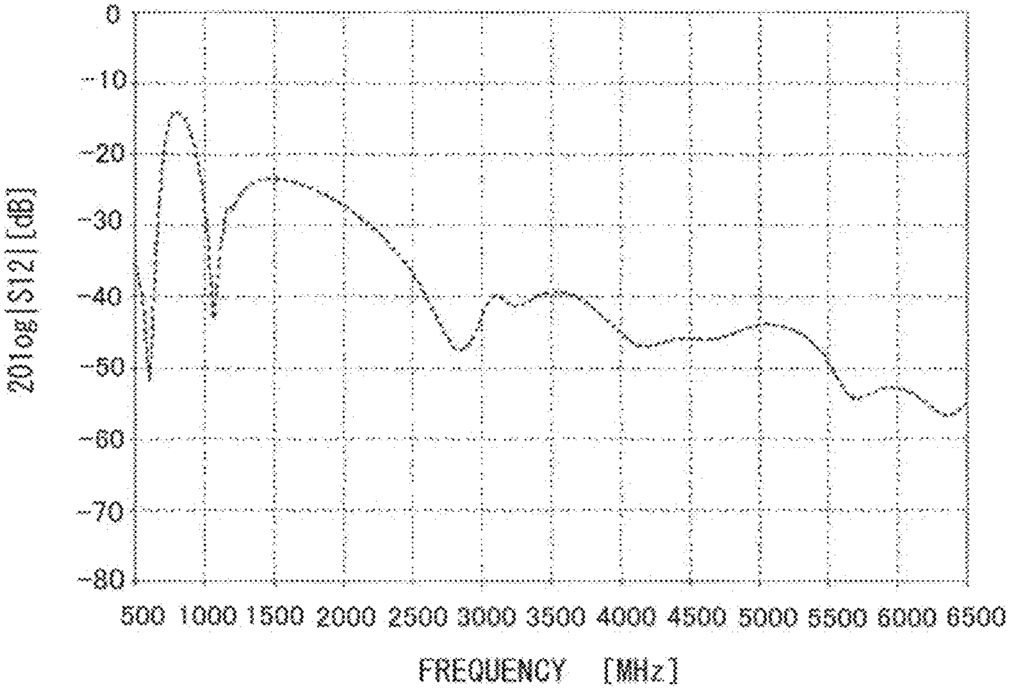
FIG. 34F is a graph showing a passing power characteristic from the output end of the coaxial cable F214 to the output end of the coaxial cable F114 in the seventh embodiment.
Figure 34G:
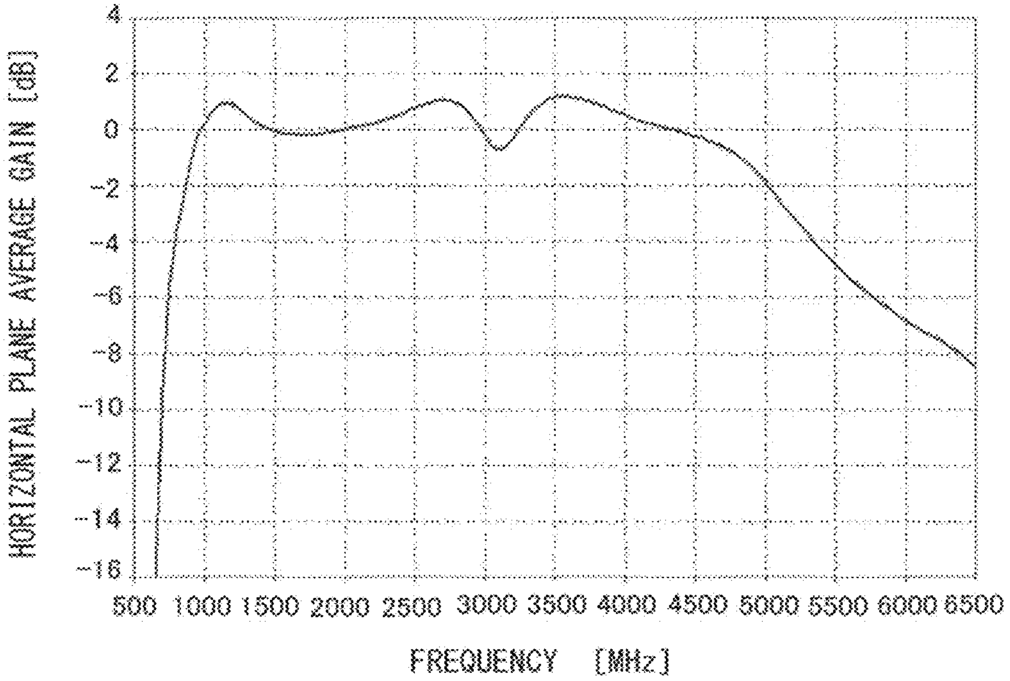
FIG. 34G is a graph showing an average gain characteristic in a horizontal plane of the output end of the coaxial cable F114 in the arrangement of FIG. 31A.
Figure 34H:
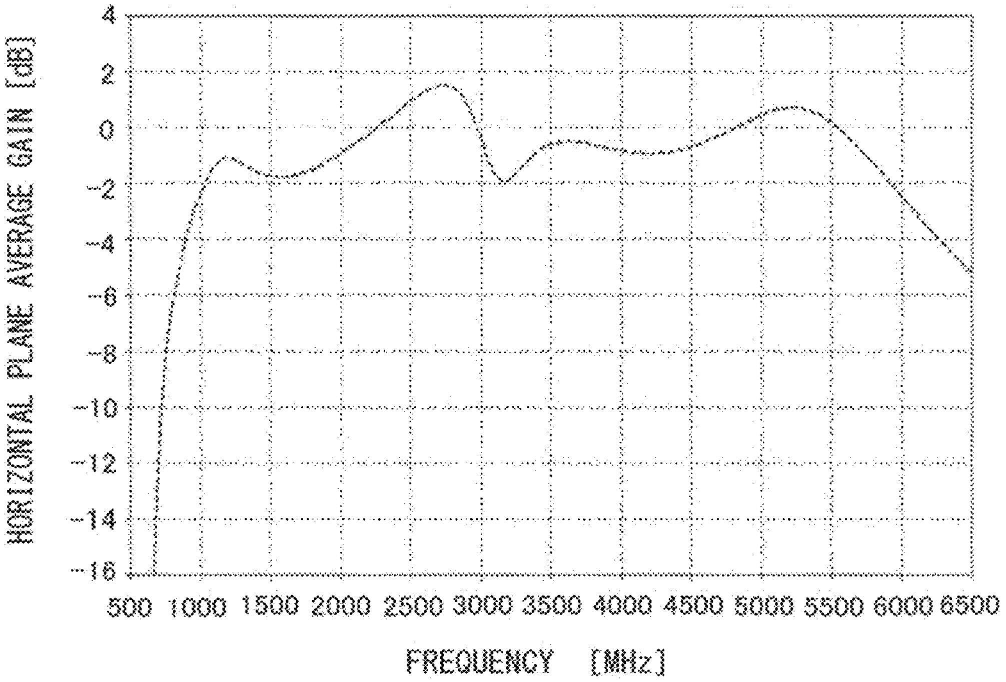
FIG. 34H is a graph showing an average gain characteristic in the horizontal plane of the output end of the coaxial cable F214 in the seventh embodiment.

The antenna characteristics of the antenna unit of the seventh embodiment will be described. FIG. 34A is a graph showing a VSWR characteristic of the output end of the coaxial cable F114, and FIG. 34B is a graph showing a VSWR characteristic of the output end of the coaxial cable F214. FIG. 34C is a graph showing a radiation efficiency characteristic of the output end of the coaxial cable F114, and FIG. 34D is a graph showing a radiation efficiency characteristic of the output end of the coaxial cable F214. In each of the graphs, the horizontal axis represents a frequency (MHz). Additionally, FIG. 34E is a graph showing a passing power characteristic from the output end of the coaxial cable F114 to the output end of the coaxial cable F214, and FIG. 34F is a graph showing a passing power characteristic from the output end of the coaxial cable F214 to the output end of the coaxial cable F114. The vertical axis of FIG. 34E represents 20 Log|S21| (dB), the vertical axis of FIG. 34F represents 20 Log|S12| (dB), and each horizontal axis of FIGS. 34E and 34F represents a frequency (MHz). FIG. 34G is a graph showing an average gain characteristic in a horizontal plane (x-y plane) of the output end of the coaxial cable F114 in the arrangement of FIG. 33A. FIG. 34H is a graph showing an average gain characteristic in the horizontal plane (x-y plane) of the output end of the coaxial cable F214. In each of the graphs, the horizontal axis represents a frequency (MHz).

As can been understood from these antenna characteristics, as shown in FIG. 33F, although the square-shaped antenna unit has an extremely small size having one side length of 87 mm and is formed in a thin profile having a thickness in which a thickness of a printed portion is added to 0.8 mm, it can be used and practically used in a low frequency region including 698 MHz and the frequencies before and after 698 MHz, for example.

In the seventh embodiment, the description has been made assuming that the first elements and the second elements are formed on the front surface and rear surface of one board, respectively, but they may be formed using two boards. That is, the pair of first elements are formed by a conductive pattern on a first surface of one of the boards, and the pair of second elements are formed by a conductive pattern on a second surface of the other board facing the first surface, so that the conductive patterns may be conductively connected to each other through a conductive through hole or the like.

Modification Example of Seventh Embodiment

In the seventh embodiment, the description has been made assuming that there is not conductive connection (a split ring is formed) between an open end portion (for example, the open end portion 1012*j*) of the arm of the first element on the front surface side of the board PCB3 and an open end portion (for example, the open end portion 2012*j*) of the arm of the second element on the rear surface side of the board PCB3, the arm of the second element being closest to the arm of the first element. Hereinafter, as the modification example, the description will be made assuming that an open end portion (for example, the open end portion 1012*j*) of the arm of the first element on the front surface side of the board PCB3 is conductively connected to an open end portion (for example, the open end portion 2012*j*) of the arm of the second element on the rear surface side of the board PCB3, the arm of the second element being closest to the arm of the first element. The conductive connection between the open end portion (for example, the open end portion 1012*j*) of the arm of the first element on the front surface side of the board PCB3 and the open end portion (for example, the open end portion 2012*j*) of the arm of the second element on the rear surface side of the board PCB3, the arm of the second element being closest to the arm of the first element, can be performed by solder, conductive via holes, or the like.

Figure 35A:
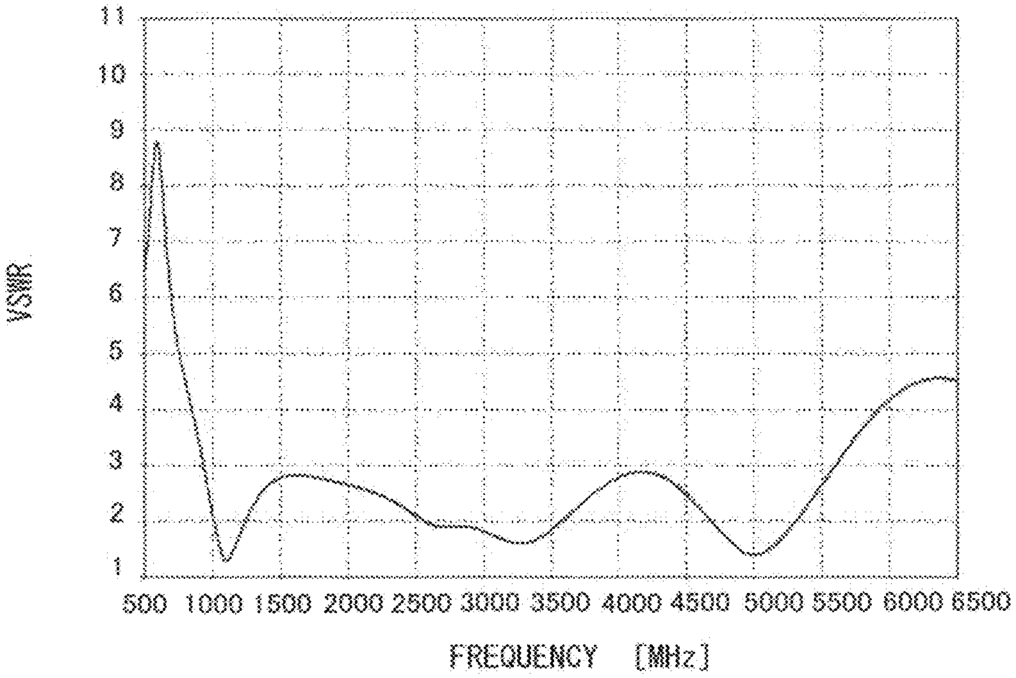
FIG. 35A is a graph showing a VSWR characteristic of the output end of the coaxial cable F114 according to a modification example.
Figure 35B:
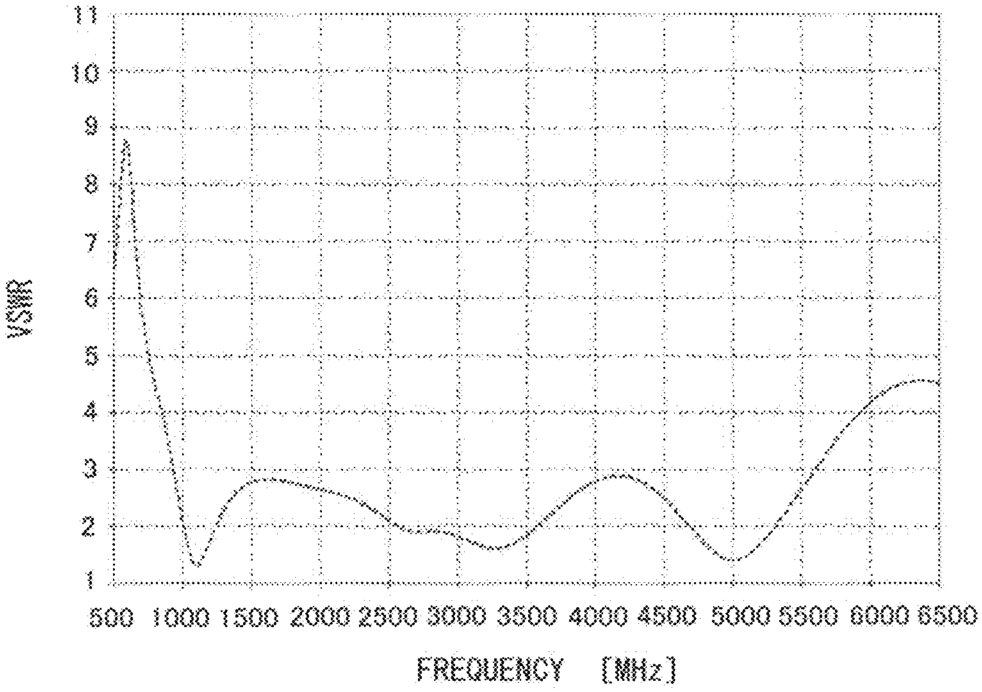
FIG. 35B is a graph showing a VSWR characteristic of the output end of the coaxial cable F214 according to the modification example.
Figure 35C:
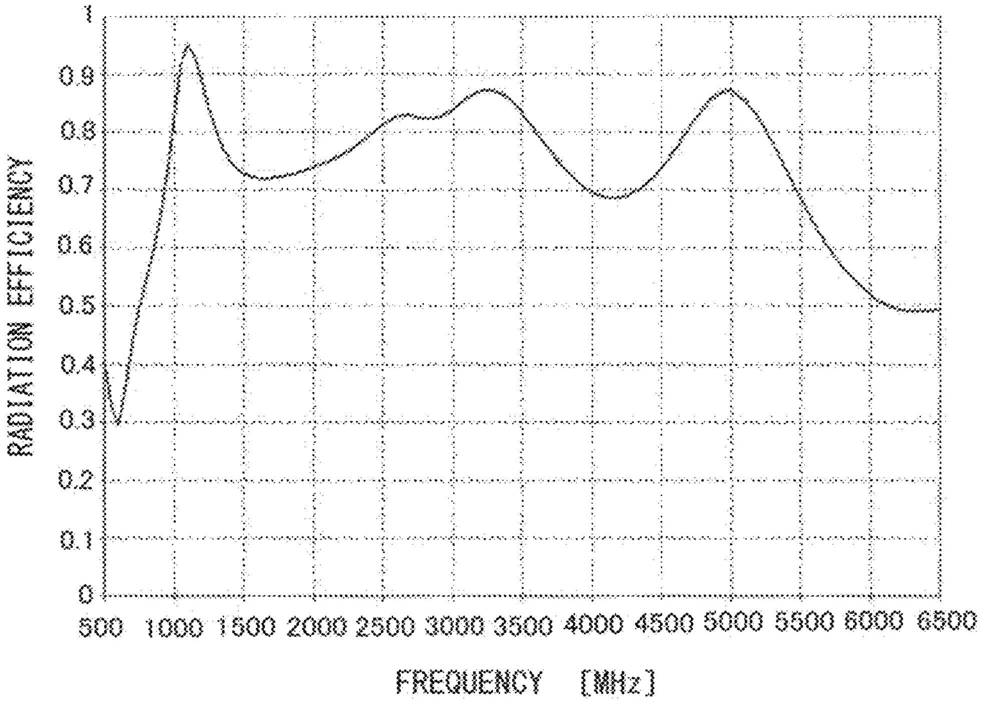
FIG. 35C is a graph showing a radiation efficiency characteristic of the output end of the coaxial cable F114 according to the modification example.
Figure 35D:
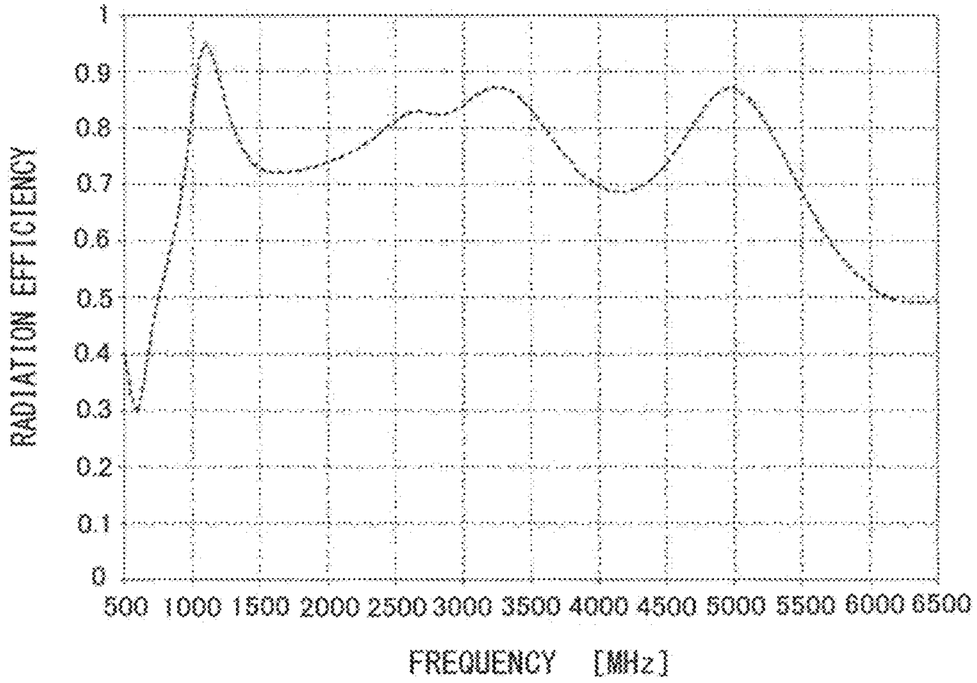
FIG. 35D is a graph showing a radiation efficiency characteristic of the output end of the coaxial cable F214 according to the modification example.
Figure 35E:
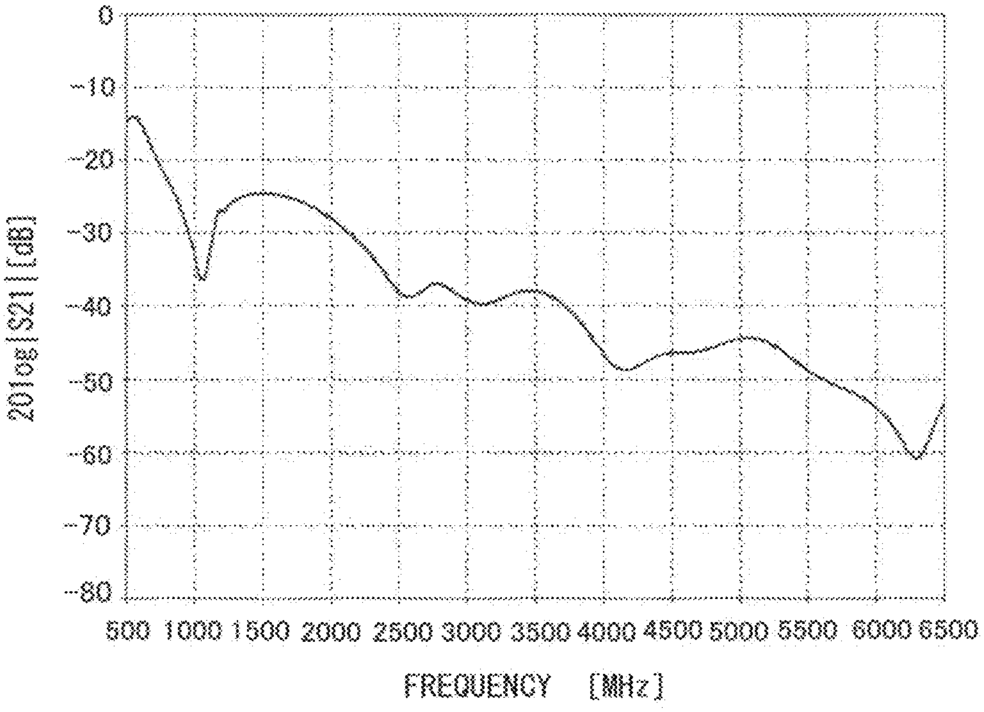
FIG. 35E is a graph showing a passing power characteristic from the output end of the coaxial cable F114 to the output end of the coaxial cable F214 according to the modification example.
Figure 35F:
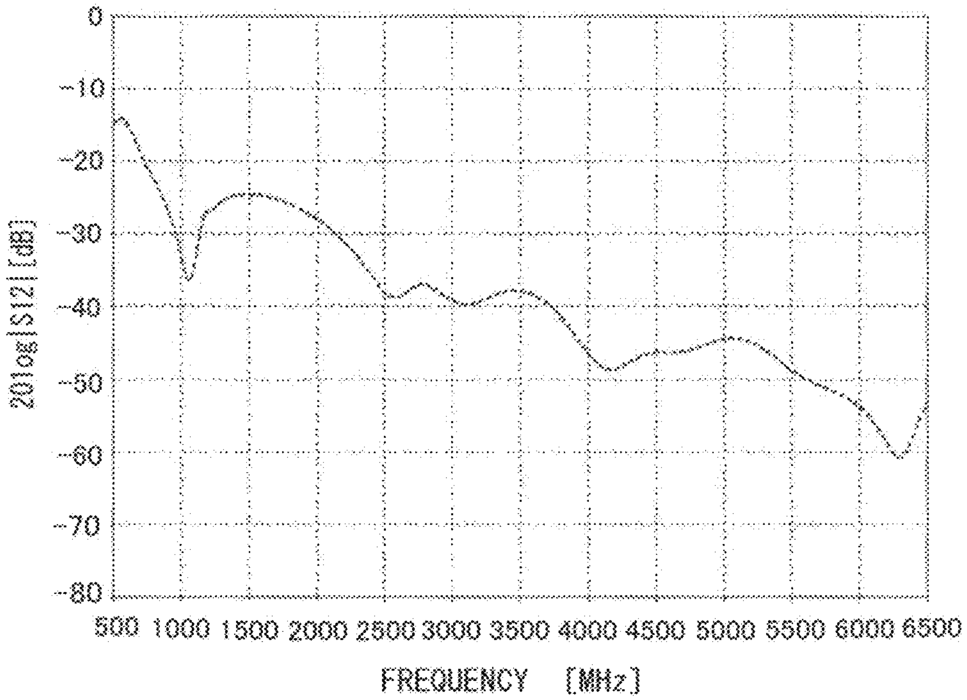
FIG. 35F is a graph showing a passing power characteristic from the output end of the coaxial cable F214 to the output end of the coaxial cable F114 according to the modification example.
Figure 35G:
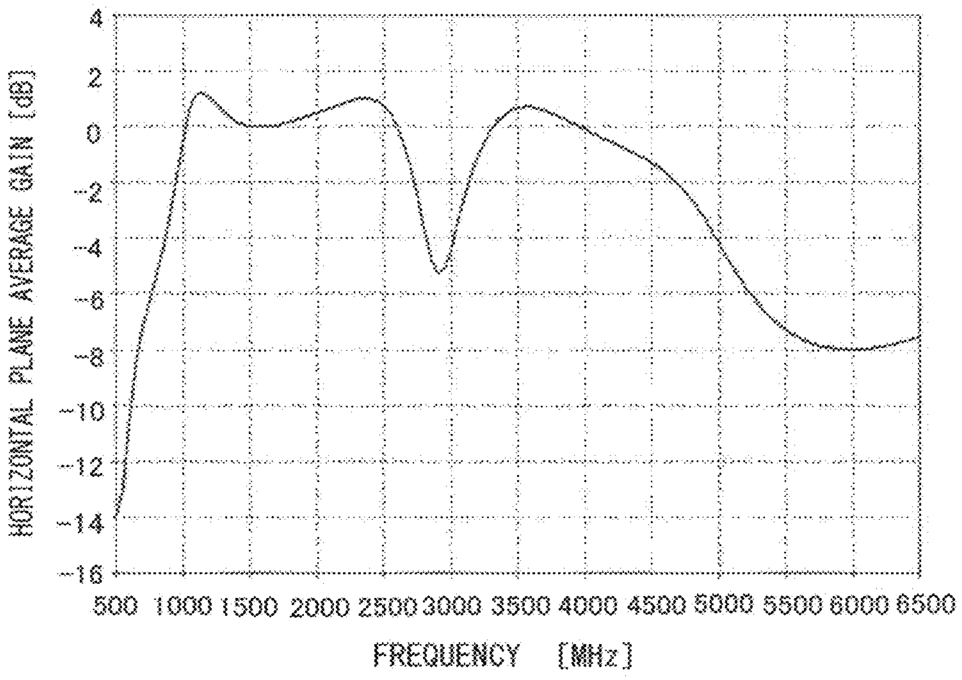
FIG. 35G is a graph showing an average gain characteristic in a horizontal plane of the output end of the coaxial cable F114 in the arrangement of FIG. 31A.
Figure 35H:
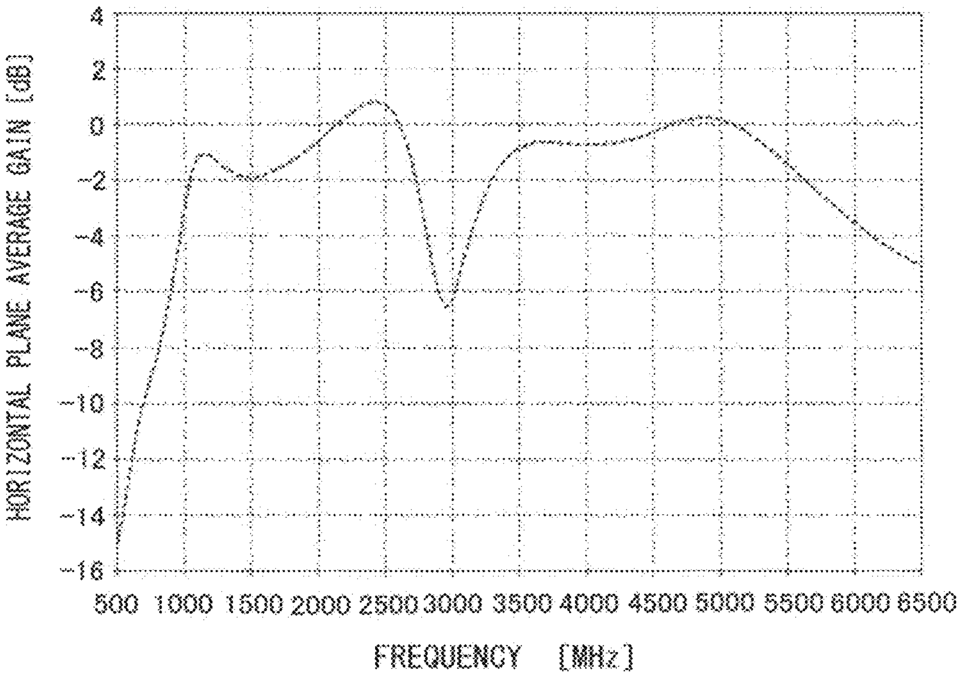
FIG. 35H is a graph showing an average gain characteristic in the horizontal plane of the output end of the coaxial cable F214 according to the modification example.

FIGS. 35A to 35H each show antenna characteristics of the antenna unit of the modification example of the seventh embodiment. The measurement conditions are similar to those of the seventh embodiment. FIG. 35A is a graph showing a VSWR characteristic of the output end of the coaxial cable F114, and FIG. 35B is a graph showing a VSWR characteristic of the output end of the coaxial cable F214. FIG. 35C is a graph showing a radiation efficiency characteristic of the output end of the coaxial cable F114, and FIG. 35D is a graph showing a radiation efficiency characteristic of the output end of the coaxial cable F214. In each of the graphs, the horizontal axis represents a frequency (MHz). Additionally, FIG. 35E is a graph showing a passing power characteristic from the output end of the coaxial cable F114 to the output end of the coaxial cable F214, and FIG. 35F is a graph showing a passing power characteristic from the output end of the coaxial cable F214 to the output end of the coaxial cable F114. The vertical axis of FIG. 35E represents 20 Log|S21| (dB), the vertical axis of FIG. 35F represents 20 Log|S12| (dB), and each horizontal axis of FIGS. 35E and 35F represents a frequency (MHz). FIG. 35G is a graph showing an average gain characteristic in a horizontal plane (x-y plane) of the output end of the coaxial cable F114 in the arrangement of FIG. 33A. FIG. 35H is a graph showing an average gain characteristic in the horizontal plane (x-y plane) of the output end of the coaxial cable F214. In each of the graphs, the horizontal axis represents a frequency (MHz).

As can been understood from the VSWR characteristics of the antenna, in the antenna of the seventh embodiment, the available frequency band is expanded to the frequency band of less than about 1 GHz as compared between the case where the open end portions of the arms that are closest to each other are conductively connected to each other and the case where the open end portions of the arms that are closest to each other are not conductively connected to each other as in the antenna unit of the seventh embodiment.

Eighth Embodiment

Figure 36A:
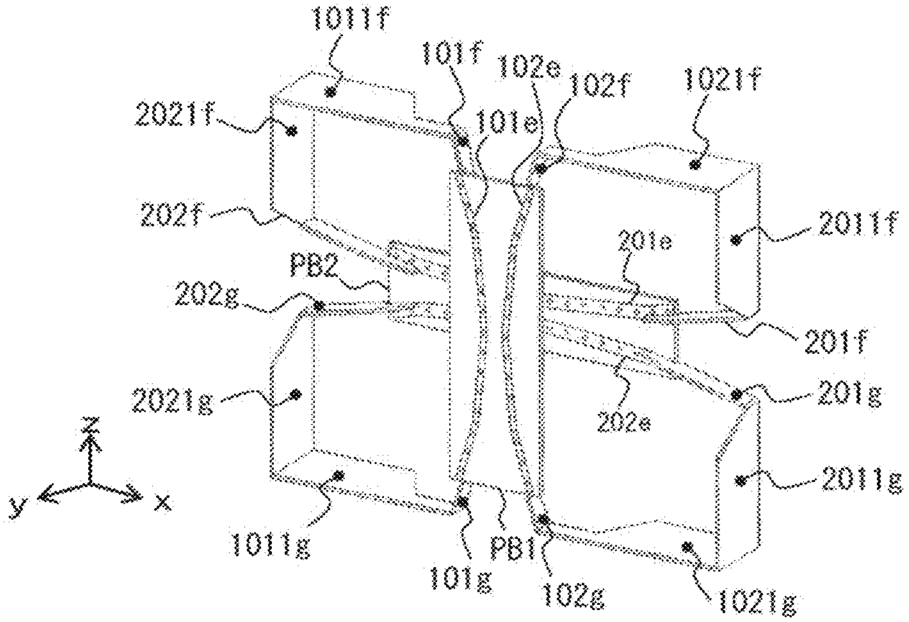
FIG. 36A is a perspective view illustrating an example of an overall configuration of an antenna unit of an eighth embodiment.
Figure 36B:
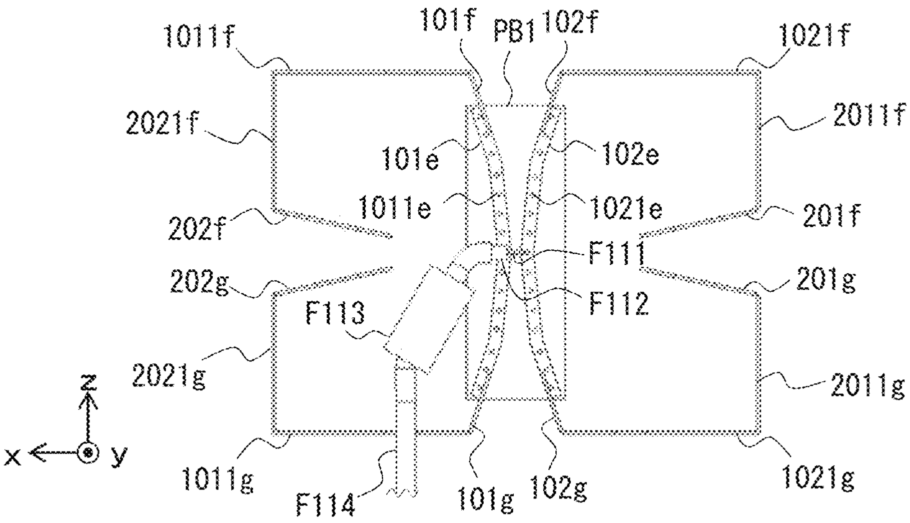
FIG. 36B is a front view illustrating a feeding state of first elements in the eighth embodiment.
Figure 36C:
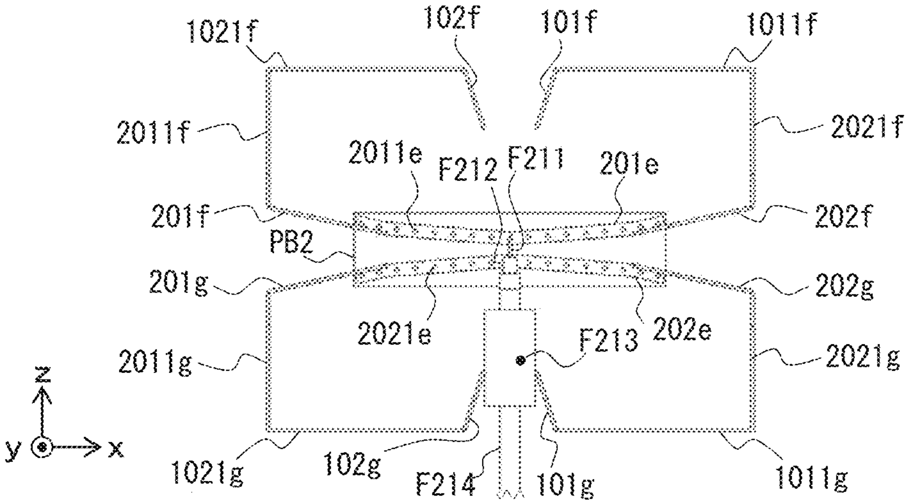
FIG. 36C is a front view illustrating a feeding state of second elements in the eighth embodiment.

In an eighth embodiment, the description will be made about an antenna unit having a configuration in which the open end portion of the first element on the front surface of the board is conductively connected to the open end portion of the second element of the rear surface of the board, the open end portion of the second element being closest to the open end portion of the first element, in the antenna unit of the sixth embodiment. FIG. 36A is a perspective view illustrating an example of an overall configuration of the antenna unit of the eighth embodiment, FIG. 36B is a front view illustrating a feeding state of a pair of first elements, and FIG. 36C is a front view illustrating a feeding state of a pair of second elements.

The antenna unit of the eighth embodiment is different from the antenna unit of the sixth embodiment in that no split ring is formed between the open end portion of the first element on the front surface of the board and the open end portion of the second element on the rear surface of the board, the open end portion of the second element being closest to the open end portion of the first element, that is, the first end portions in the open end portions that are closest to each other are conductively connected to each other, and in that the second end portions 1012*f*, 1012*g*, 1022*f*, and 1022*g* of the first elements and the second end portions 2012*f*, 2012*g*, 2022*f*, and 2022*g* of the second elements are not provided, the second end portions being formed on the surfaces parallel to the board PB1 by being bent from the respective first end portions and having a substantially triangular shape.

Figure 37A:
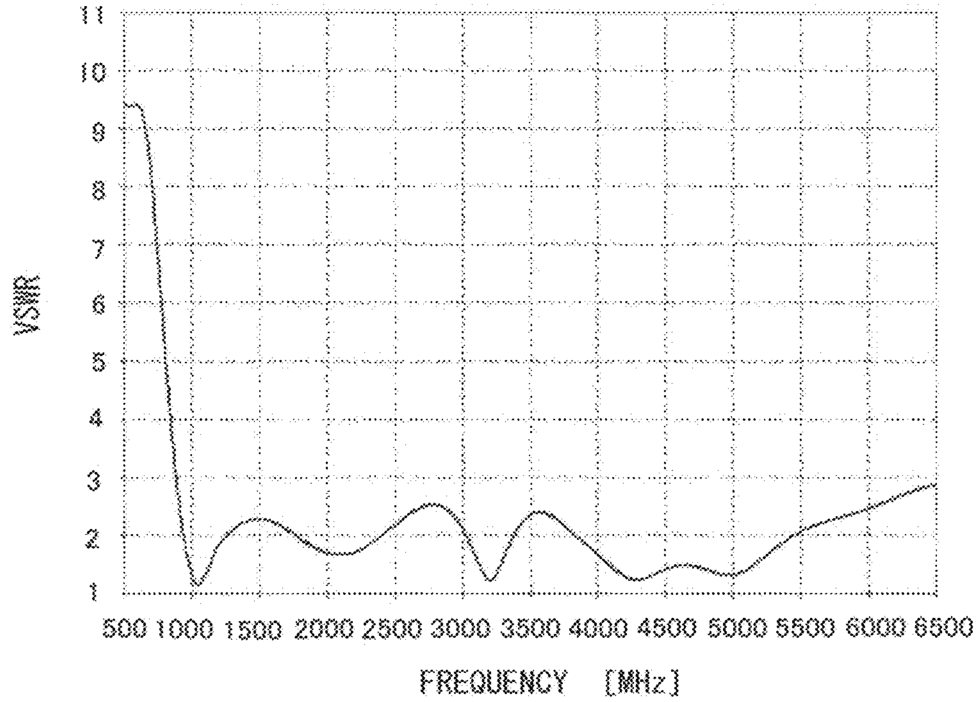
FIG. 37A is a graph showing a VSWR characteristic of an output end of a coaxial cable F114 in the eighth embodiment.
Figure 37B:
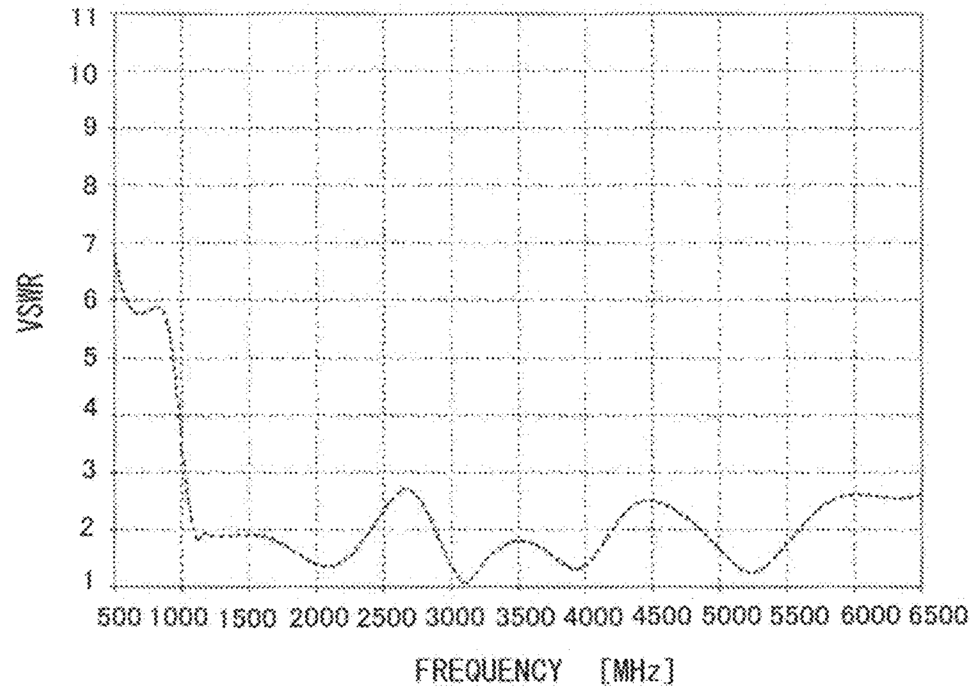
FIG. 37B is a graph showing a VSWR characteristic of an output end of a coaxial cable F214 in the eighth embodiment.
Figure 37C:
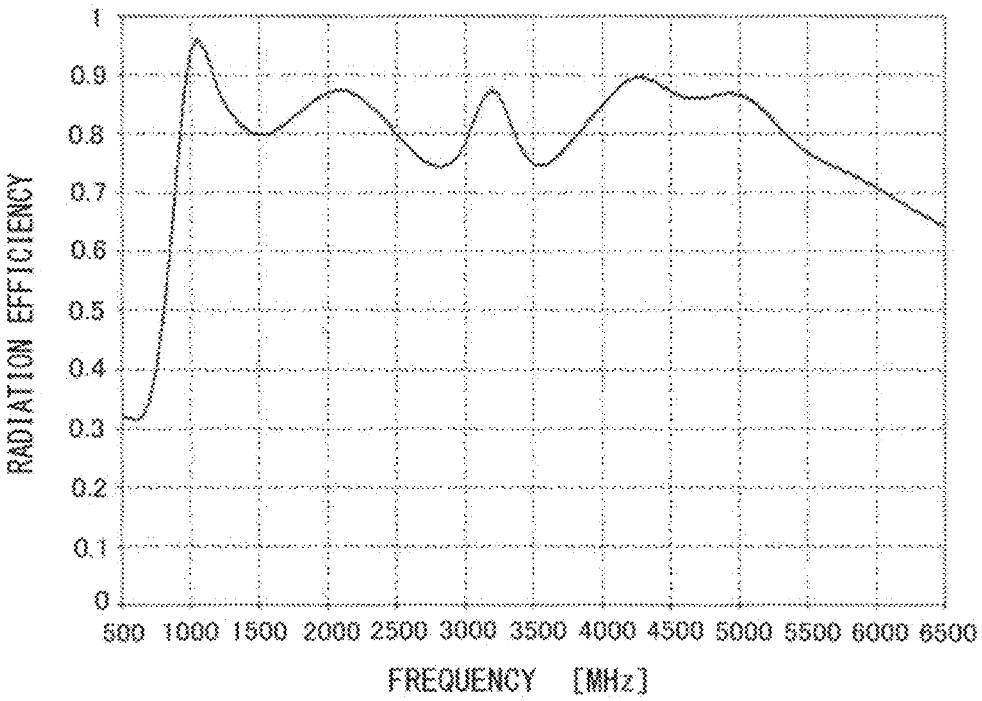
FIG. 37C is a graph showing a radiation efficiency characteristic of the output end of the coaxial cable F114 in the eighth embodiment.
Figure 37D:
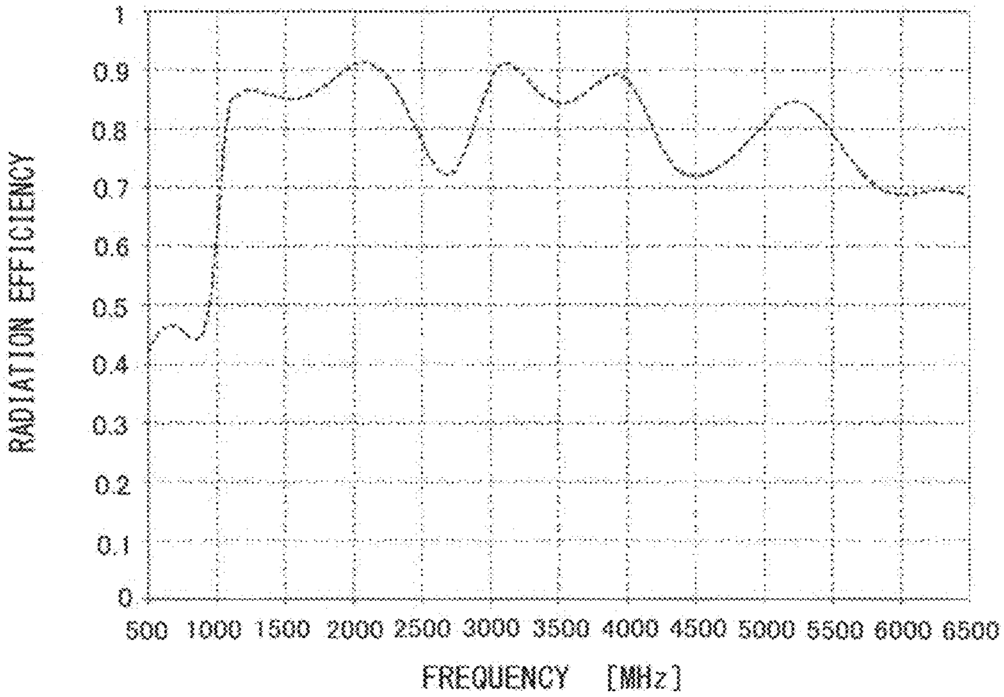
FIG. 37D is a graph showing a radiation efficiency characteristic of the output end of the coaxial cable F214 in the eighth embodiment.
Figure 37E:
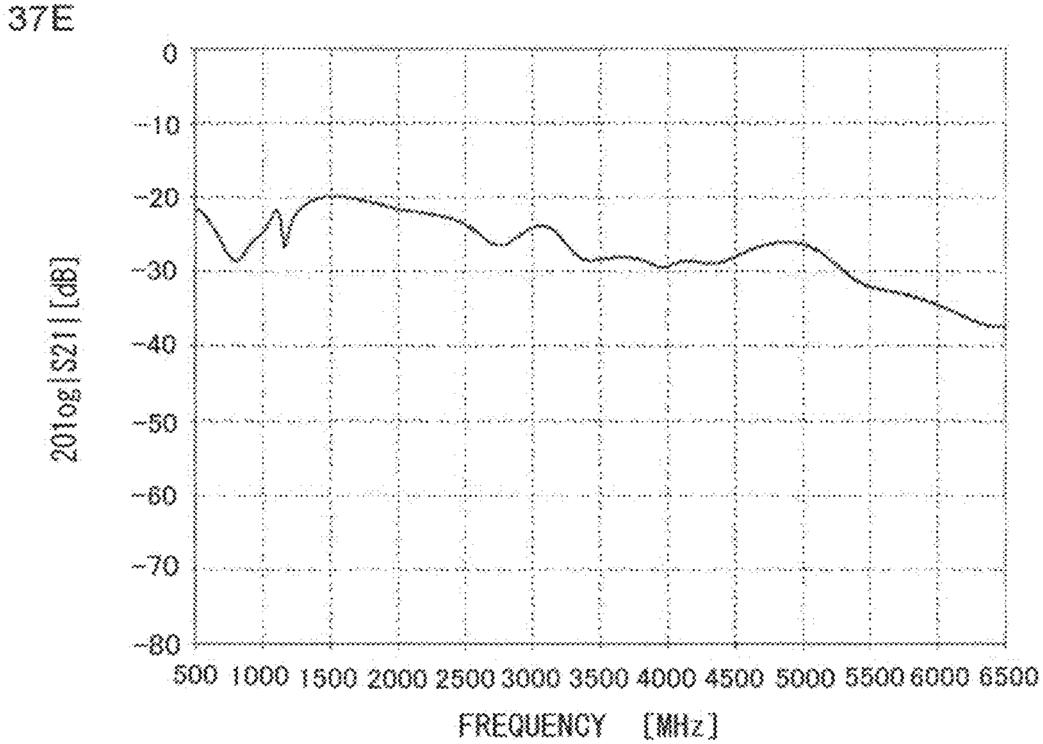
FIG. 37E is a graph showing a passing power characteristic from the output end of the coaxial cable F114 to the output end of the coaxial cable F214 in the eighth embodiment.
Figure 37F:
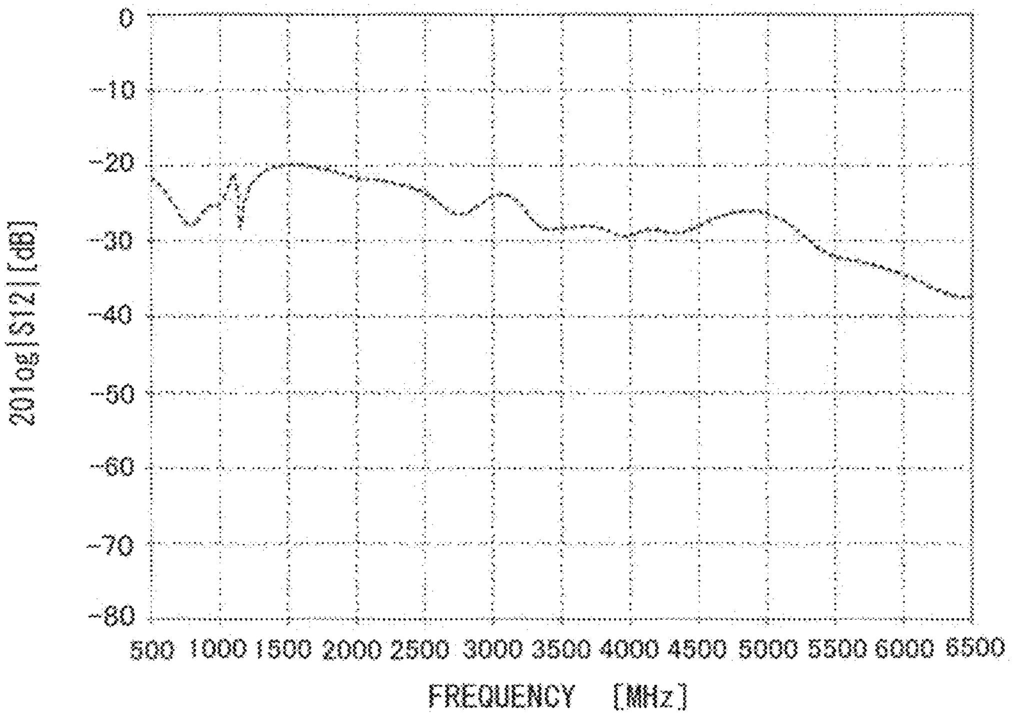
FIG. 37F is a graph showing a passing power characteristic from the output end of the coaxial cable F214 to the output end of the coaxial cable F114 in the eighth embodiment.
Figure 37G:
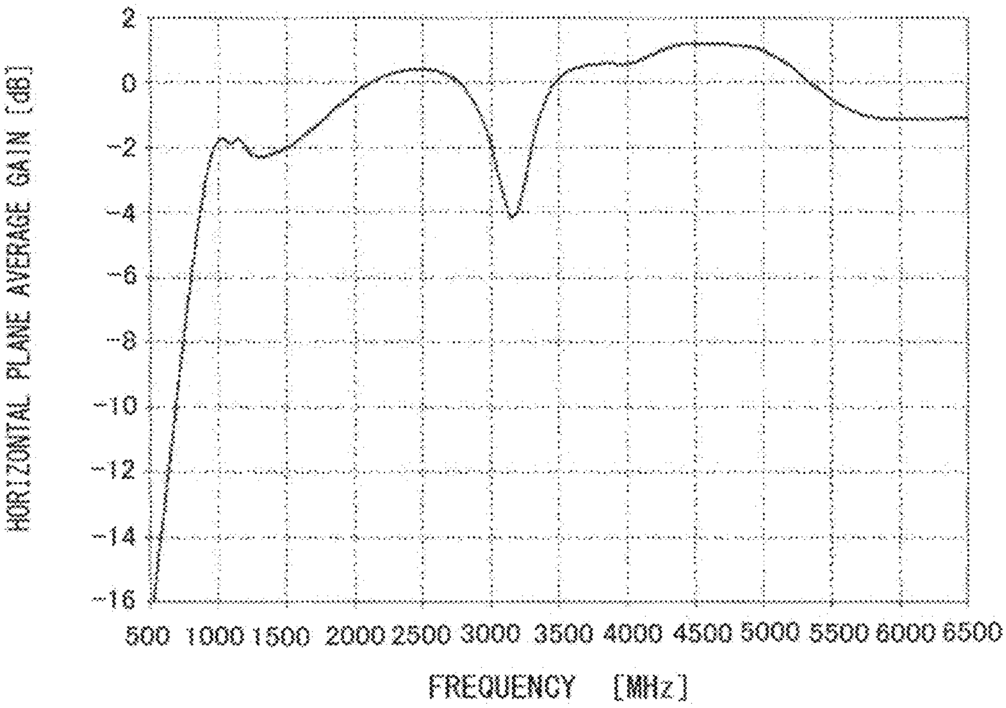
FIG. 37G is a graph showing an average gain characteristic in a horizontal plane of the output end of the coaxial cable F114 in the arrangement of FIG. 36A.
Figure 37H:
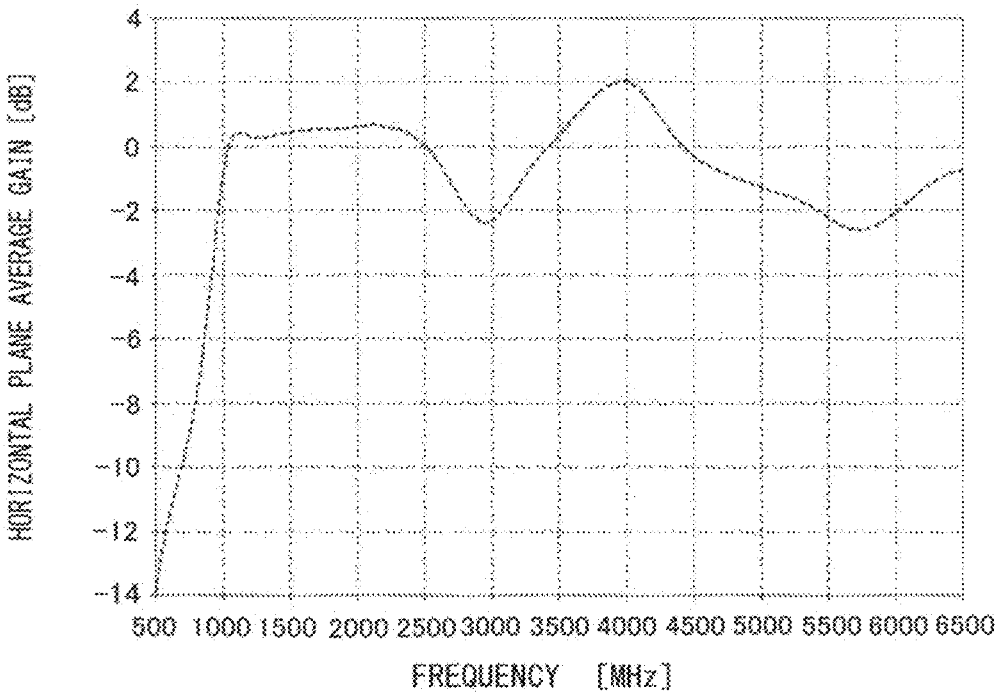
FIG. 37H is a graph showing an average gain characteristic in the horizontal plane of the output end of the coaxial cable F214 in the arrangement of FIG. 36A.

The antenna characteristics of the antenna unit of the eighth embodiment are as shown in FIGS. 37A to 37H. The measurement conditions are similar to those of the sixth embodiment. FIG. 37A is a graph showing a VSWR characteristic of the output end of the coaxial cable F114, and FIG. 37B is a graph showing a VSWR characteristic of the output end of the coaxial cable F214. FIG. 37C is a graph showing a radiation efficiency characteristic of the output end of the coaxial cable F114, and FIG. 37D is a graph showing a radiation efficiency characteristic of the output end of the coaxial cable F214. In each of the graphs, the horizontal axis represents a frequency (MHz). Additionally, FIG. 37E is a graph showing a passing power characteristic from the output end of the coaxial cable F114 to the output end of the coaxial cable F214, and FIG. 37F is a graph showing a passing power characteristic from the output end of the coaxial cable F214 to the output end of the coaxial cable F114. The vertical axis of FIG. 37E represents 20 Log|S211 (dB), the vertical axis of FIG. 37F represents 20 Log|S12| (dB), and each horizontal axis of FIGS. 37E and 37F represents a frequency (MHz). FIG. 37G is a graph showing an average gain characteristic in a horizontal plane (x-y plane) of the output end of the coaxial cable F114 in the arrangement of FIG. 36A. FIG. 37H is a graph showing an average gain characteristic in the horizontal plane (x-y plane) of the output end of the coaxial cable F214. In each of the graphs, the horizontal axis represents a frequency (MHz).

As can been understood from the VSWR characteristics of the antenna, in the antenna of the eighth embodiment, the available frequency band is expanded to the frequency band of less than about 1 GHz as compared between the antenna unit of the eighth embodiment in which the open end portions of the arms that are closest to each other are conductively connected to each other and the antenna unit of the sixth embodiment in which the open end portions of the arms that are closest to each other are not conductively connected to each other.

Ninth Embodiment

Figure 38:
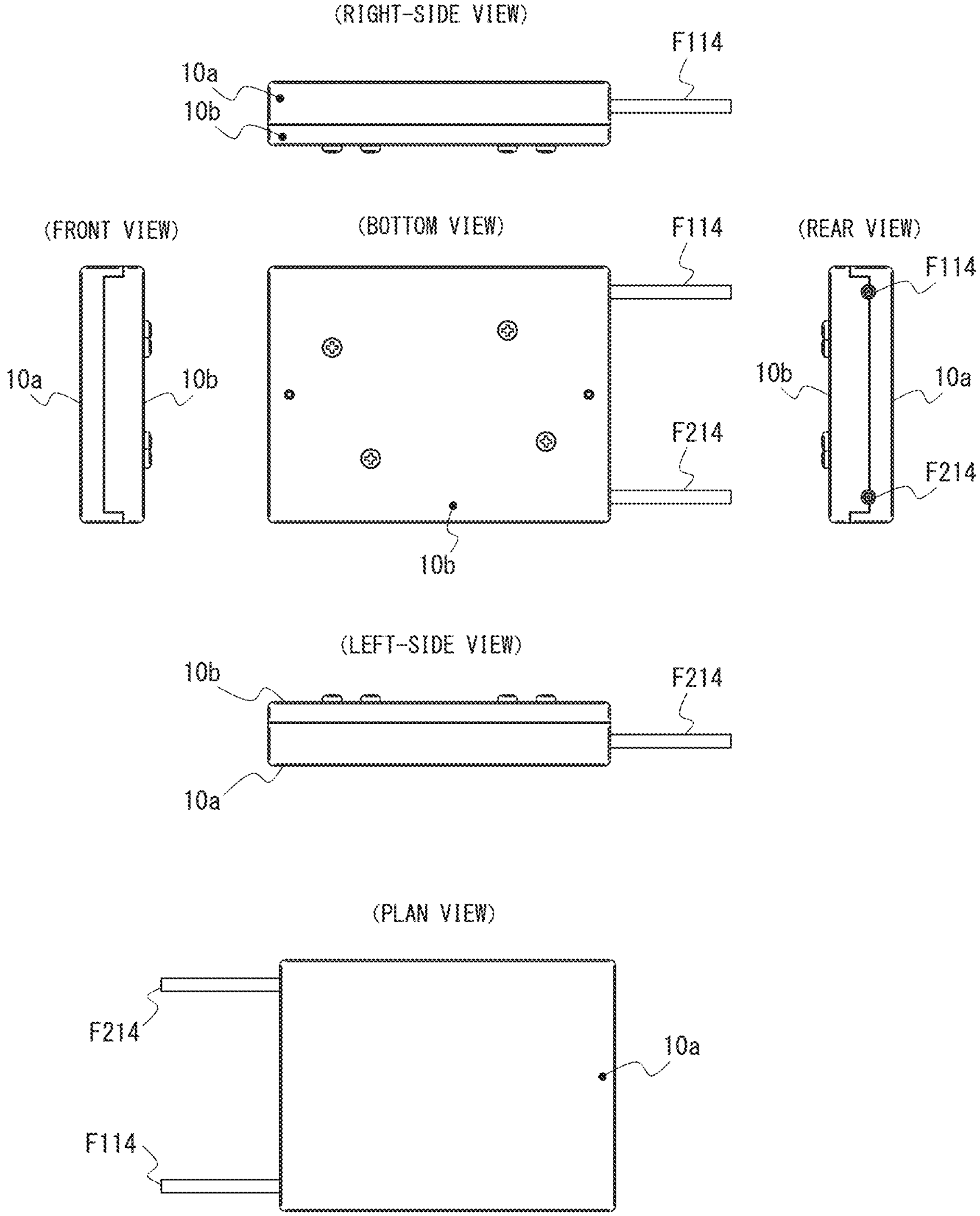
FIG. 38 is an external view of an antenna device in a ninth embodiment.
Figure 39:
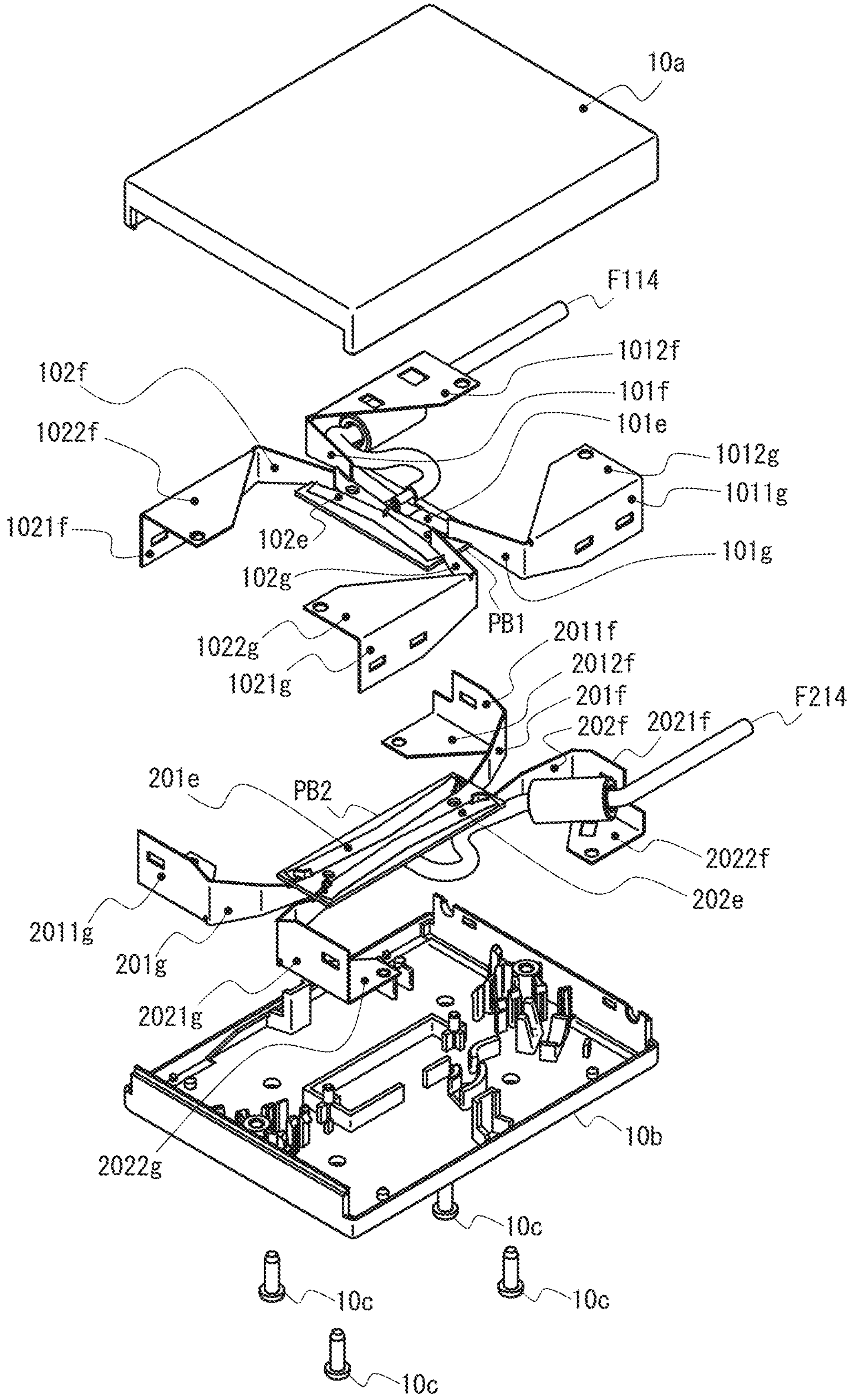
FIG. 39 is an exploded view of the antenna device in the ninth embodiment.
Figure 40A:
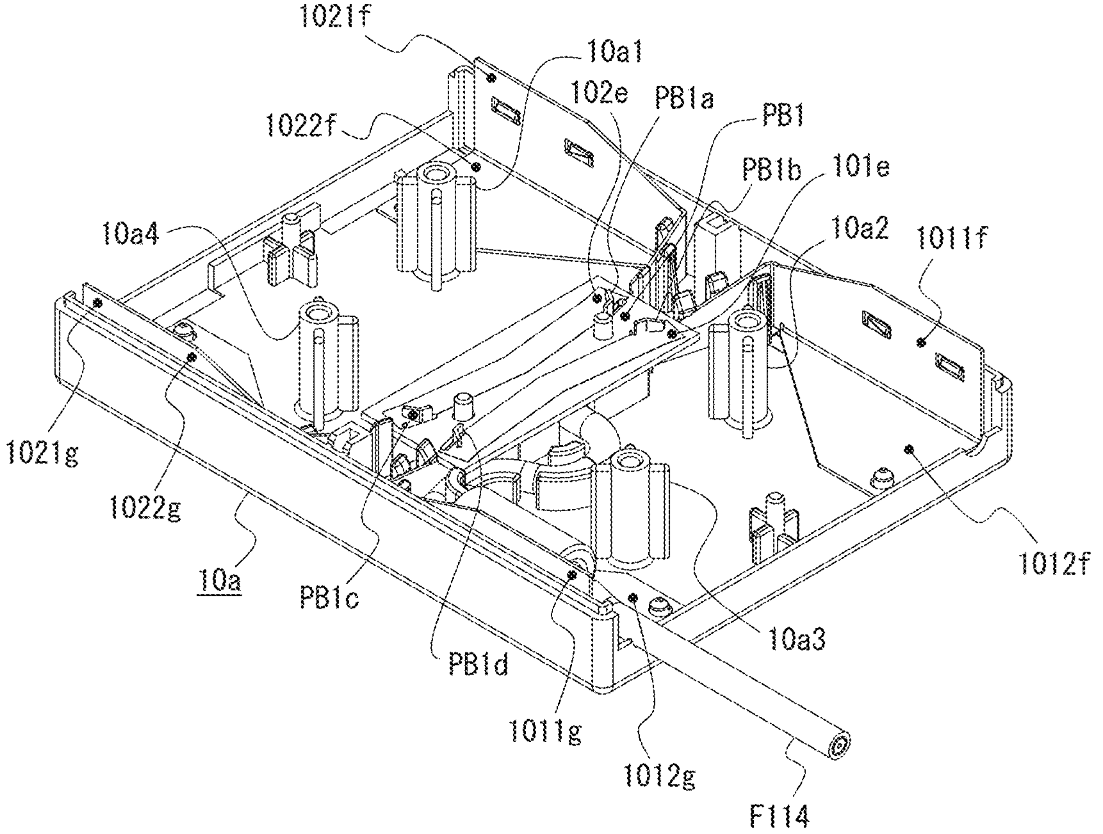
FIG. 40A is a perspective view of an inside of a first case body, when viewed from a rear side.
Figure 40B:
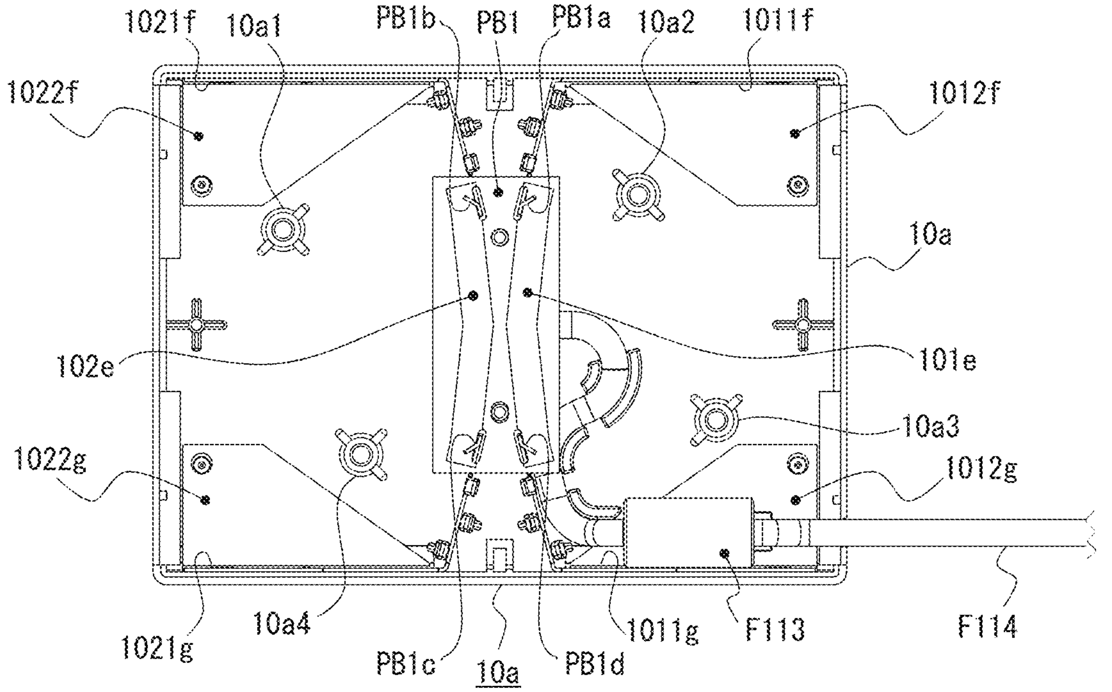
FIG. 40B is a front view of the inside of the first case body.
Figure 40C:
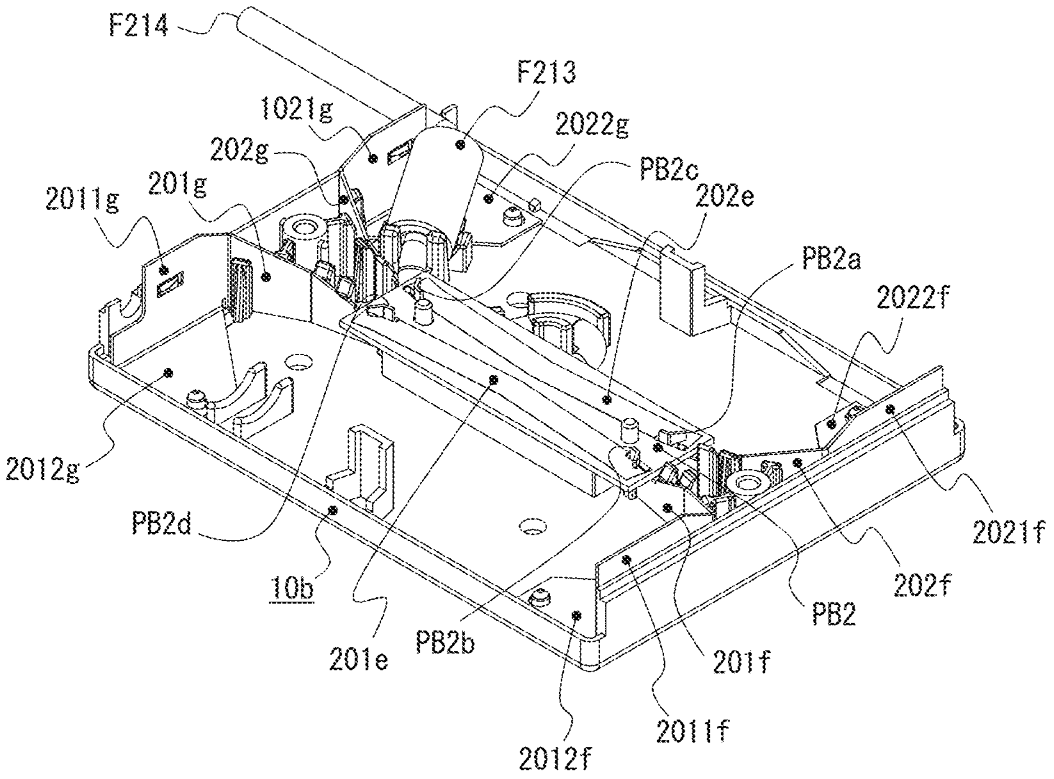
Figure 40D:
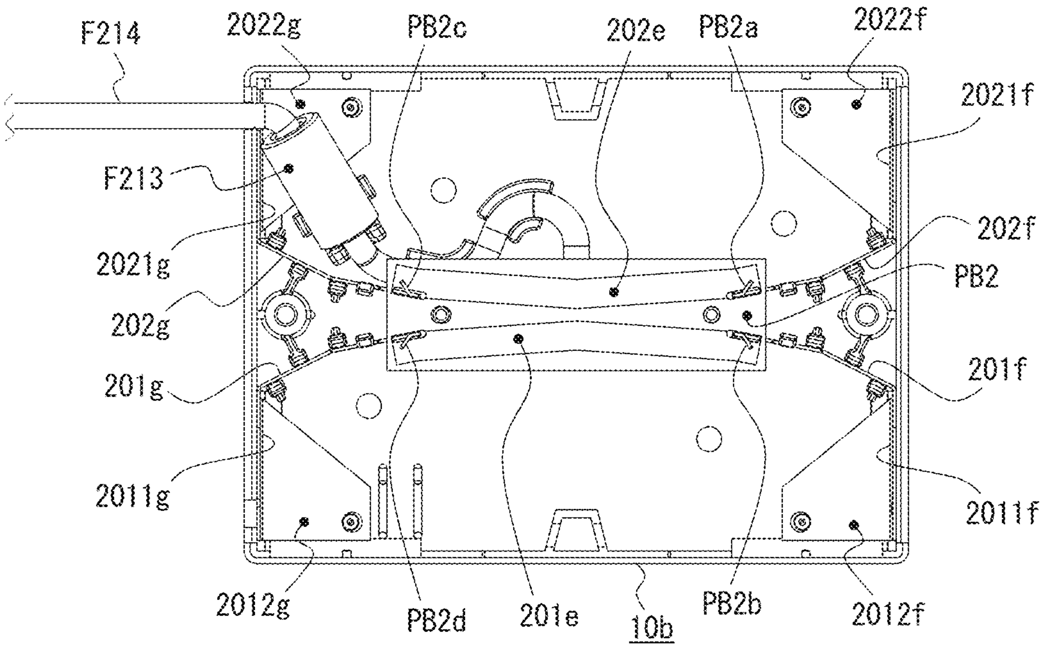

In a ninth embodiment, a structure of assembly of an antenna unit in a case and a feeding system of the antenna unit will be described in detail. Here, not the case 10 illustrated in FIGS. 1A and 1B but a combination type case illustrated in FIGS. 38 to 40 will be described. The case is made of a plastic having electric wave permeability. As seen in FIG. 38, which is a diagram including a front view, a rear view, a plan view, a bottom view, a right-side view, and a left-side view of the case, and as seen in an exploded view illustrated in FIG. 39, the case includes a first case body 10*a* and a second case body 10*b* in which respective open ends seal an accommodation space therein, the case body 10*a* and the second case body 10*b* having a substantially rectangular shape. FIG. 40A is a perspective view of an inside of the first case body 10*a* in a state in which the pair of first elements are fixed, when viewed from the rear side. FIG. 40B is a front view of the inside of the first case body 10*a*. FIG. 40C is a perspective view of an inside of the second case body 10*b* in a state in which the pair of second elements are fixed. FIG. 40D is a front view of the inside of the second case body 10*b*. Four screw receiving bosses 10*a*1 to 10*a*4 in which screw receiving portions are threaded are formed in the second case body 10*b*. The sealing is performed by inserting and tightening screws 10*c* from a rear surface of the second case body 10*b*, but may be performed using an adhesive. The size of the first case body 10*a* and the second case body 10*b* after the sealing is 60 mm in long side, 80 mm in short side, and 15 mm in thickness, which size does not include the coaxial cables F114, F214 exposed.

The antenna unit to be accommodated in the case bodies 10*a* and 10*b* is the antenna unit of the sixth embodiment that is partially changed in shape. That is, in the pair of first elements, a pair of through holes are formed at or near both ends of the proximal end region 101*e* on the board PB1. A pair of through holes are also formed at or near both ends of the proximal end region 102*e* on the board PB1. Metal pawls PB to PB are formed integrally on the proximal end portions of the extending regions 101*f*, 101*g*, 102*f*, and 102*g* each formed by a sheet metal, the pawls PB1*a* to PB1*d* passing through the above-described respective through holes, and then being deformable (bendable) at or near the respective distal ends thereof. After passing through the respective through holes, the pawls PB to PB are bent at or near the respective distal ends thereof above the proximal end regions 101*e* and 102*e* of the board PB1. In this way, the extending regions 101*f* and 101*g* and the extending regions 102*f* and 102*g* are fixed to the proximal end region 101*e* and the proximal end region 102*e* on the board PB1, respectively, in a state in which the extending regions 101*f* and 101*g* and the extending regions 102*f* and 102*g* are conductively connected to the proximal end region 101*e* and the proximal end region 102*e*, respectively. At this time, the pawls PB1*a* to PB1*d* may be fixed to the proximal end regions 101*e* and 102*e* by solder.

As described above, the impedance matching circuit is not mounted on the board PB1, and the signal line and the ground line of the coaxial cable F114 are directly connected to one and the other of the proximal end regions 101*e* and 102*e*. The coaxial cable F114 is fixed to a side close to one end of short sides of the first case body 10*a* together with the ferrite core F113.

The first end portions 1011*f*, 1011*g*, 1021*f*, and 1021*g* and the second end portions 1012*f*, 1012*g*, 1022*f*, and 1022*g* each are formed in a shape along the bottom surface or side surface of the first case body 10*a*. The length of the board PB1 and the length of the extending regions 101*f* and 101*g* or the extending regions 102*f* and 102*g* are longer than a configuration corresponding to each configuration in the second elements. On the other hand, in each of the extending regions 101*f*, 101*g*, 102*f*, and 102*g*, the length of a portion (region after branching) branching off from and extending in a direction away from the corresponding proximal end region 101*e*, 102*e* is shorter than the configuration corresponding to each configuration in the second element. As described above, in the second end portions 1012*f*, 1012*g*, 1022*f*, and 1022*g*, facing tip portions of the second end portions 1012*f* and 1012*g* and facing tip portions of the second end portions 1022*f* and 1022*g* are partially changed to be formed in a substantially trapezoidal shape, since the capacitive and inducibility are adjusted to secure a desired frequency band.

The pair of second elements are accommodated in the second case body 10*b* having the structure almost similar to the first case body. That is, in the pair of second elements, a pair of through holes are formed at or near both ends of the proximal end region 201*e* on the board PB2. A pair of through holes are also formed at or near both ends of the proximal end region 202*e* on the board PB2. Metal pawls PB2*a* to PB2*d* are formed integrally on the proximal end portions of the extending regions 201*f*, 201*g*, 202*f*, and 202*g* each formed by a sheet metal, the pawls PB2*a* to PB2*d* passing through the above-described respective through holes. After passing through the respective through holes, the pawls PB2*a* to PB2*d* are bent at or near the respective distal ends thereof above the proximal end regions 201*e* and 202*e* of the board PB2. In this way, the extending regions 201*f* and 201*g* and the extending regions 202*f* and 202*g* are fixed to the proximal end region 201*e* and the proximal end region 202*e* on the board PB2, respectively, in a state in which the extending regions 201*f* and 201*g* and the extending regions 202*f* and 202*g* are conductively connected to the proximal end region 201*e* and the proximal end region 202*e*, respectively. At this time, the pawls PB2*a* to PB2*d* may be fixed to the proximal end regions 201*e* and 202*e* by solder.

The impedance matching circuit is not mounted on the board PB1, and the signal line and the ground line of the coaxial cable F214 are directly connected to one and the other of the proximal end regions 201*e* and 202*e*. The coaxial cable F214 is fixed to a side close to the other end of short sides of the second case body 10*b* together with the ferrite core F213. In this way, the direct distance from the coaxial cable F114 is kept as far as possible.

The first end portions 2011*f*, 2011*g*, 2021*f*, and 2021*g* and the second end portions 2012*f*, 2012*g*, 2022*f*, and 2022*g* each are formed in a shape along the bottom surface or side surface of the second case body 10*b*. As described above, in the second end portions 2012*f*, 2012*g*, 2022*f*, and 2022*g*, facing tip portions of the second end portions 2012*f* and 2012*g* and facing tip portions of the second end portions 2022*f* and 2022*g* are partially changed to be formed in a substantially trapezoidal shape, since the capacitive and inducibility are adjusted to secure a desired frequency band. In the pair of first elements and the pair of second elements, the open end portions (for example, the second end portion 1012*f* and the second end portion 20220 that are closest to each other are not conductively connected to each other, and act as a split ring. That is, such open end portions are capacitively coupled, and act as a loop antenna.

As described above, the antenna unit of the embodiment operates on different operating principles according to a frequency band to be used or in a state in which the different operating principles are combined. For example, in a frequency band in which the first end portions 1011*f*, 1011*g*, 1021*f*, and 1021*g* and the second end portions 1012*f*, 1012*g*, 1022*f*, and 1022*g* of the pair of first elements and the first end portions 2011*f*, 2011*g*, 2021*f*, and 2021*g* and the second end portions 2012*f*, 2012*g*, 2022*f*, and 2022*g* of the pair of second elements are capacitively coupled, the pair of first elements and the pair of second elements integrally act as a loop antenna (operation A).

The pair of first elements and the pair of second elements act as two dipole antennas, respectively (operation B). In this case, as, in the two extending regions 101*f* and 101*g* and two extending regions 102*f* and 102*g* each formed by a sheet metal, the length of the portion branching off from and extending in a direction away from the respective proximal end regions 101*e* and 102*e* is increased, the antenna characteristics (VSWR and the like) in the middle frequency band are shifted to the low frequency side. That is, the frequency band in which the antenna characteristics are stable is expanded.

Furthermore, the proximal end region 101*e* and the extending regions 101*f* and 101*g*, and the proximal end region 102*e* and the extending regions 102*f* and 102*g* act as two tapered-slot antennas (operation C). In this case, as the lengths of the boards PB1 and PB2 and the lengths of the two extending regions 101*f* and 101*g* and the two extending regions 102*f* and 102*g*, which extend while facing, are increased, the antenna characteristics (VSWR and the like) in the high frequency range approaches those in the low frequency side. That is, the frequency band in which the antenna characteristics are stable is expanded. In this way, the antenna device having one antenna unit acts mainly as a loop antenna in the low-frequency band side, acts mainly as a dipole antenna in the middle frequency band side, and acts mainly as a tapered-slot antenna in the high-frequency band side. In the mid-frequency band, the antenna device acts as a complex antenna in which their operating principles are combined. That is, in a range from the low frequency band to the middle frequency band, the antenna device acts mainly as the complex antenna in which the operating principle of the loop antenna and the operation principle of the dipole antenna are combined. In a range from the middle frequency band to the high frequency band, the antenna device acts mainly as the complex antenna in which the operating principle of the dipole antenna and the operating principle of the tapered-slot antenna are combined.

The coaxial cable F114 connected to the pair of first elements and the coaxial cable F214 connected to the pair of second elements are fixed at respective locations farthest from each other in the first case body 10*a* and the second case body 10*b*, and are used outside the first case body 10*a* and the second case body 10*b*, in a state of being separated from each other. This can reduce mutual interference of unnecessary radio waves caused by current flowing the outer jackets of the coaxial cables F114 and F214.

In the case where the ferrite cores F113 and F213 are not attached to the coaxial cables F114 and F214, respectively, the radiation efficiency is reduced in the lowest frequency side of the available frequency band, but the antenna device is operable. Therefore, the antenna device may be used without attaching the ferrite cores F113 and F213 to the coaxial cables F114 and F214, in applications that allow the reduction of the radiation efficiency in the low frequency band.

In the ninth embodiment, feeding ports are provided to the first element and the second element, respectively, and the coaxial cables F114 and F214 are connected to the respective feeding ports. In other words, the antenna device including the antenna unit of the ninth embodiment includes the ports, and the feeding coaxial cables F114 and F214 are connected to the two ports, respectively. However, when the branch circuit is mounted, the antenna device is operable by feeding with one coaxial cable. In this case, it is necessary to detach the coaxial cable connected to any one of the two ports.

The description has been made assuming that the lengths of the boards PB1 and PB2, and the lengths of extending regions 101*f*, 101*g*, 102*f*, 102*g*, 201*f*, 201*g*, 202*f*, and 202*g* are different between the pair of first elements and the pair of second elements, but the present invention is not limited thereto. For example, in the case where the first case body 10*a* and the second case body 10*b* have a substantially square shape, these lengths may be the same between the pair of first elements and the pair of second elements.

The invention claimed is:

1. A MIMO antenna device for spatial multiplexing transmission, comprising:

a first dipole antenna including a pair of first elements connected to a first feeding point and arranged on a first plane, and a second dipole antenna including a pair of second elements connected to a second feeding point and arranged on a second plane which is parallel to the first plane, wherein, in the second dipole antenna, the second feeding point overlaps with the first feeding point when viewed from a plane, and wherein the pair of second elements are arranged to face the pair of first elements in a state in which the pair of second elements are rotated by a predetermined angle from a position at which a second center portion of the second dipole antenna is aligned with a first center portion of the first dipole antenna while maintaining a predetermined space, thereby enabling a stable operation of the MIMO antenna device over a desired frequency band.

2. The MIMO antenna device according to claim 1, further comprising:

coaxial cables respectively connected to the first feeding point and the second feeding point provided between the first plane and the second plane.

3. The MIMO antenna device according to claim 1, wherein the first dipole antenna includes a first bowtie antenna, and the second dipole antenna includes a second bowtie antenna.

4. The AMMO antenna device according to claim 3, wherein the first element extends from the first bowtie antenna to the first plane, and the first element has a shape with a capacitance and an inductance adjusted to secure the desired frequency band.

5. The MIMO antenna device according to claim 3, wherein the second element extends from the second bowtie antenna to the second plane, and the second element has a shape with a capacitance and an inductance adjusted to secure the desired frequency band.

6. The MIMO antenna device according to claim 3, wherein the first bowtie antenna includes a bent region extending from the first bowtie antenna and being bent by 90 degrees in a thickness direction of the antenna device, or wherein the second bowtie antenna includes another bent region extending from the second bowtie antenna and being bent by 90 degrees in a thickness direction of the antenna device.

7. The MIMO antenna device according to claim 1, further comprising a first board having the first feeding point and a second board having the second feeding point.

8. The MIMO antenna device according to claim 1, wherein the first element is formed on a front surface of one board and the second element is formed on a rear surface of the one board.

9. The MIMO antenna device according to claim 1, wherein the first dipole antenna and the second dipole antenna are arranged diagonally within a case.

* * * * *